(12) United States Patent
Kimpara et al.

(10) Patent No.: US 8,294,395 B2
(45) Date of Patent: Oct. 23, 2012

(54) CONTROLLER FOR AC ROTARY MACHINE AND CONTROLLER FOR ELECTRIC POWER STEERING

(75) Inventors: Yoshihiko Kimpara, Chiyoda-ku (JP); Seiji Sawada, Chiyoda-ku (JP); Takayuki Kifuku, Chiyoda-ku (JP)

(73) Assignee: Mitsubishi Electric Corp., Tokyo (JP)

( * ) Notice: Subject to any disclaimer, the term of this patent is extended or adjusted under 35 U.S.C. 154(b) by 111 days.

(21) Appl. No.: 12/904,451

(22) Filed: Oct. 14, 2010

(65) Prior Publication Data
US 2011/0241579 A1 Oct. 6, 2011

(30) Foreign Application Priority Data
Apr. 6, 2010 (JP) ................................. 2010-087691

(51) Int. Cl.
*H02P 21/00* (2006.01)
(52) U.S. Cl. ............. 318/400.02; 318/400.26; 318/721; 318/722
(58) Field of Classification Search ............. 318/400.02, 318/400.04, 400.26, 721, 722, 432, 434, 318/504
See application file for complete search history.

(56) References Cited

U.S. PATENT DOCUMENTS

| | | | | |
|---|---|---|---|---|
| 4,808,903 A * | 2/1989 | Matsui et al. | .................. | 318/800 |
| 5,481,173 A * | 1/1996 | Yamamoto | .................... | 318/801 |
| 5,608,302 A * | 3/1997 | Umida | .......................... | 318/802 |
| 5,828,199 A * | 10/1998 | Tajima et al. | .................. | 318/779 |
| 6,163,128 A * | 12/2000 | Hiti et al. | ....................... | 318/722 |
| 6,577,096 B2 * | 6/2003 | Cho | .............................. | 318/727 |
| 6,861,813 B2 * | 3/2005 | Yoshimoto et al. | ........... | 318/432 |
| 7,242,163 B2 * | 7/2007 | Gallegos-Lopez et al. | ... | 318/812 |
| 7,352,151 B2 * | 4/2008 | Fujitsuna et al. | ............. | 318/721 |
| 7,449,859 B2 * | 11/2008 | Bae et al. | ....................... | 318/807 |
| 7,642,737 B2 * | 1/2010 | Bae et al. | .................. | 318/400.02 |
| 7,723,945 B2 * | 5/2010 | Okamura | ....................... | 318/805 |
| 7,728,537 B2 * | 6/2010 | Tomigashi | ............... | 318/400.02 |

(Continued)

FOREIGN PATENT DOCUMENTS
JP 60-219984 A 11/1985
(Continued)

OTHER PUBLICATIONS
Notification of Reasons for Refusal, pp. 1-6, dated Mar. 21, 2012.
(Continued)

*Primary Examiner* — Bentsu Ro
*Assistant Examiner* — Thai Dinh
(74) *Attorney, Agent, or Firm* — Sughrue Mion, PLLC

(57) ABSTRACT

A storage section stores three-phase detection currents and outputs them as three-phase storage detection currents and also stores three-phase voltage commands and outputs them as three-phase storage voltage commands. A second voltage command calculating section outputs three-phase voltage commands on the basis of the three-phase storage detection currents and the three-phase storage voltage commands, which are acquired from the storage section, and the three-phase detection currents acquired from a current detecting means. A voltage command output means outputs, to a voltage application means, three-phase voltage commands acquired on the basis of the three-phase voltage commands from the storage section and the three-phase voltage commands from the second voltage command calculating section. The voltage application means applies a voltage to an AC rotary machine on the basis of the three-phase voltage commands from the voltage command output means.

11 Claims, 24 Drawing Sheets

U.S. PATENT DOCUMENTS

| | | | |
|---|---|---|---|
| 7,800,337 B2 * | 9/2010 | Kinpara et al. | 318/712 |
| 8,115,431 B2 * | 2/2012 | Hashimoto et al. | 318/400.02 |
| 2009/0026989 A1 | 1/2009 | Kubota et al. | |

FOREIGN PATENT DOCUMENTS

| JP | 02-285966 A | 11/1990 |
|---|---|---|
| JP | 11-018469 A | 1/1999 |
| JP | 2001-245499 A | 9/2001 |
| JP | 2006-296055 A | 10/2006 |
| JP | 2007-216822 A | 8/2007 |

OTHER PUBLICATIONS

German Office Action, dated May 11, 2012.

* cited by examiner

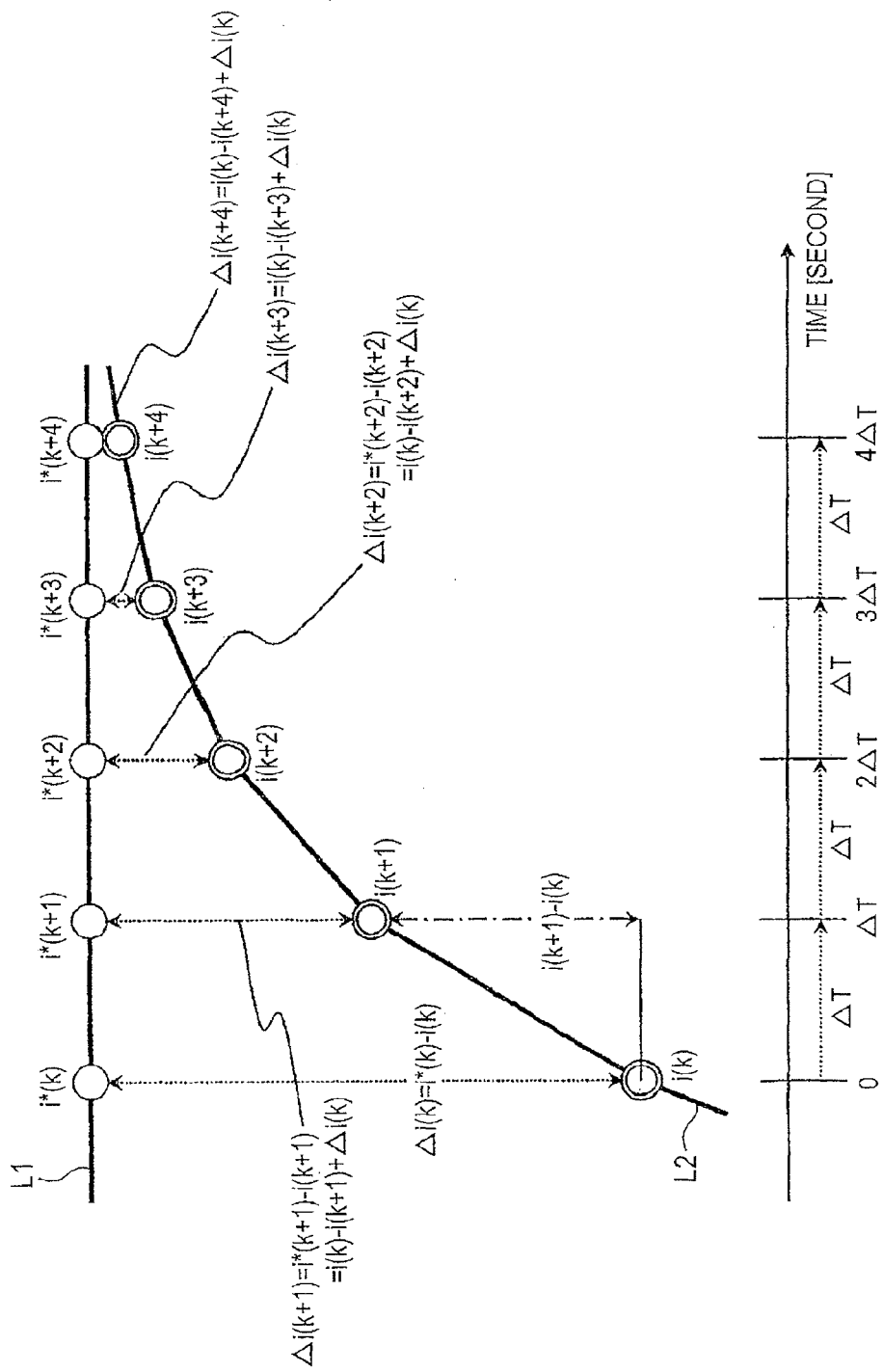

FIG.6

| | TIME [SECOND] | 0 | ΔT | 2ΔT | 3ΔT | 4ΔT | 5ΔT | 6ΔT | 7ΔT | 8ΔT | 9ΔT | 10ΔT | 11ΔT | 12ΔT | ... |
|---|---|---|---|---|---|---|---|---|---|---|---|---|---|---|---|
| (a) | | | | | | | | | | | | | | | |
| (b) | REFERENCE FRAME TRANSFORMATION MEANS 5 | EXECUTE | | | | | EXECUTE | | | | | EXECUTE | | | ... |
| (c) | FIRST CURRENT CONTROL MEANS 6 | EXECUTE | | | | | EXECUTE | | | | | EXECUTE | | | ... |
| (d) | REFERENCE FRAME TRANSFORMATION MEANS 7 | EXECUTE | | | | | EXECUTE | | | | | EXECUTE | | | ... |
| (e) | STORAGE SECTION 9 | STORE | HOLD | HOLD | HOLD | HOLD | STORE | HOLD | HOLD | HOLD | HOLD | STORE | HOLD | HOLD | ... |
| (f) | SECOND VOLTAGE COMMAND CALCULATING SECTION 10 | | EXECUTE | EXECUTE | EXECUTE | EXECUTE | | EXECUTE | EXECUTE | EXECUTE | EXECUTE | | EXECUTE | EXECUTE | ... |
| (g) | VOLTAGE COMMAND OUTPUT MEANS 11 | FIRST VOLTAGE COMMAND | SECOND VOLTAGE COMMAND | SECOND VOLTAGE COMMAND | SECOND VOLTAGE COMMAND | SECOND VOLTAGE COMMAND | FIRST VOLTAGE COMMAND | SECOND VOLTAGE COMMAND | SECOND VOLTAGE COMMAND | SECOND VOLTAGE COMMAND | SECOND VOLTAGE COMMAND | FIRST VOLTAGE COMMAND | SECOND VOLTAGE COMMAND | SECOND VOLTAGE COMMAND | ... |

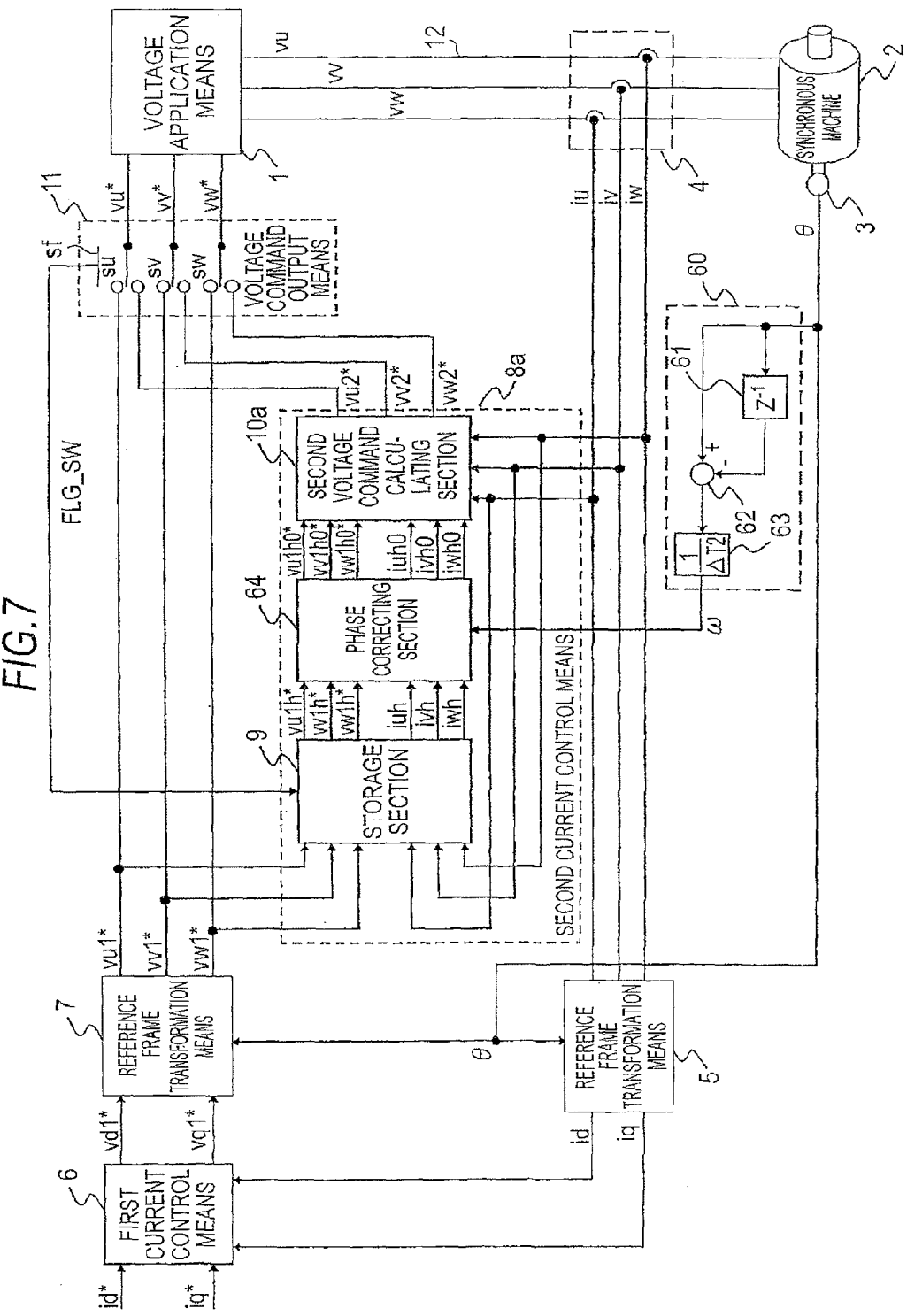

FIG.10

| | TIME [SECOND] | 0 | ΔT | 2ΔT | 3ΔT | 4ΔT | 5ΔT | 6ΔT | 7ΔT | ... |
|---|---|---|---|---|---|---|---|---|---|---|
| (a) | REFERENCE FRAME TRANSFORMATION MEANS 5 | EXECUTE | | EXECUTE | | EXECUTE | | EXECUTE | | ... |
| (b) | FIRST CURRENT CONTROL MEANS 6 | EXECUTE | | EXECUTE | | EXECUTE | | EXECUTE | | ... |
| (c) | REFERENCE FRAME TRANSFORMATION MEANS 7 | EXECUTE | | EXECUTE | | EXECUTE | | EXECUTE | | ... |
| (d) | STORAGE SECTION 9 | STORE | HOLD | STORE | HOLD | STORE | HOLD | STORE | HOLD | ... |
| (e) | PHASE CORRECTING SECTION 64 | | EXECUTE | | EXECUTE | | EXECUTE | | EXECUTE | ... |
| (f) | SECOND VOLTAGE COMMAND CALCULATING SECTION 10a | | EXECUTE | | EXECUTE | | EXECUTE | | EXECUTE | ... |
| (g) | VOLTAGE COMMAND OUTPUT MEANS 11 | FIRST VOLTAGE COMMAND | SECOND VOLTAGE COMMAND | FIRST VOLTAGE COMMAND | SECOND VOLTAGE COMMAND | FIRST VOLTAGE COMMAND | SECOND VOLTAGE COMMAND | FIRST VOLTAGE COMMAND | SECOND VOLTAGE COMMAND | ... |

FIG.18

| | (a) TIME [SECOND] | 0 | ΔT | 2ΔT | 3ΔT | 4ΔT | 5ΔT | 6ΔT | 7ΔT | 8ΔT | 9ΔT | 10ΔT | 11ΔT | 12ΔT | |
|---|---|---|---|---|---|---|---|---|---|---|---|---|---|---|---|
| (b) | REFERENCE FRAME TRANSFORMATION MEANS 5b | EXECUTE | | | | | EXECUTE | | | | | EXECUTE | | | ⋮ |
| (c) | FIRST CURRENT CONTROL MEANS 6 | EXECUTE | | | | | EXECUTE | | | | | EXECUTE | | | ⋮ |
| (d) | REFERENCE FRAME TRANSFORMATION MEANS 7b | EXECUTE | | | | | EXECUTE | | | | | EXECUTE | | | ⋮ |
| (e) | STORAGE SECTION 9b | STORE | HOLD | HOLD | HOLD | HOLD | STORE | HOLD | HOLD | HOLD | HOLD | STORE | HOLD | HOLD | ⋮ |
| (f) | PHASE CORRECTING SECTION 64c | | EXECUTE | EXECUTE | EXECUTE | EXECUTE | | EXECUTE | EXECUTE | EXECUTE | EXECUTE | | EXECUTE | EXECUTE | ⋮ |
| (g) | SECOND VOLTAGE COMMAND CALCULATING SECTION 10b | | EXECUTE | EXECUTE | EXECUTE | EXECUTE | | EXECUTE | EXECUTE | EXECUTE | EXECUTE | | EXECUTE | EXECUTE | ⋮ |
| (h) | VOLTAGE COMMAND OUTPUT MEANS 11b | FIRST VOLTAGE COMMAND | SECOND VOLTAGE COMMAND | SECOND VOLTAGE COMMAND | SECOND VOLTAGE COMMAND | SECOND VOLTAGE COMMAND | FIRST VOLTAGE COMMAND | SECOND VOLTAGE COMMAND | SECOND VOLTAGE COMMAND | SECOND VOLTAGE COMMAND | SECOND VOLTAGE COMMAND | FIRST VOLTAGE COMMAND | SECOND VOLTAGE COMMAND | SECOND VOLTAGE COMMAND | ⋮ |

US 8,294,395 B2

CONTROLLER FOR AC ROTARY MACHINE AND CONTROLLER FOR ELECTRIC POWER STEERING

BACKGROUND OF THE INVENTION

1. Field of the Invention

The present invention relates to a controller for an AC rotary machine and a controller for electric power steering capable of reducing the amount of operation while maintaining the reliability in current control against disturbance.

2. Background Art

In control of an AC rotary machine, the reference frame of a current or a voltage which is the vector quantity may be divided into approximately two kinds of the reference frames, that is, the stationary reference frame and the rotating reference frame.

As examples of the stationary reference frame, the three-phase AC reference frame which directly treat the values of three phases, for example, U, V, and W phases and the two-phase reference frame which observe a state on the orthogonal two-axis stationary reference frame by three-phase/two-phase conversion are known.

As the rotating reference frame, orthogonal rotating two-axis reference frame are known well. In addition, the rotating reference frame which rotate in synchronization with the rotation position of an AC rotary machine, the rotating reference frame which rotate in synchronization with a frequency command, and the rotating reference frame which rotate in synchronization with the estimated magnetic flux of a rotor or an induced voltage are known as examples of the rotating reference frame.

In the related art, a controller for an AC rotary machine that gives a current command value on the rotating reference frame and performs control such that the current of the AC rotary machine matches the current command value when driving the AC rotary machine is known.

For example, in a known controller for an AC rotary machine disclosed in JP60-219984A (page 2, FIG. 1), a detection current on the stationary reference frame acquired from a current detector is converted into a detection current on the rotating reference frame on the basis of operational expression for reference frame transformation, and a voltage command on the rotating reference frame is controlled such that the converted current matches the current command value on the rotating reference frame. Moreover, a voltage command on the rotating reference frame is converted into three-phase voltage commands on the stationary reference frame on the basis of operational expression for reference frame transformation, and the AC rotary machine is controlled on the basis of the three-phase voltage commands.

Moreover, for example, in a known controller for an AC rotary machine disclosed in JP2-285966A (page 2, FIG. 2), three-phase detection currents of an AC rotary machine detected by a current detector are converted into two-phase currents, which are perpendicular to each other, by a three-phase/two-phase converter and then a detection current on the rotating reference frame is calculated by a reference frame transformer. The deviation between the set current command on the rotating reference frame and the set detection current on the rotating reference frame is calculated separately for each axis, integral control of the deviation between the current command on the rotating reference frame and the detection current on the rotating reference frame calculated separately for each axis is performed by two sets of integrators such that the input deviation becomes zero, and the result is output as a voltage command on the rotating reference frame. Two-phase voltage command values perpendicular to each other on the stationary reference frame are output by reference frame transformation of the voltage command on the rotating reference frame, and the two-phase voltage command values are converted into three-phase voltage command values by two-phase/three-phase conversion. On the other hand, the current command value on the rotating reference frame set by a current setting device is converted into three-phase current command values by reference frame transformation and two-phase/three-phase conversion, and three-phase voltage commands are output by three sets of proportional control on the deviation between the three-phase current commands and the three-phase detection currents. Three sets of adders add the three-phase voltage command values, which are obtained by converting the two-phase voltage command values, and the three-phase voltage command values, which are obtained by three sets of proportional control, for each phase, and the AC rotary machine is controlled on the basis of three-phase voltage command values obtained as a result of the addition.

Moreover, for example, a known controller for an AC rotary machine disclosed in JP11-018469A (paragraphs 0025 and 0067 to 0079, FIG. 13) includes: a feed forward signal calculating means for outputting a current command before one sampling period, which is a current command on the rotating reference frame axis of an AC motor, as a model current and for outputting a model voltage proportional to the rate of temporal change of the model current; a current control means to which a deviation between the model current and a current on the rotating reference frame is input and which outputs a compensation voltage; and an adding means for adding the model voltage and the compensation voltage and outputting a voltage command on the rotating reference frame. Therefore, since a problem is solved in which overshoot of a step response increases if a response frequency is set high in order to obtain the current control performance of high-speed response, high-speed current control response is realized.

In the case of using a controller for an AC rotary machine for electric power steering and the like, highly reliable current control performance against disturbance caused by variation in the power supply voltage is desirable. In order to maintain the highly reliable current control performance against disturbance, proportional operation in the current control is important and it is preferable to set the operation period of proportional operation short.

In the known controller for an AC rotary machine disclosed in JP60-219984A, if the operation period of proportional operation is set short, there is a problem that the load of operation performed by a microcomputer and the like increases because the proportional operation in current control is performed on the rotating reference frame and accordingly, an operation for reference frame transformation also needs to be executed in a short period.

Moreover, in the known controller for an AC rotary machine disclosed in JP2-285966A, reference frame transformation from a current command on the rotating reference frame to a current command on the stationary reference frame is required in addition to the reference frame transformation from a detection current on the stationary reference frame to a detection current on the rotating reference frame and the reference frame transformation from a voltage command on the rotating reference frame to a voltage command on the stationary reference frame. Accordingly, since the number of times of reference frame transformation is larger than that in the controller for an AC rotary machine disclosed in JP60-

219984A, there is a problem that the load of operation performed by a microcomputer and the like increases.

Moreover, in the known controller for an AC rotary machine disclosed in JP11-018469A, the following capability of a current with respect to a current command can be improved using the feed forward signal calculating means, but the reliability of current control against disturbance caused by variation in the power supply voltage is the same as that in the controller for an AC rotary machine disclosed in JP60-219984A. That is, in order to maintain the reliability of current control, the operation period of proportional operation is set short. For this reason, there has been a problem that the load of operation performed by a microcomputer and the like increases like the controller for an AC rotary machine disclosed in JP60-219984A.

SUMMARY OF THE INVENTION

The invention has been made to solve the above-described problems, and it is an object of the invention to provide a controller for an AC rotary machine capable of reducing the operation load when performing an operation by a microcomputer and the like without affecting the reliability of current control performance against disturbance, which is caused by variation in the power supply voltage, and a controller for electric power steering as an application of the controller for the AC rotary machine.

According to a first aspect of the invention, a controller for an AC rotary machine includes: voltage application means for applying a voltage to the AC rotary machine on the basis of a voltage command on the stationary reference frame; current detecting means for detecting a current of the AC rotary machine and outputting a detection current on the stationary reference frame; first reference frame transformation means for transforming the reference frame of the detection current on the stationary reference frame on the basis of an arbitrary phase and outputting a detection current on the rotating reference frame; first current control means for outputting a first voltage command on the rotating reference frame on the basis of the detection current on the rotating reference frame and a current command on the rotating reference frame which gives command regarding a current to be supplied to the AC rotary machine; second reference frame transformation means for transforming the reference frame of the first voltage command on the rotating reference frame on the basis of the arbitrary phase and outputting a first voltage command on the stationary reference frame; second current control means for outputting a second voltage command on the stationary reference frame on the basis of the detection current on the stationary reference frame; and voltage command output means for outputting the voltage command on the stationary reference frame to the voltage application means on the basis of the first voltage command on the stationary reference frame and the second voltage command on the stationary reference frame.

Moreover, according to a second aspect of the invention, a controller for electric power steering wherein the AC rotary machine is formed as an AC motor that generates auxiliary torque for assisting steering torque of a vehicle, the controller for electric power steering includes: the controller for the AC rotary machine according to the first aspect of the invention; torque detecting means for detecting the steering torque and outputting detection torque; and current command calculating means for outputting a current command on the rotating reference frame, which gives command regarding a current to be supplied to the AC motor, on the basis of the detection torque. An operation period of the current command calculating means is set to be equal or longer than a period, for which the first current control means in the controller for an AC rotary machine according to the first aspect of the invention updates the first voltage command on the rotating reference frame and is also set to be longer than a period, for which the second current control means updates the second voltage command on the stationary reference frame.

The controller for the AC rotary machine according to the first aspect of the invention is configured to include the voltage command output means for outputting the voltage command on the stationary reference frame to the voltage application means on the basis of the first voltage command on the stationary reference frame and the second voltage command on the stationary reference frame. Accordingly, it is possible to solve the restrictions that an operation of the first voltage command on the stationary reference frame and an operation of the second voltage command on the stationary reference frame are executed in the same operation period, and it is also possible to perform the operation of the second voltage command on the stationary reference frame by analog operation while performing the operation of the first voltage command on the stationary reference frame by digital operation. As a result, it is possible to obtain the effects that the total amount of operation can be reduced while maintaining the reliability in current control.

According to the controller for electric power steering according to the second aspect of the invention, it is possible to obtain the effect that the amount of operation performed by the current command calculating means can be reduced, in addition to the same effects as in the controller for an AC rotary machine according to the first aspect of the invention.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIG. 5 is a view for explaining the operation principle of the controller for an AC rotary machine according to the first embodiment;

FIG. 6 is a chart showing an example of time chart in the controller for an AC rotary machine according to the first embodiment;

FIG. 7 is a block diagram showing the entire configuration of a controller for an AC rotary machine according to a second embodiment of the invention;

FIG. 10 is a chart showing an example of time chart in the controller for an AC rotary machine according to the second embodiment;

FIG. 18 is a chart showing an example of time chart in the controller for an AC rotary machine according to the fourth embodiment;

DESCRIPTION OF THE PREFERRED EMBODIMENTS

Hereinafter, a controller for an AC rotary machine and a controller for electric power steering according to embodiments of the invention will be described with reference to the accompanying drawings.

First Embodiment

Figure 1:
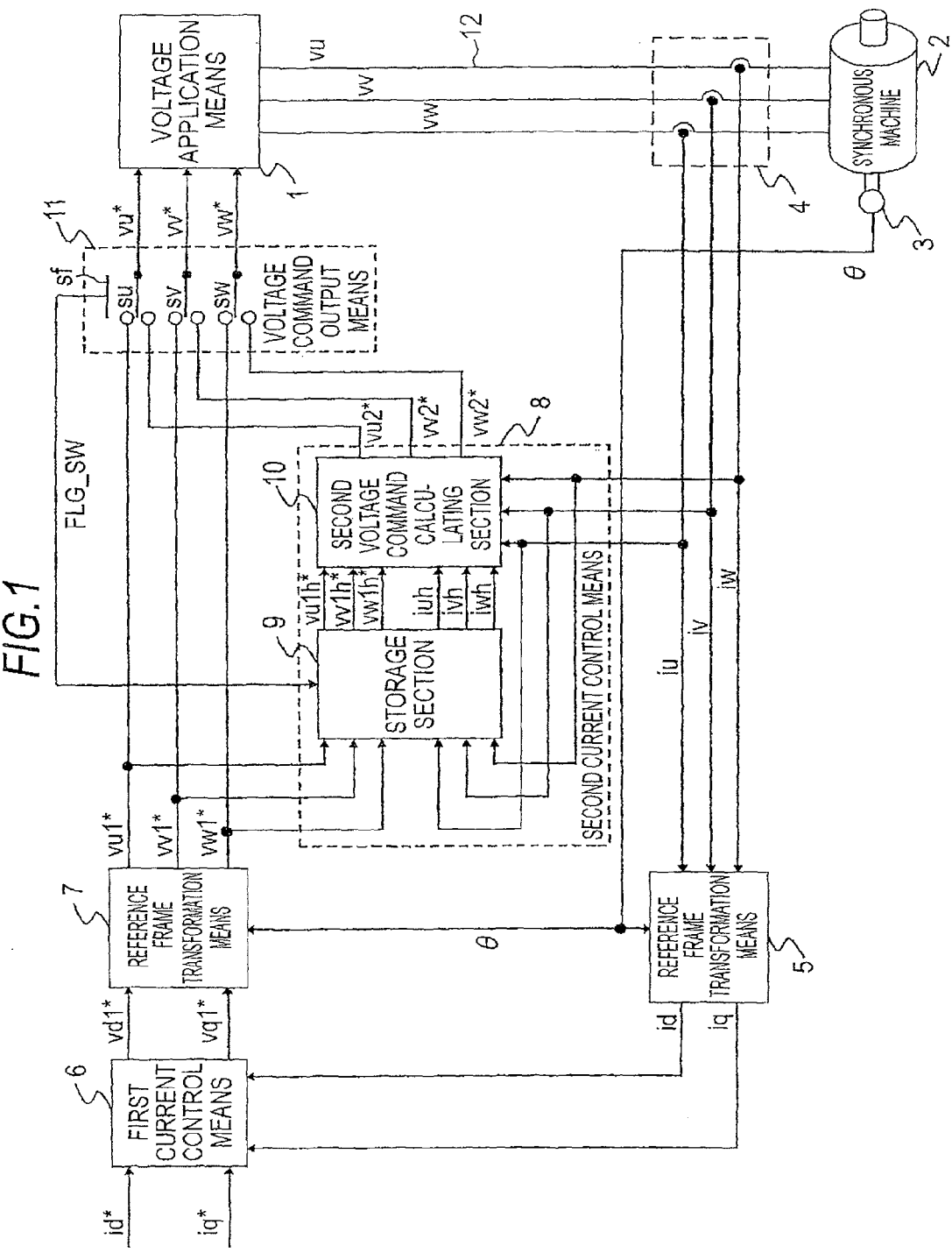
FIG. 1 is a block diagram showing the entire configuration of a controller for an AC rotary machine according to a first embodiment of the invention.

FIG. 1 is a block diagram showing the entire configuration of a controller for an AC rotary machine according to a first embodiment of the invention.

The controller for an AC rotary machine according to the first embodiment serves to control an AC rotary machine 2 and includes a voltage application means 1, a position detecting means 3, a current detecting means 4, a reference frame transformation means 5, a first current control means 6, a reference frame transformation means 7, a second current control means 8, and a voltage command output means 11.

In the first embodiment, the AC rotary machine 2 is formed by a synchronous machine, for example, a synchronous motor. The current detecting means 4 includes an AD conversion means therein. The position detecting means 3 includes an R/D converter (a resolver/digital converter) therein and outputs the rotation position of the AC rotary machine 2 by a digital signal.

In the first embodiment, the reference frame transformation means 5 and 7, the first current control means 6, the second current control means 8, and the voltage command output means 11 are formed by digital circuits. Specifically, these are formed using a digital microcomputer. In the first embodiment, the three-phase AC reference frame including U, V, and W phases are used as the stationary reference frame.

The voltage application means 1 is connected with the synchronous motor 2 through a three-phase power supply line 12 and applies three-phase alternating current voltages vu, vv, and vw to the synchronous motor 2. The three-phase AC voltages vu, vv, and vw include the u-phase AC voltage vu, the v-phase AC voltage vv, and the w-phase AC voltage vw. The voltage application means 1 receives digital three-phase voltage commands vu*, vv*, and vw* from the voltage command output means 11, converts the internal bus voltage into the three-phase AC voltages vu, vv, and vw on the basis of the three-phase voltage commands vu*, vv*, and vw*, and applies the three-phase AC voltages vu, vv, and vw to the synchronous motor 2. The three phase voltage commands vu*, vv*, and vw* are voltage commands on the stationary reference frame and include the u-phase voltage command vu*, the v-phase voltage command vv*, and the w-phase voltage command vw*.

Since the voltage application means 1 is well known, a detailed explanation thereof will be omitted. The voltage application means 1 is formed using a plurality of semiconductor switches capable of performing ON/OFF controls, and performs ON/OFF control of each semiconductor switch on the basis of the three-phase voltage commands vu*, vv*, and vw*.

In addition, when the voltage application means 1 applies the three-phase AC voltages vu, vv, and vw to the synchronous motor 2, it is preferable that the relative potential difference of the three-phase AC voltages vu, vv, and vw is approximately equal to that of the three-phase voltage commands vu*, vv*, and vw*. In addition, a voltage for improving the voltage use efficiency may be added to each phase in response to the three-phase voltage commands vu*, vv*, and vw*, as is well known. Moreover, it is also possible to add to each phase the ON voltage of each semiconductor switch or the correction voltage caused by dead time and to apply the resulting three-phase AC voltages vu, vv, and vw to the synchronous motor 2.

Specifically, the synchronous motor 2 is formed using a permanent magnet type synchronous motor, such as a surface magnet type synchronous motor or an embedded magnet type synchronous motor. However, it may also be formed using a reluctance synchronous motor, which does not use a magnet for a rotor, or a field winding type synchronous motor, which has a field winding circuit at the secondary side.

The position detecting means 3 detects the rotation position θ of the synchronous motor 2. Since the position detecting means 3 is also well known, a detailed explanation thereof will be omitted. The position detecting means 3 is combined with the rotary shaft of the synchronous motor 2 and generates the rotation position θ of the synchronous motor 2. The rotation position θ is output from the position detecting means 3 as a digital rotation position θ by the R/D converter provided in the position detecting means 3.

The current detecting means 4 is also well known. Accordingly, a detailed explanation thereof will be omitted. The current detecting means 4 is combined with the three-phase power supply line 12 and detects three-phase AC currents, which flow through the synchronous motor 2, on the basis of the three-phase AC voltages vu, vv, and vw, and outputs three-phase detection currents iu, iv, and iw. Although the three-phase detection currents iu, iv, and iw are also detected as analog signals, they are converted into digital signals by the AD conversion means provided in the current detecting means 4 and are then output from the current detecting means 4 as the digital three-phase detection currents iu, iv, and iw.

Moreover, although the current detecting means 4 detects the three-phase detection currents iu, iv, and iw from the three-phase power supply line 12 which connects the voltage application means 1 with the synchronous motor 2 in the first embodiment, it may be configured to output the three-phase detection currents iu, iv, and iw by detecting the bus current inside the voltage application means 1 as is well known.

The current detecting means 4 outputs the three-phase detection currents iu, iv, and iw at each first operation timing repeated at periods ΔT. The three-phase detection currents iu, iv, and iw are updated at each first operation timing and held until the next first operation timing. The period ΔT of the first timing is called a first operation period. The first operation period ΔT is set to $50 \times 10^{-6}$ to $250 \times 10^{-6}$ (second), for example. The three-phase detection currents iu, iv, and iw are detection currents on the stationary reference frame and include the u-phase detection current iu, the v-phase detection current iv, and the w-phase detection current iw. The three-phase detection currents iu, iv, and iw are supplied to the reference frame transformation means 5 and the second current control means 8.

The position detecting means 3 outputs the rotation position θ at each second operation timing repeated at the second operation periods ΔT1 larger than the first operation period ΔT. The rotation position θ is updated at each second operation timing and is held until the next second operation timing. The rotation position θ is a position signal on the stationary reference frame, and is supplied to the reference frame transformation means 5 and 7.

The second operation period ΔT1 is set to be larger than the first operation period ΔT. In practice, the second operation period ΔT1 is set to 2 to 20 times the first operation period ΔT, for example. However, it is sufficient if the second operation period ΔT1 is larger than the first operation period ΔT, and the second operation period ΔT1 is not limited to the practical value. In addition, preferably, the second operation period ΔT1 is set to the integral multiple of the first operation period ΔT. However, the second operation period ΔT1 is not limited thereto. As a result of setting the second operation period ΔT1 to be larger than the first operation period ΔT, one or more first operation timing is given between the two adjacent second operation timings.

The reference frame transformation means 5 transforms the reference frame of the three-phase detection currents iu, iv, and iw on the basis of arbitrary phase and outputs two-phase detection currents id and iq. In the first embodiment, the arbitrary phase used in the reference frame transformation is given using the rotation position θ output from the position detecting means 3. The reference frame transformation means 5 converts the three-phase detection currents iu, iv, and iw from the current detecting means 4 into the two-phase detection currents id and iq on the basis of the rotation position θ output from the position detecting means 3. The reference frame transformation means 5 outputs the two-phase detection currents id and iq on the basis of the rotation position θ at each second operation timing repeated at the periods ΔT1. The two-phase detection currents id and iq are updated at each second operation timing and is held until the next second operation timing. The two-phase detection currents id and iq are digital detection currents on the rotating reference frame and include the d-axis component id on the d axis and the q-axis component iq on the q axis which are perpendicular to each other.

The first current control means 6 receives two-phase current commands id* and iq* on the rotating reference frame and the two-phase detection currents id and iq on the rotating reference frame. The two-phase current commands id* and iq* are digital current commands on the rotating reference frame which are to be supplied to the synchronous motor 2, are given from the outside, and include the d-axis component id* on the d axis and the q-axis component iq* on the q axis which are perpendicular to each other. The two-phase detection currents id and iq are given from the reference frame transformation means 5 to the first current control means 6. The first current control means 6 outputs digital two-phase voltage commands vd1* and vq1* on the rotating reference frame, as first voltage commands on the rotating reference frame, on the basis of the two-phase current commands id* and iq* on the rotating reference frame and the two-phase detection currents id and iq on the rotating reference frame. The two-phase voltage commands vd1* and vq1* include the d-axis component vd1* on the d axis and the q-axis component vq1* on the q axis which are perpendicular to each other.

The first current control means 6 outputs the two-phase voltage commands vd1* and vq1* at each second operation timing repeated at the second operation periods ΔT1. In other words, the two-phase voltage commands vd1* and vq1* are updated at each second operation timing repeated at the second operation periods ΔT1 and are held until the next second operation timing.

The reference frame transformation means 7 transforms the reference frame of the two-phase voltage commands vd1* and vq1* on the rotating reference frame on the basis of the rotation position θ output from the position detecting means 3, and outputs first three-phase voltage commands vu1*, vv1*, and vw1*. The first three-phase voltage commands vu1*, vv1*, and vw1* are digital voltage commands on the stationary reference frame and include the first u-phase voltage command vu1*, the first v-phase voltage command vv1*, and the first w-phase voltage command vw1*. The first three-phase voltage commands vu1*, vv1*, and vw1* are supplied to the second current control means 8 and the voltage command output means 11.

The rotation position θ is given to the reference frame transformation means 7 at each second operation timing repeated at the second operation periods ΔT1, and the reference frame transformation means 7 outputs the first three-phase voltage commands vu1*, vv1*, and vw1* at each second operation timing. In other words, the first three-phase voltage commands vu1*, vv1*, and vw1* are updated at each second operation timing repeated at the second operation periods ΔT1 and are held until the next second operation timing.

The second current control means 8 generates second three-phase voltage commands vu2*, vv2*, and vw2* on the basis of the first three-phase voltage commands vu1*, vv1*, and vw1* from the reference frame transformation means 7 and the three-phase detection currents iu, iv, and iw from the current detecting means 4.

The voltage command output means 11 selects either the first three-phase voltage commands vu1*, vv1*, and vw1*, which are supplied from the reference frame transformation means 7, or the second three-phase voltage commands vu2*, vv2*, and vw2*, which are supplied from the second current control means 8, and outputs them to the voltage application means 1 as the three-phase voltage commands vu*, vv*, and vw*. The voltage command output means 11 selects the first three-phase voltage commands vu1*, vv1*, and vw1*, which are supplied from the reference frame transformation means 7, at each second operation timing repeated at the second operation periods ΔT1 and selects the second three-phase voltage commands vu2*, vv2*, and vw2*, which are supplied from the second current control means 8, at each first operation timing repeated at the first operation periods ΔT. The three-phase voltage commands vu*, vv*, and vw* are continuously supplied to the voltage application means 1.

The voltage command output means 11 further has a switching flag output section sf. The flag output section sf outputs a switching flag FLG_SW to the second current control means 8 according to the selection state of the voltage command output means 11. The switching flag FLG_SW is switched between TRUE and FALSE. The switching flag FLG_SW is TRUE in a state where the first three-phase voltage commands vu1*, vv1*, and vw1* are selected by the voltage command output means 11, and the switching flag FLG_SW is FALSE in a state where the second three-phase voltage commands vu2*, vv2*, and vw2* are selected by the voltage command output means 11.

Specifically, the second current control means 8 includes a storage section 9 and a second voltage command calculating section 10. The three-phase detection currents iu, iv, and iw output from the current detecting means 4, the first three-phase voltage commands vu1*, vv1*, and vw1* output from the reference frame transformation means 7, and the switching flag FLG_SW output from the voltage command output means 11 are supplied to the storage section 9.

The switching flag FLG_SW becomes TURE at each second operation timing repeated at the second operation periods ΔT1. The storage section 9 stores the first three-phase voltage commands vu1*, vv1*, and vw1*, which are output from the reference frame transformation means 7, and the three-phase detection currents iu, iv, and iw, which are output from the current detecting means 4, when the switching flag FLG_SW becomes TRUE at each second operation timing.

The switching flag FLG_SW becomes FALSE at each first operation timing repeated at the first operation periods ΔT. Since the second operation period ΔT1 is set to be larger than the first operation period ΔT, one or more first operation timing is given between the two adjacent second operation timings. When the switching flag FLG_SW becomes FALSE at each first operation timing, the storage section 9 outputs the first three-phase voltage commands vu1*, vv1*, and vw1*, which are stored at the second operation timing before the first operation timing, as three-phase storage voltage commands vu1$h$*, vv1$h$*, and vw1$h$*and also outputs the three-phase detection currents iu, iv, and iw, which are stored at the second operation timing before the first operation timing, as three-phase storage detection currents iuh, ivh, and iwh.

The three-phase storage voltage commands vu1$h$*, vv1$h$*, and vw1$h$* are digital voltage commands on the stationary reference frame and include the u-phase storage voltage command vu1$h$*, the v-phase storage voltage command vv1$h$*, and the w-phase storage voltage command vw1$h$*. The three-phase storage detection currents iuh, ivh, and iwh are digital detection currents on the stationary reference frame and include the u-phase storage detection current iuh, the v-phase storage detection current ivh, and the w-phase storage detection current iwh.

The three-phase detection currents iu, iv, and iw, which are output from the current detecting means 4, and the three-phase storage detection currents iuh, ivh, and iwh and the three-phase storage voltage commands vu1$h$*, vv1$h$*, and vw1$h$*, which are output from the storage section 9, are supplied to the second voltage command calculating section 10. The second voltage command calculating section 10 outputs the second three-phase voltage commands vu2*, vv2*, and vw2* on the basis of the three-phase storage detection currents iuh, ivh, iwh, the three-phase storage voltage commands vu1$h$*, vv1$h$*, and vw1$h$*, and the three-phase detection currents iu, iv and iw at each first operation timing. In other words, the second three-phase voltage commands vu2*, vv2*, and vw2* are updated at each first operation timing and are held until the next first operation timing. The second three-phase voltage commands vu2*, vv2*, and vw2* are supplied to the voltage command output means 11. The second three-phase voltage commands vu2*, vv2*, and vw2* are digital voltage commands on the stationary reference frame and include the second u-phase voltage command vu2*, the second v-phase voltage command vv2*, and the second w-phase voltage command vw2*.

Specifically, the voltage command output means 11 includes a u-phase switch su, a v-phase switch sv, and a w-phase switch sw. The first u-phase voltage command vu1* and the second u-phase voltage command vu2* are input to the u-phase switch su, and the u-phase switch su outputs either the first u-phase voltage command vu1* or the second u-phase voltage command vu2* as the u-phase voltage command vu*. The First v-phase voltage command vv1* and the second v-phase voltage command vv2* are input to the v-phase switch sv, and the v-phase switch sv outputs either the first v-phase voltage command vv1* or the second v-phase voltage command vv2* as the v-phase voltage command vv*. The first w-phase voltage command vw1* and the second w-phase voltage command vw2* are input to the w-phase switch sw, and the w-phase switch sw outputs either the first w-phase voltage command vw1* or the second w-phase voltage command vw2* as the w-phase voltage command vu*. The switches su, sv, and sw are interlocked with each other. Accordingly, when the voltage command output means 11 selects the first three-phase voltage commands vu1*, vv1*, and vw1*, the switches su, sv, and sw are all switched to select the first three-phase voltage commands vu1*, vv1*, and vw1*. When the voltage command output means 11 selects the second three-phase voltage command vu2*, vv2*, and vw2*, the switches su, sv, and sw are all switched to select the second three-phase voltage commands vu2*, vv2*, and vw2*.

The voltage command output means 11 selects the first three-phase voltage commands vu1*, vv1*, and vw1* at each second operation timing repeated at the second operation periods ΔT1 and outputs them to the voltage application means 1 as the three-phase voltage commands vu*, vv*, and vw*. At each second operation timing, the switches su, sv, and sw select the first u-phase voltage command vu1*, the first v-phase voltage command vv1*, and the first w-phase voltage command vw1*, respectively, which are updated at the second operation timing. The voltage command output means 11 selects the first three-phase voltage commands vu1*, vv1*, and vw1* continuously until the next first operation timing is given subsequent to the second operation timing. The voltage command output means 11 selects the second three-phase voltage commands vu2*, vv2*, and vw2* when the first operation timing is given subsequent to the second operation timing. The voltage command output means 11 selects the second three-phase voltage commands vu2*, vv2*, and vw2* continuously until the first operation timing or the second operation timing is given subsequent to the first operation timing. When the first operation timing is given again subsequent to the first operation timing, the voltage command output means 11 selects the second three-phase voltage commands vu2*, vv2*, and vw2* again. The state where the second three-phase voltage commands vu2*, vv2*, and vw2* are selected is continued until the first operation timing or the second operation timing is given next. Since one or more first operation timings are included between the two adjacent second operation timings, the switches su, sv, and sw select the second u-phase voltage command vu2*, the second v-phase voltage command vv2*, and the second w-phase voltage command vw2*, which are updated at the first operation timing, at each first operation timing.

Figure 2:
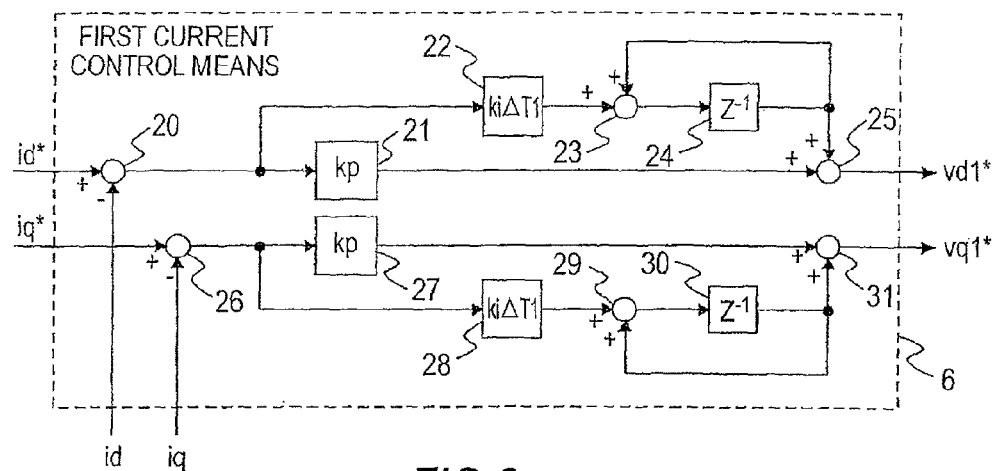
FIG. 2 is a block diagram showing the internal configuration of a first current control means in the first embodiment.

FIG. 2 is a block diagram showing the internal configuration of the first current control means 6 in the first embodiment. The first current control means 6 includes subtracters 20 and 26, proportional gain multipliers 21 and 27, integral gain multipliers 22 and 28, adders 23 and 29, delay and hold operators 24 and 30, and adders 25 and 31.

The subtracter 20 subtracts the d-axis component id of the two-phase detection currents id and iq on the rotating reference frame from the d-axis component id* of the two-phase current commands id* and iq* on the rotating reference frame, and outputs the d-axis current deviation (id*-id) to the proportional gain multiplier 21. The proportional gain multiplier 21 multiplies the d-axis current deviation (id*-id) by the proportional gain kp and outputs it. The integral gain multiplier 22 multiplies the d-axis current deviation (id*-id) by kiΔT1 and outputs it. The adder 23 adds the output of the integral gain multiplier 22 and the output of the delay and hold operator 24 and outputs the result to the delay and hold operator 24. The delay and hold operator 24 delays the input by delayed time interval, which is equivalent to the second operation period ΔT1, and holds it.

By connecting the integral gain multiplier 22, the adder 23, and the delay and hold operator 24 to each other as shown in FIG. 2, the delay and hold operator 24 outputs a result obtained by multiplying the d-axis current deviation (id*-id) by Ki and integrating it. The adder 25 adds the output of the proportional gain multiplier 21 and the output of the delay and hold operator 24 and outputs the d-axis component vd1* of the two-phase voltage commands vd1* and vq1* on the rotating reference frame. The d-axis component vd1* of the two-phase voltage commands vd1* and vq1*on the rotating reference frame is equivalent to a result obtained by proportional integral of the d-axis current deviation (id*-id) output from the subtracter 20.

Similarly, the subtracter 26 subtracts the q-axis component iq of the two-phase detection currents id and iq on the rotating reference frame from the q-axis component iq* of the two-phase current commands id* and iq* on the rotating reference frame, and outputs the q-axis current deviation (iq*-iq) to the proportional gain multiplier 27. The proportional gain multiplier 27 multiplies the q-axis current deviation (iq*-iq) by the proportional gain kp and outputs the result. The integral gain multiplier 28 multiplies the q-axis current deviation (iq*-iq) by kiΔT1 and outputs it. The adder 29 adds the output of the integral gain multiplier 28 and the output of the delay and hold operator 30 and outputs the result to the delay and hold operator 30. The delay and hold operator delays the input by delayed time interval, which is equivalent to the second operation period ΔT1, and holds it.

By connecting the integral gain multiplier 28, the adder 29, and the delay and hold operator 30 to each other as shown in FIG. 2, the delay and hold operator 30 outputs a result obtained by multiplying the q-axis current deviation (iq*-iq) by Ki and integrating it. The adder 31 adds the output of the proportional gain multiplier 27 and the output of the delay and hold operator 30 and outputs the q-axis component vq1* of the two-phase voltage commands vd1* and vq1*on the rotating reference frame. The q-axis component vq1* of the two-phase voltage commands vd1* and vq1*on the rotating reference frame is equivalent to a result obtained by proportional integral of the q-axis current deviation (iq*-iq) output from the subtracter 26.

Figure 3:
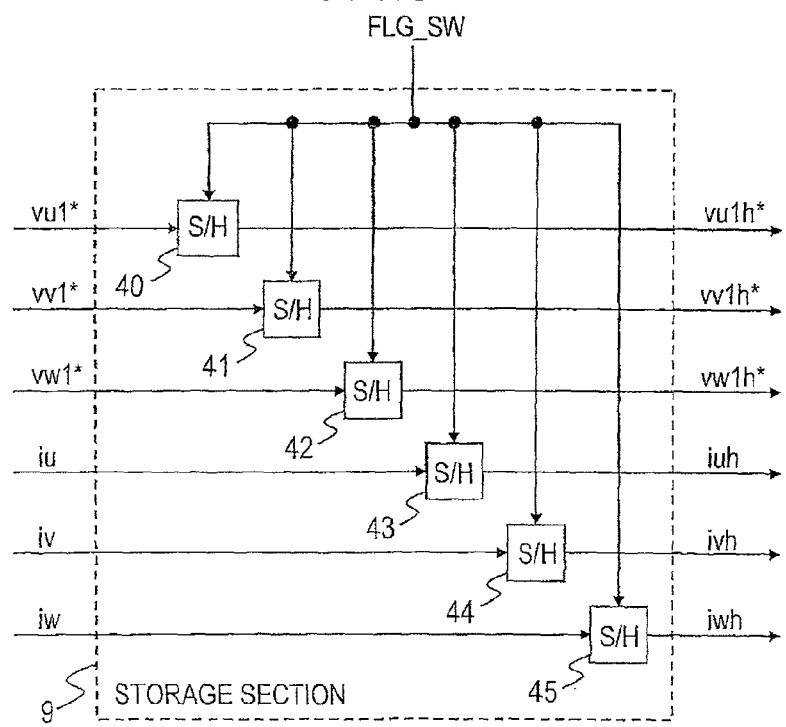
FIG. 3 is a block diagram showing the internal configuration of a storage section in the first embodiment.

FIG. 3 is a block diagram showing the internal configuration of the storage section 9 in the first embodiment. As shown in FIG. 3, the storage section 9 has sample and hold parts 40 to 45. The sample and hold parts 40 to 45 are controlled by a switching flag FLG_SW output from the switching flag output section sf of the voltage command output means 11.

The sample and hold part 40 samples and holds the first u-phase voltage command vu1* when the switching flag FLG_SW is set to TRUE, and stores and holds the first u-phase voltage command vu1* as the u-phase storage voltage command vu1h*. The sample and hold part 40 outputs the u-phase storage voltage command vu1h*, which is stored and held, when the switching flag FLG_SW is set to FALSE.

Similarly, the sample and hold part 41 samples and holds the first v-phase voltage command vv1* when the switching flag FLG_SW is set to TRUE, and stores and holds the first v-phase voltage command vv1* as the v-phase storage voltage command vv1h*. The sample and hold part 41 outputs the v-phase storage voltage command vv1h*, which is stored and held, when the switching flag FLG_SW is set to FALSE.

Similarly, the sample and hold part 42 samples and holds the first w-phase voltage command vw1* when the switching flag FLG_SW is set to TRUE, and stores and holds the first w-phase voltage command vw1* as the w-phase storage voltage command vw1h*. The sample and hold part 42 outputs the w-phase storage voltage command vw1h*, which is stored and held, when the switching flag FLG_SW is set to FALSE.

The sample and hold part 43 samples and holds the u-phase detection current iu when the switching flag FLG_SW is set to TRUE, and stores and holds the u-phase detection current iu as the u-phase storage detection current iuh. The sample and hold part 43 outputs the u-phase storage detection current iuh, which is stored and held, when the switching flag FLG_SW is set to FALSE.

Similarly, the sample and hold part 44 samples and holds the v-phase detection current iv when the switching flag FLG_SW is set to TRUE, and stores and holds the v-phase detection current iv as the v-phase storage detection current ivh. The sample and hold part 44 outputs the v-phase storage detection current ivh, which is stored and held, when the switching flag FLG_SW is set to FALSE.

Similarly, the sample and hold part 45 samples and holds the w-phase detection current iw when the switching flag FLG_SW is set to TRUE, and stores and holds the w-phase detection current iw as the w-phase storage detection current iwh. The sample and hold part 45 outputs the w-phase storage detection current iwh, which is stored and held, when the switching flag FLG_SW is set to FALSE.

Figure 4:
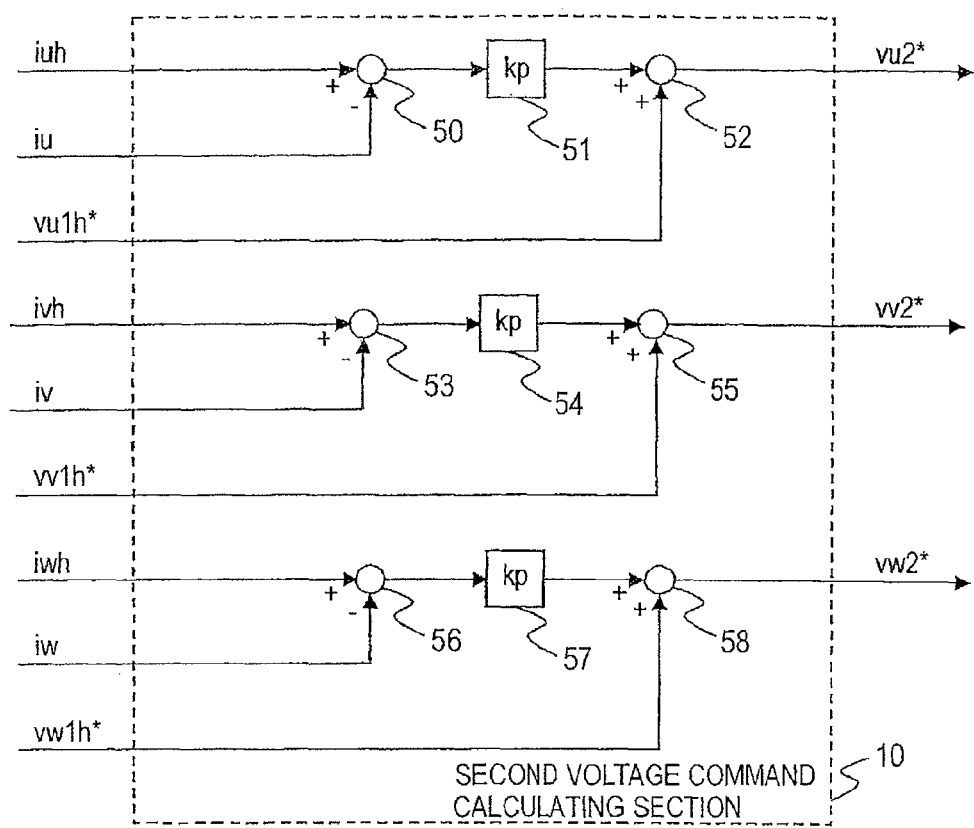
FIG. 4 is a block diagram showing the internal configuration of a second voltage command calculating section in the first embodiment.

FIG. 4 is a block diagram showing the internal configuration of the second voltage command calculating section 10 in the first embodiment. As shown in FIG. 4, the second voltage command calculating section 10 includes subtracters 50, 53, and 56, proportional gain multipliers 51, 54, and 57, and adders 52, 55, and 58.

The subtracter 50, the proportional gain multiplier 51, and the adder 52 output the second u-phase voltage command vu2* on the basis of the u-phase storage detection current iuh, the u-phase detection current iu, and the u-phase storage voltage command vu1$h$*. Specifically, the subtracter 50 subtracts the u-phase detection current iu output from the current detecting means 4 from the u-phase storage detection current iuh output from the storage section 9 and outputs the deviation (iuh-iu) to the proportional gain multiplier 51. The proportional gain multiplier 51 multiplies the output of the subtracter 50 by the proportional gain kp and outputs the result to the adder 52. The deviation (iuh-iu) between the u-phase storage detection current iuh and the u-phase detection current iu is the amount of variation in the u-phase detection current on the stationary reference frame. Here, the amount of variation in the u-phase detection current is multiplied by the proportional gain kp, and the result is output to the adder 52. The adder 52 adds the u-phase storage voltage command vu1$h$*, which is output from the storage section 9, to the output of the proportional gain multiplier 51, and outputs the second u-phase voltage command vu2*.

Similarly, the subtracter 53, the proportional gain multiplier 54, and the adder 55 output the second v-phase voltage command vv2* on the basis of the v-phase storage detection current ivh, the v-phase detection current iv, and the v-phase storage voltage command vv1$h$*. Specifically, the subtracter 53 subtracts the v-phase detection current iv output from the current detecting means 4 from the v-phase storage detection current ivh output from the storage section 9 and outputs the deviation (ivh-iv) to the proportional gain multiplier 54. The proportional gain multiplier 54 multiplies the output of the subtracter 53 by the proportional gain kp and outputs the result to the adder 55. The deviation (ivh-iv) between the v-phase storage detection current ivh and the v-phase detection current iv is the amount of variation in the v-phase detection current on the stationary reference frame. Here, the amount of variation in the v-phase detection current is multiplied by the proportional gain kp, and the result is output to the adder 55. The adder 55 adds the v-phase storage voltage command vv1$h$*, which is output from the storage section 9, to the output of the proportional gain multiplier 54, and outputs the second v-phase voltage command vv2*.

Similarly, the subtracter 56, the proportional gain multiplier 57, and the adder 58 output the second w-phase voltage command vw2* on the basis of the w-phase storage detection current iwh, the w-phase detection current iw, and the w-phase storage voltage command vw1$h$*. Specifically, the subtracter 56 subtracts the w-phase detection current iw output from the current detecting means 4 from the w-phase storage detection current iwh output from the storage section 9 and outputs the deviation (iwh-iw) to the proportional gain multiplier 57. The proportional gain multiplier 57 multiplies the output of the subtracter 56 by the proportional gain kp and outputs the result to the adder 58. The deviation (iwh-iw) between the w-phase storage detection current iwh and the w-phase detection current iw is the amount of variation in the w-phase detection current on the stationary reference frame. Here, the amount of variation in the w-phase detection current is multiplied by the proportional gain kp, and the result is output to the adder 58. The adder 58 adds the w-phase storage voltage command vw1$h$*, which is output from the storage section 9, to the output of the proportional gain multiplier 57, and outputs the second w-phase voltage command vw2*.

Now, the operation principle of the controller for the AC rotary machine according to the first embodiment will be described. FIG. 5 is a view for explaining the operation principle of the controller for the AC rotary machine according to the first embodiment. In FIG. 5, the horizontal axis indicates time [second], and the vertical axis indicates a current.

Time 0, $\Delta T$, $2\Delta T$, $3\Delta T$, and $4\Delta T$ are plotted on the horizontal axis in FIG. 5. A characteristic L1 indicating a current command i* and a characteristic L2 indicating a detection current i are shown above the horizontal axis. i*(k), i*(k+1), i*(k+2), i*(k+3), and i*(k+4) are shown on the characteristic L1 indicating the current command i*. i(k), i(k+1), i(k+2), i(k+3), and i(k+4) are shown on the characteristic L2 indicating the detection current i.

In FIG. 5, a current command at time 0 is set to i*(k), a detection current at time 0 is set to i(k), a current command at time $\Delta T$ is set to i*(k+1), and a detection current at time $\Delta T$ is set to i(k+1). Similarly, a current command at time $2\Delta T$ is set to i*(k+2) and a detection current at time $2\Delta T$ is set to i(k+2), a current command at time $3\Delta T$ is set to i*(k+3) and a detection current at time $3\Delta T$ is set to i(k+3), and a current command at time $4\Delta T$ is set to i*(k+4) and a detection current at time $4\Delta T$ is set to i(k+4).

The first operation period $\Delta T$ is shown between time 0, $\Delta T$, $2\Delta T$, $3\Delta T$, and $4\Delta T$.

In addition, the characteristic L1 is parallel to the horizontal axis, and the current commands i*(k), i*(k+1), i*(k+2), i*(k+3), and i*(k+4) between time 0 to $4\Delta T$ are assumed to be constant. The characteristic L2 is assumed to gradually increase from time 0 toward the characteristic L1.

In addition, the current command i* expressed by the characteristic L1 in FIG. 5 is assumed to be applied to both the d-axis current command id* and the q-axis current command iq*. In addition, the detection current i expressed by the characteristic L2 in FIG. 5 is assumed to be applied to both the d-axis detection current id and the q-axis detection current iq.

If the deviation between i*(k) and i(k) at time 0 is defined as $\Delta i(k)$, the following expression (1) is satisfied.

$$\Delta i(k) = i^*(k) - i(k) \tag{1}$$

The deviation $\Delta i(k+1)$ between i*(k+1) and i(k+1) at time $\Delta T$ satisfies the following expression (2).

$$\Delta i(k+1) = i^*(k+1) - i(k+1) \tag{2}$$

Here, since the current command between time 0 to time $4\Delta T$ is constant, the following expression (3) is obtained by substituting i*(k) into i*(k+1) in expression (2).

$$\Delta i(k+1) = i^*(k) - i(k+1) \tag{3}$$

Then, if expression (1) is substituted into expression (3) to eliminate i*(k), the following expression (4) is obtained.

$$\Delta i(k+1) = i(k) - i(k+1) + \Delta i(k) \tag{4}$$

Expression (4) means "deviation $\Delta i(k+1)$ at time $\Delta T$ is obtained by calculating the deviation $\{i(k)-i(k+1)\}$ between the detection current i(k) at time 0 and the detection current i(k+1) at time $\Delta T$ and adding the deviation $\Delta i(k)$ at time 0 to the deviation".

Similarly, the deviation $\Delta i(k+2)$ between i*(k+2) and i(k+2) at time $2\Delta T$ satisfies the following expression (5)

$$\Delta i(k+2) = i^*(k+2) - i(k+2) \tag{5}$$

Here, since the current command between time 0 to time $4\Delta T$ is constant, the following expression (6) is obtained by substituting i*(k) into i*(k+2) in expression (5) and then substituting expression (1) into expression (3) to eliminate i*(k).

$$\Delta i(k+2) = i(k) - i(k+2) + \Delta i(k) \tag{6}$$

Expression (6) means "deviation $\Delta i(k+2)$ at time $2\Delta T$ (second) is obtained by calculating the deviation $\{i(k)-i(k+2)\}$ between the detection current i(k) at time 0 and the detection current i(k+2) at time $2\Delta T$ and adding the deviation $\Delta i(k)$ at time 0 to the deviation".

If the relationship of expressions (4) and (6) is taken into consideration, the following expressions (7) and (8) can be derived.

$$\Delta i(k+3) = i(k) - i(k+3) + \Delta i(k) \quad (7)$$

$$\Delta i(k+4) = i(k) - i(k+4) + \Delta i(k) \quad (8)$$

Here, the following expression (9) is obtained by multiplying both sides of expression (4) by the proportional gain kp and adding the arbitrary constant C to both sides.

$$kp\Delta i(k+1) + C = kp\{(k) - i(k+1)\} + \{kp\Delta i(k) + C\} \quad (9)$$

By regarding the output of a proportional controller at time $\Delta T$ as $kp\Delta i(k+1)$, which is the first term of the left side in expression (9), and regarding the output of an integral controller at time $\Delta T$ as C, which is the second term of the left side in expression (9), the left side in expression (9) may be regarded as the "sum of the output of the proportional controller and the output of the integral controller at time $\Delta T$". Moreover, since the first operation period $\Delta T$ is shorter than the second operation period $\Delta T1$ and the output of the integral controller does not change, the right side in expression (9) may be regarded as the value obtained by adding the "sum of the output of the proportional controller and the output of the integral controller at time 0" to the "value obtained by multiplying the deviation $\{i(k) - i(k+1)\}$ between the detection current $i(k)$ at time 0 and the detection current $i(k+1)$ at time $\Delta T$ by kp".

Moreover, expressions (10), (11), and (12) are obtained by expanding expressions (6), (7), and (8) like expression (9).

$$kp\Delta i(k+2) + C = kp\{i(k) - i(k+2)\} + \{kp\Delta i(k) + C\} \quad (10)$$

$$kp\Delta i(k+3) + C = kp\{i(k) - i(k+3)\} + \{kp\Delta i(k) + C\} \quad (11)$$

$$kp\Delta i(k+4) + C = kp\{i(k) - i(k+4)\} + \{kp\Delta i(k) + C\} \quad (12)$$

First terms of left sides in expressions (10) to (12) may be regarded as outputs of the proportional controller at time $2\Delta T$, $3\Delta T$, and $4\Delta T$, respectively. Moreover, second terms of the left sides in expressions (10) to (12) may be regarded as outputs of the integral controller at time $2\Delta T$, $3\Delta T$, and $4\Delta T$, respectively. Moreover, the right side in expression (10) may be regarded as the value obtained by adding the "sum of the output of the proportional controller and the output of the integral controller at time 0" to the "value obtained by multiplying the deviation between the detection current $i(k)$ at time 0 and the detection current $i(k+2)$ at time $2\Delta T$ by kp". Moreover, the right side in expression (11) may be regarded as the value obtained by adding the "sum of the output of the proportional controller and the output of the integral controller at time 0" to the "value obtained by multiplying the deviation between the detection current $i(k)$ at time 0 and the detection current $i(k+3)$ at time $3\Delta T$ by kp", and the right side in expression (12) may be regarded as the value obtained by adding the "sum of the output of the proportional controller and the output of the integral controller at time 0" to the "value obtained by multiplying the deviation between the detection current $i(k)$ at time 0 and the detection current $i(k+4)$ at time $4\Delta T$ by kp".

Here, taking into consideration that the value on the stationary reference frame and the value on the rotating reference frame are only different in the reference frame observed but are the same in essence, the configuration of the first embodiment shown in FIGS. 1 to 4 is checked using expressions (9) to (12).

When the voltage command output means 11 selects the first three-phase voltage commands vu1*, vv1*, and vw1* as the three-phase voltage commands vu*, vv*, and vw* on the stationary reference frame and outputs them to the voltage application means 1, the first current control means 6 calculates the two-phase voltage commands vd* and vq* on the rotating reference frame on the basis of the two-phase current commands id* and iq* on the rotating reference frame and the two-phase detection currents id and iq on the rotating reference frame output from the reference frame transformation means 5, and the reference frame transformation means 7 converts the two-phase voltage commands vd* and vq* on the rotating reference frame into the first three-phase voltage commands vu1*, vv1*, and vw1* on the stationary reference frame and outputs them.

The first current control means 6 adds the integral values of the deviations (id*-id) and (iq*-iq) on the rotating reference frame to the values proportional to the deviations (id*-id) and (iq*-iq) between the current commands id* and iq* on the rotating reference frame and the detection currents id and iq on the rotating reference frame. That is, in the first current control means 6, the proportional gain multiplier 21 calculates the value equivalent to $kp\Delta i(k)$ in the second term of the right side in each of the expressions (9) to (12), and the integral gain multiplier 22, the adder 23, and the delay and hold operator 24 calculate the value equivalent to C in the second term of the right side in each of the expressions (9) to (12).

Similarly, the proportional gain multiplier 27 calculates the value equivalent to $kp\Delta i(k)$ in the second term of the right side in each of the expressions (9) to (12), and the integral gain multiplier 28, the adder 29, and the delay and hold operator 30 calculate the value equivalent to C in the second term of the right side in each of the expressions (9) to (12).

Moreover, when the voltage command output means 11 selects the second three-phase voltage commands vu2*, vv2*, and vw2* as the three-phase voltage commands vu*, vv*, and vw* on the stationary reference frame and outputs them to the voltage application means 1, the second voltage command calculating section 10 calculates the second three-phase voltage commands vu2*, vv2*, and vw2* on the basis of the three-phase storage voltage commands vu1h*, vv1h*, and vw1h* and the three-phase storage detection currents iuh, ivh, and iwh from the storage section 9 and the three-phase detection currents iu, iv, and iw from the current detecting means 4.

The storage section 9 stores, as the three-phase storage detection currents iuh, ivh, and iwh on the stationary reference frame, the three-phase detection currents iu, iv, and iw on the stationary reference frame when the voltage command output means 11 has selected the first three-phase voltage commands vu1*, vv1*, and vw1* on the stationary reference frame as the three-phase voltage commands vu*, vv*, and vw* on the stationary reference frame. The three-phase storage detection currents iuh, ivh, and iwh are the values equivalent to $i(k)$ in first terms of the right sides in expressions (9) to (12), respectively.

In addition, the storage section 9 stores, as the three-phase storage voltage commands vu1h*, vv1h*, and vw1h* on the stationary reference frame, the first three-phase voltage commands vu1*, vv1*, and vw1* on the stationary reference frame when the voltage command output means 11 has selected the first three-phase voltage commands vu1*, vv1*, and vw1* on the stationary reference frame as the three-phase voltage commands vu*, vv*, and vw* on the stationary reference frame. The three-phase storage voltage commands vu1h*, vv1h*, and vw1h* are the values equivalent to $\{kp\Delta i(k) + C\}$ in second terms of the right sides in expressions (9) to (12), respectively.

In the second voltage command calculating section 10, the subtracter 50 subtracts the u-phase detection current iu from the u-phase storage detection current iuh and the proportional gain multiplier 51 multiplies the deviation (iuh-iu) by kp. The output of the proportional gain multiplier 51 is a value equivalent to the first term of the right side in each of the expressions (9) to (12).

In addition, the adder 52 adds the value, which is equivalent to the first term of the right side in each of the expressions (9) to (12), and the value, which is equivalent to the second term of the right side in each of the expressions (9) to (12), and outputs the second u-phase voltage command vu2\*.

Similarly, the outputs of the proportional gain multipliers 54 and 57 are the values equivalent to the first term of the right side in each of the expressions (9) to (12). The adders 55 and 58 add the value, which is equivalent to the first term of the right side in each of the expressions (9) to (12), and the value, which is equivalent to the second term of the right side in each of the expressions (9) to (12), and output the second v-phase voltage command vv2\* and the second w-phase voltage command vw2\*, respectively.

Here, when the voltage command output means 11 selects the first three-phase voltage commands vu1\*, vv1\*, and vw1\* as the three-phase voltage commands vu\*, vv\*, and vw\* on the stationary reference frame, the operation result of the second voltage command calculating section 10 is not reflected. Accordingly, the operation of the second voltage command calculating section 10 can be omitted.

In addition, when the voltage command output means 11 selects the second three-phase voltage commands vu2\*, vv2\*, and vw2\* as the three-phase voltage commands vu\*, vv\*, and vw\* on the stationary reference frame, the operation results of the reference frame transformation means 5 and 7 and the first current control means 6 are not reflected. Accordingly, the operations of the reference frame transformation means 5 and 7 and the first current control means 6 can be omitted.

FIG. 6 is a chart showing an example of time chart in the controller for the AC rotary machine according to the first embodiment. The time chart shown in FIG. 6 is a time chart when the second operation period $\Delta T1$ is set to 5 times the first operation period $\Delta T$ and the voltage command output means 11 selects the first three-phase voltage commands vu1\*, vv1\*, and vw1\* as the three-phase voltage commands vu\*, vv\*, and vw\* on the stationary reference frame at the rate of one period in five periods of the first operation period $\Delta T$, that is, at the rate of one period in $5\Delta T$, in the first embodiment.

In FIG. 6, time [second] is shown in the (a) column, and the time includes 0, $\Delta T$, $2\Delta T$, . . . , $12\Delta T$. Time 0, $5\Delta T$, and $10\Delta T$ are second operation timings repeated at the second operation periods $\Delta T1$, and time $\Delta T$, $2\Delta T$, $3\Delta T$, $4\Delta T$, $6\Delta T$, $7\Delta T$, $8\Delta T$, $9\Delta T$, $11\Delta T$, and $12\Delta T$ are first operation timings repeated at the first operation periods $\Delta T$. Between the second operation timings 0 and $5\Delta T$, the four first operation timings $\Delta T$, $2\Delta T$, $3\Delta T$, and $4\Delta T$ are included. Also between the second operation timings $5\Delta T$ and $10\Delta T$, the four first operation timings $6\Delta T$, $7\Delta T$, $8\Delta T$, and $9\Delta T$ are included.

In the (b) column of FIG. 6, the execution state of the reference frame transformation means 5 is shown corresponding to each time 0, $\Delta T$, $2\Delta T$, . . . , $12\Delta T$ in the (a) column. In the (c) column, the execution state of the first current control means 6 is shown corresponding to each time 0, $\Delta T$, $2\Delta T$, . . . , $12\Delta T$ in the (a) column. In the (d) column, the execution state of the reference frame transformation means 7 is shown corresponding to each time 0, $\Delta T$, $2\Delta T$, . . . , $12\Delta T$ in the (a) column. As is apparent from the (b), (c), and (d) columns, the reference frame transformation means 5, the first current control means 6, and the reference frame transformation means 7 are executed at time 0, $5\Delta T$, and $10\Delta T$, but are not executed at other times.

In the (e) column of FIG. 6, the operating state of the storage section 9 is shown corresponding to each time 0, $\Delta T$, $2\Delta T$, . . . , $12\Delta T$ in the (a) column. As is apparent from the (e) column, in the storage section 9, a storage operation is performed at time 0 and a hold operation for holding the storage value, which is stored at time 0, is performed from time $\Delta T$ subsequent to time 0 to time $4\Delta T$. Similarly, in the storage section 9, the storage operation is performed at time $5\Delta T$ and the hold operation for holding the storage value, which is stored at time $5\Delta T$, is performed from time $6\Delta T$ subsequent to time $5\Delta T$ to time $9\Delta T$. Moreover, in the storage section 9, the storage operation is performed at time $10\Delta T$ and the hold operation for holding the storage value, which is stored at time $10\Delta T$, is performed from time $11\Delta T$ subsequent to time $10\Delta T$ to time $12\Delta T$.

In the (f) column of FIG. 6, the execution state of the second voltage command calculating section 10 is shown corresponding to each time 0, $\Delta T$, $2\Delta T$, . . . , $12\Delta T$ in the (a) column. As is apparent from the (f) column, the second voltage command calculating section 10 is executed at each first operation timing of time $\Delta T$ to $4\Delta T$, $6\Delta T$ to $9\Delta T$, $11\Delta T$, and $12\Delta T$, but is not executed at second operation timing of time 0, $5\Delta T$, and $10\Delta T$.

In the (g) column of FIG. 6, it is shown which of the first three-phase voltage commands vu1\*, vv1\*, and vw1\* and the second three-phase voltage commands vu2\*, vv2\*, and vw2\* were selected as the three-phase voltage commands vu\*, vv\*, and vw\* output from the voltage command output means 11, corresponding to each time 0, $\Delta T$, $2\Delta T$, . . . , $12\Delta T$ in the (a) column. In the (g) column, the "first voltage command" indicates the first three-phase voltage commands vu1\*, vv1\*, and vw1\*, and the "second voltage command" indicates the second three-phase voltage commands vu2\*, vv2\*, and vw2\*.

In addition, time after time $12\Delta T$ is omitted in FIG. 6. However, from time $10\Delta T$, the operations described from time 0 to time $9\Delta T$ are repeatedly performed.

As can be understood from the time chart shown in FIG. 6, the voltage command output means 11 selects the first three-phase voltage commands vu1\*, vv1\*, and vw1\* at the rate of one period in five periods of the first operation period $\Delta T$ and selects the second three-phase voltage commands vu2\*, vv2\*, and vw2\* for the remaining four periods.

The storage section 9 performs a storage operation at the rate of one period in five periods of the first operation period $\Delta T$ and holds the stored thing for the remaining four periods.

In addition, the reference frame transformation means 5 and 7 and the first current control means 6 may be executed only at the rate of one period in five periods of the first operation period $\Delta T$, and the second voltage command calculating section 10 is executed for the remaining four periods.

In addition, the operation of the second voltage command calculating section 10 is to only add the three-phase storage voltage commands iu1$h$\*, iv1$h$\*, and iw1$h$\*, which are output from the storage section 9, to the result obtained by subtracting the three-phase detection currents iu, iv, and iw, which are output from the current detecting means 4, from the three-phase storage detection currents iuh, ivh, and iwh output from the storage section 9. Accordingly, the amount of operation of the second voltage command calculating section 10 is smaller than the operation amount of the reference frame transformation means 5 and 7 and the first current control means 6.

In addition, although the voltage command output means 11 selects the first three-phase voltage commands vu1\*, vv1*, and vw1* as the three-phase voltage commands vu*, vv*, and vw* on the stationary reference frame at the rate of one period in five periods of the first operation period ΔT in the first embodiment, the voltage command output means 11 may select the first three-phase voltage commands vu1*, vv1*, and vw1* at the rate of one period in ten periods of the first operation period ΔT or may select the first three-phase voltage commands vu1*, vv1*, and vw1* at the rate of two periods in five periods of the first operation period ΔT. That is, the voltage command output means 11 may select the first three-phase voltage commands vu1*, vv1*, and vw1* at the predetermined rate with respect to the first operation period ΔT.

In the case where the period of proportional operation is set to ΔT as described above, in a known controller for an AC rotary machine, it was necessary to execute the operations equivalent to the reference frame transformation means 5 and 7 and the first current control means 6 every ΔT. In the controller for an AC rotary machine according to the first embodiment, however, the operations of the reference frame transformation means 5 and 7 and the first current control means 6 can be executed only at the rate of one period in several periods of the period ΔT. Accordingly, the operations of the reference frame transformation means 5 and 7 and the first current control means 6 can be omitted for the remaining periods. As a result, an effect is obtained in which a load increase in the operation performed by a digital microcomputer and the like can be suppressed even if the operation period of proportional operation is made short. Moreover, by making the operation period of reference frame transformation longer than the period for which the voltage command on the stationary reference frame output from the voltage command output means 11 is updated, an effect is obtained in which an operation load increase caused by reference frame transformation can be suppressed in at least one of the reference frame transformation means 5 and the reference frame transformation means 7.

Moreover, although the current commands id* and iq* on the rotating reference frame are input to the first current control means 6 in the controller for the AC rotary machine according to the first embodiment, it is not necessary to input a current command specially when the second current control means 8 calculates the second three-phase voltage commands vu2*, vv2*, and vw2*. Accordingly, it is not necessary to perform reference frame transformation of the current command on the rotating reference frame to the current command on the stationary reference frame for the operation of the second three-phase voltage commands vu2*, vv2*, and vw2* using the second current control means. In other words, the controller for the AC rotary machine according to the first embodiment is advantageous in that the operation load when performing an operation using a digital microcomputer and the like can be reduced while maintaining the highly reliable current control performance against disturbance, which is caused by variation in the power supply voltage or the like, by making the operation period of proportional operation short.

Second Embodiment

When an AC rotary machine is rotating, an induced voltage of the AC rotary machine on the stationary reference frame and a current of the AC rotary machine on the stationary reference frame change at a basic frequency. In the current of the AC rotary machine on the stationary reference frame, a current other than the basic wave component becomes a cause of driving sound of the AC rotary machine, electromagnetic noise, torque ripple, or rotation unevenness. Since this may cause the loss of the AC rotary machine or may increase the generation of heat, it is desirable that the current on the stationary reference frame is close to the basic wave component.

In the controller for the AC rotary machine according to the first embodiment, the storage section 9 holds the three-phase storage detection currents iuh, ivh, and iwh on the stationary reference frame and the three-phase storage voltage commands vu1$h$*, vv1$h$*, and vw1$h$* on the stationary reference frame during a period for which the voltage command output means 11 selects the second three-phase voltage commands vu2*, vv2*, and vw2*.

Moreover, in the first embodiment, it has been assumed that variations of the induced voltage and the phase current of the AC rotary machine with respect to the basic wave period are small during a period for which the storage section 9 holds the three-phase storage detection currents iuh, ivh, and iwh and the three-phase storage voltage commands vu1$h$*, vv1$h$*, and vw1$h$*, and accordingly, the induced voltage and the current of the AC rotary machine 2 do not change in this period.

In the controller for the AC rotary machine according to the second embodiment, taking into consideration that the induced voltage of the AC rotary machine on the stationary reference frame and the current of the AC rotary machine on the stationary reference frame change minutely even during a period for which the storage section 9 holds the three-phase storage detection currents iuh, ivh, and iwh and the three-phase storage voltage commands vu1$h$*, vv1$h$*, and vw1$h$*, the current of the AC rotary machine on the stationary reference frame is made smooth also during the period for which the storage section 9 holds the three-phase storage detection currents iuh, ivh, and iwh and the three-phase storage voltage commands vu1$h$*, vv1$h$*, and vw1$h$*. The controller for the AC rotary machine according to the second embodiment will be described. Also in the second embodiment, the three-phase AC reference frame including U, V, and W phases are used as the stationary reference frame.

FIG. 7 is a block diagram showing the entire configuration of the controller for the AC rotary machine according to the second embodiment of the invention. In FIG. 7, the same components as in the first embodiment or components equivalent to those in the first embodiment are denoted by the same reference numerals.

In the controller for the AC rotary machine according to the second embodiment, a primary angular frequency calculating means 60 is added to the first embodiment and the second current control means 8 in the first embodiment is replaced with a second current control means 8$a$. Other things in the second embodiment are configured same as the first embodiment.

The primary angular frequency calculating means 60 and the second current control means 8$a$ are formed by digital circuits. The primary angular frequency calculating means 60, the second current control means 8$a$, the reference frame transformation means 5 and 7, the first current control means 6, and the voltage command output means 11 are formed using a digital microcomputer.

The primary angular frequency calculating means 60 receives the rotation position θ from the position detector 3 and calculates the rate of change, that is, a primary angular frequency ω which is the rate of change of the rotation position θ. The primary angular frequency calculating means 60 includes a delay and hold operator 61, a subtracter 62, and a proportional gain multiplier 63.

In the primary angular frequency calculating means 60, the rotation position θ output from the position detecting means 3 is input to the delay and hold operator 61, and the delay and hold operator 61 delays the input by delayed time interval ΔT2 and holds it. The value of the delayed time interval ΔT2 is arbitrary, and may be the same as the first operation period ΔT in the first embodiment or the second operation period ΔT1 or may be a value which is different from both ΔT and ΔT1. The subtracter 62 subtracts the rotation position θ before ΔT2 from the current rotation position θ at present time and outputs the subtraction result to the proportional gain multiplier 63. The proportional gain multiplier 63 calculates the change of the rotation position θ per unit time by multiplying the output of the subtracter 62 by 1/ΔT2 and outputs the primary angular frequency ω which is the rate of change of the rotation position θ. The primary angular frequency ω is output as a digital signal, and is supplied to the second current control means 8a.

The second current control means 8a includes a storage section 9, a phase correcting section 64, and a second voltage command calculating section 10a. The storage section 9 is configured same as the first embodiment. Moreover, the storage section 9 stores the three-phase detection currents iu, iv, and iw on the stationary reference frame and outputs them as the three-phase storage detection currents iuh, ivh, and iwh on the stationary reference frame, and also stores the first three-phase voltage commands vu1*, vv1*, and vw1* on the stationary reference frame and outputs them as the three-phase storage voltage commands vu1h*, vv1h*, and vw1h* on the stationary reference frame. The three-phase storage detection currents iuh, ivh, and iwh and the three-phase storage voltage commands vu1h*, vv1h*, and vw1h*, which are output from the storage section 9, are supplied to the phase correcting section 64, and the primary angular frequency ω indicating the rate of change of the rotation position θ is also supplied from the primary angular frequency calculating means 60 to the phase correcting section 64. The phase correcting section 64 corrects the phases of the three-phase storage detection currents iuh, ivh, and iwh on the stationary reference frame and the phases of the three-phase storage voltage commands vu1h*, vv1h*, and vw1h* on the stationary reference frame, which are output from the storage section 9, on the basis of the primary angular frequency ω and outputs the results as digital three-phase corrected storage detection currents iuh0, ivh0, and iwh0 on the stationary reference frame and digital three-phase corrected storage voltage commands vu1h0*, vv1h0*, and vw1h0* on the stationary reference frame. The phase correcting section 64 outputs the three-phase corrected storage detection currents iuh0, ivh0, and iwh0 and the three-phase corrected storage voltage commands vu1h0*, vv1h0*, and vw1h0* at each first operation timing repeated at the first operation periods ΔT.

The second voltage control means 10a outputs digital second three-phase voltage commands vu2*, vv2*, and vw2* on the stationary reference frame on the basis of the three-phase corrected storage detection currents iuh0, ivh0, and iwh0 on the stationary reference frame and the three-phase corrected storage voltage commands vu1h0*, vv1h0*, and vw1h0* on the stationary reference frame, which are output from the phase correcting section 64, and the three-phase detection currents iu, iv, and iw on the stationary reference frame, which are output from the current detecting means 4. The second voltage command calculating section 10a outputs the second three-phase voltage commands vu2*, vv2*, and vw2* at each first operation timing. The second three-phase voltage commands vu2*, vv2*, and vw2* are updated at each first operation timing and are held until the next first operation timing.

In addition, the three-phase corrected storage detection currents iuh0, ivh0, and iwh0 include the u-phase corrected storage detection current iuh0, the v-phase corrected storage detection current ivh0, and the w-phase corrected storage detection current iwh0. In addition, the three-phase corrected storage voltage commands vu1h0*, vv1h0*, and vw1h0* include the u-phase corrected storage voltage command vu1h0*, the v-phase corrected storage voltage command vv1h0*, and the w-phase corrected storage voltage command vw1h0*.

Before describing an operation of the phase correcting section 64 in the second embodiment, the principle of phase correction will be described.

Figure 8:
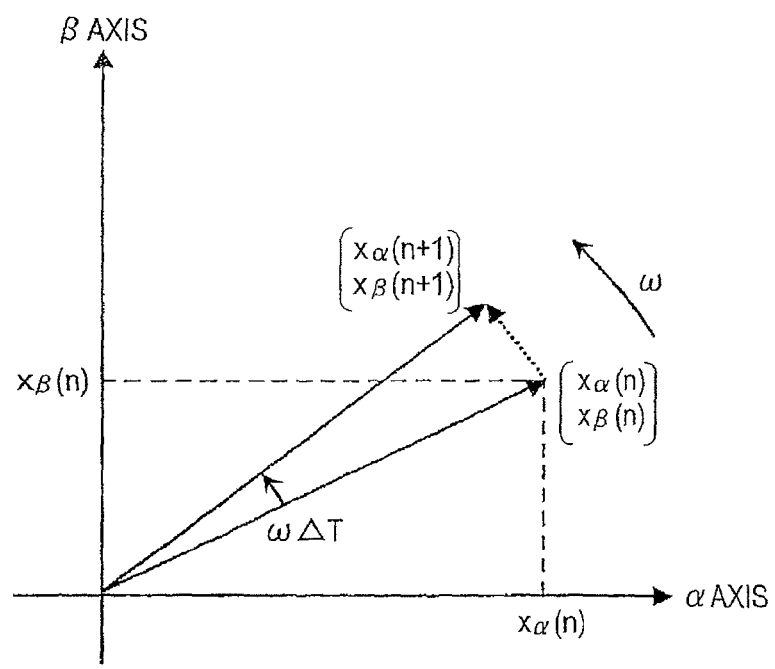
FIG. 8 is a view for explaining the principle of phase correction executed in an AC rotary machine according to the second embodiment.

FIG. 8 is a view explaining the principle of phase correction executed in the second embodiment. In FIG. 8, a state x rotating by the angular frequency ω is plotted. Here, for the sake of convenience, the state x is plotted on the two-phase stationary reference frame using the two-axis stationary reference frame (α,β axis), which are acquired by known three-phase/two-phase conversion, as the stationary reference frame instead of the three-phase stationary reference frame.

α-axis component and β-axis component of the state x at certain time are assumed to be xα(n) and xβ(n), respectively. In addition, α-axis component and β-axis component of the state x when a minute period ΔT has elapsed from the certain time are assumed to be xα(n+1) and xβ(n+1), respectively. Since the state x rotates by the angular frequency ω, the relationship of following expression (13) is satisfied between xα(n), xβ(n), xα(n+1), and xβ(n+1).

$$\begin{pmatrix} x_\alpha(n+1) \\ x_\beta(n+1) \end{pmatrix} = \begin{pmatrix} \cos(\omega\Delta T) & -\sin(\omega\Delta T) \\ \sin(\omega\Delta T) & \cos(\omega\Delta T) \end{pmatrix} \begin{pmatrix} x_\alpha(n) \\ x_\beta(n) \end{pmatrix} \quad (13)$$

Assuming that ωΔT is also minute, approximation of the following expressions (14) and (15) is satisfied.

$$\cos(\omega\Delta T) \cong 1 \quad (14)$$

$$\sin(\omega\Delta T) \cong \omega\Delta T \quad (15)$$

The following expression (16) is obtained by substituting expressions (14) and (15) into expression (13).

$$\begin{pmatrix} x_\alpha(n+1) \\ x_\beta(n+1) \end{pmatrix} = \begin{pmatrix} 1 & -\omega\Delta T \\ \omega\Delta T & 1 \end{pmatrix} \begin{pmatrix} x_\alpha(n) \\ x_\beta(n) \end{pmatrix} \quad (16)$$

Expression (16) is equivalent to expressing, with the two-axis stationary reference frame (α,β axis), the change when the state x rotating by the angular frequency ω has elapsed by the minute period ΔT. On the basis of expression (16), the state x on the three-phase stationary reference frame can be expressed like the following expression (17).

$$\begin{pmatrix} x_u(n+1) \\ x_v(n+1) \\ x_w(n+1) \end{pmatrix} = \left( \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \right) \begin{pmatrix} \cos(\omega\Delta T) & -\sin(\omega\Delta T) \\ \sin(\omega\Delta T) & \cos(\omega\Delta T) \end{pmatrix}$$

$$\left( \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \right) \begin{pmatrix} x_u(n) \\ x_v(n) \\ x_w(n) \end{pmatrix} \quad (17)$$

-continued $$= \left(\sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix}\right) \begin{pmatrix} 1 & -\omega\Delta T \\ \omega\Delta T & 1 \end{pmatrix}$$

$$\left(\sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix}\right) \begin{pmatrix} x_u(n) \\ x_v(n) \\ x_w(n) \end{pmatrix}$$

$$= \begin{pmatrix} \frac{2}{3} & -\frac{1+\sqrt{3}\,\omega\Delta T}{3} & -\frac{1-\sqrt{3}\,\omega\Delta T}{3} \\ -\frac{1-\sqrt{3}\,\omega\Delta T}{3} & \frac{2}{3} & -\frac{1+\sqrt{3}\,\omega\Delta T}{3} \\ -\frac{1+\sqrt{3}\,\omega\Delta T}{3} & -\frac{1-\sqrt{3}\,\omega\Delta T}{3} & \frac{2}{3} \end{pmatrix}$$

$$\begin{pmatrix} x_u(n) \\ x_v(n) \\ x_w(n) \end{pmatrix}$$

Here, taking the relationship of xu(n)+xv(n)+xw(n)=0 into consideration, expression (17) can be changed to the following expression (18).

$$\begin{pmatrix} x_u(n+1) \\ x_v(n+1) \\ x_w(n+1) \end{pmatrix} = \begin{pmatrix} \frac{2}{3} & -\frac{1+\sqrt{3}\,\omega\Delta T}{3} & -\frac{1-\sqrt{3}\,\omega\Delta T}{3} \\ -\frac{1-\sqrt{3}\,\omega\Delta T}{3} & \frac{2}{3} & -\frac{1+\sqrt{3}\,\omega\Delta T}{3} \\ -\frac{1+\sqrt{3}\,\omega\Delta T}{3} & -\frac{1-\sqrt{3}\,\omega\Delta T}{3} & \frac{2}{3} \end{pmatrix} \quad (18)$$

$$\begin{pmatrix} x_u(n) \\ x_v(n) \\ x_w(n) \end{pmatrix} + \frac{1}{3}\begin{pmatrix} 1 & 1 & 1 \\ 1 & 1 & 1 \\ 1 & 1 & 1 \end{pmatrix}\begin{pmatrix} x_u(n) \\ x_v(n) \\ x_w(n) \end{pmatrix}$$

$$= \begin{pmatrix} 1 & -\frac{\omega\Delta T}{\sqrt{3}} & \frac{\omega\Delta T}{\sqrt{3}} \\ \frac{\omega\Delta T}{\sqrt{3}} & 1 & -\frac{\omega\Delta T}{\sqrt{3}} \\ -\frac{\omega\Delta T}{\sqrt{3}} & \frac{\omega\Delta T}{\sqrt{3}} & 1 \end{pmatrix}\begin{pmatrix} x_u(n) \\ x_v(n) \\ x_w(n) \end{pmatrix}$$

As described above, if expression (17) or (18) is used, x(n+1) when the minute period ΔT has elapsed can be obtained on the basis of the state x(n) on the three-phase stationary reference frame rotated by the angular frequency ω.

In addition, the operation amount when the angular frequency ω is given is smaller in the case of expression (18) types than in the case of expression (17). Accordingly, the phase correcting section 64 in the second embodiment corrects the phases of the three-phase storage detection currents iuh, ivh, and iwh on the stationary reference frame and the phases of the three-phase storage voltage commands vu1h*, vv1h*, and vw1h* on the stationary reference frame, which are output from the storage section 9, using the expression (18) and outputs the results as the three-phase corrected storage detection current iuh0, ivh0, and iwh0 on the stationary reference frame and the three-phase corrected storage voltage commands vu1h0*, vv1h0*, and vw1h0* on the stationary reference frame.

In addition, although the approximation of expression (16) is used in the second embodiment, it is needless to say that expression (17) for the operation of phase correction may be executed without using the approximate expression (16). Similarly, the expression for the operation of phase correction may also be derived by substituting the approximate expression (14) into approximate expression using Maclaurin expansion "cos(ωΔT)≅1−(ωΔT)²÷2".

Figure 9:
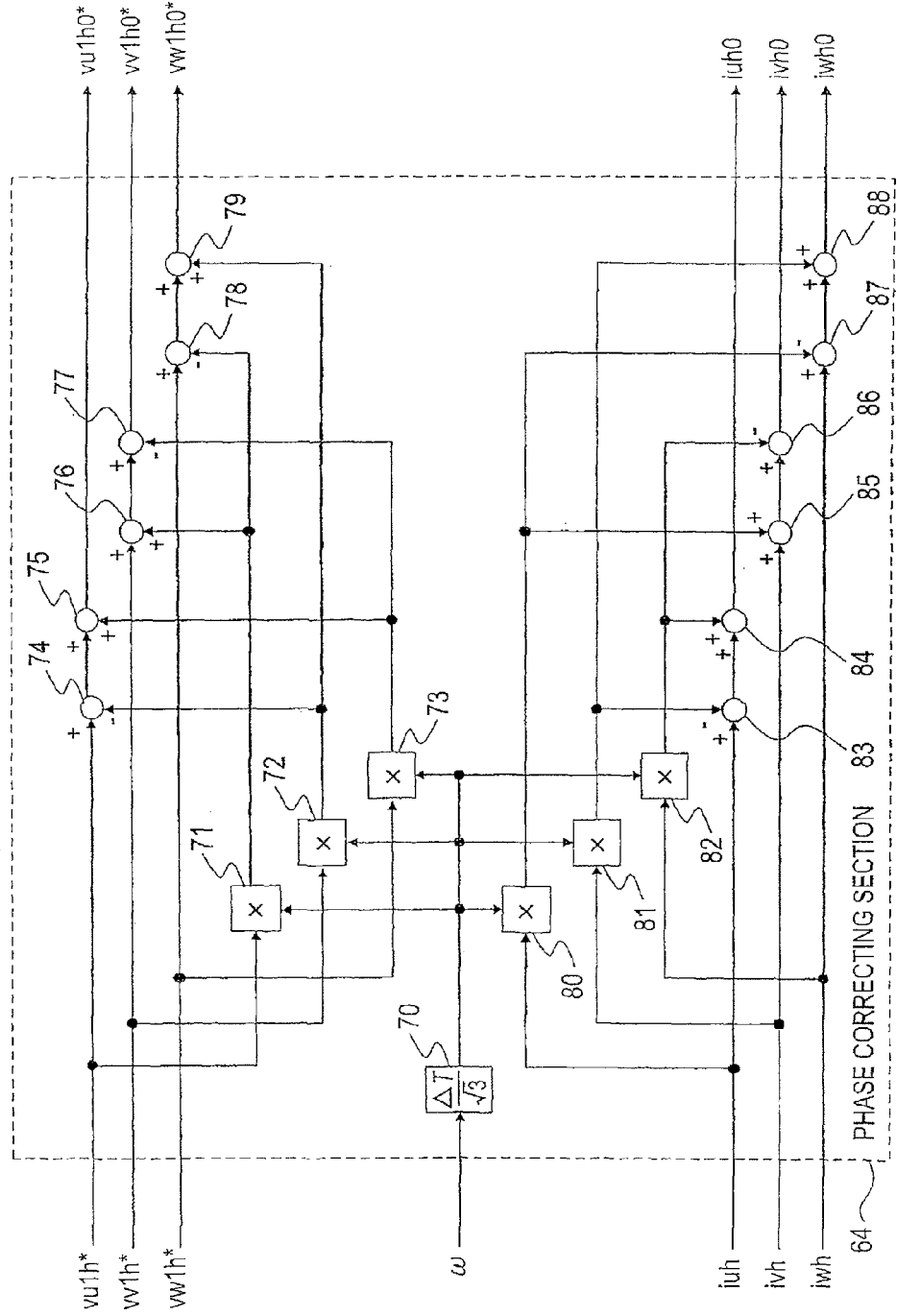
FIG. 9 is a block diagram showing the internal configuration of a phase correcting section in the second embodiment.

FIG. 9 is a block diagram showing the internal configuration of the phase correcting section 64 in the second embodiment.

The phase correcting section 64 includes a proportional gain multiplier 70, multipliers 71, 72, and 73, subtracters 74, 77, and 78, adders 75, 76, and 79, multipliers 80, 81, and 82, subtracters 83, 86, and 87, and adders 84, 85, and 88.

In FIG. 9, the proportional gain multiplier 70 multiplies the primary angular frequency ω, which is output from the primary angular frequency calculating means 60, by $\Delta T/(3)^{1/2}$ and outputs the result as $\omega\Delta T/(3)^{1/2}$.

The multiplier 71 multiplies the u-phase storage voltage command vu1h* on the stationary reference frame by $\omega\Delta T/(3)^{1/2}$, which is output from the proportional gain multiplier 70, and outputs the result as $(\omega\Delta T/(3)^{1/2})$vu1h*.

The multiplier 72 multiplies the v-phase storage voltage command vv1h* on the stationary reference frame by $\omega\Delta T/(3)^{1/2}$, which is output from the proportional gain multiplier 70, and outputs the result as $(\omega\Delta T/(3)^{1/2})$vv1h*.

The multiplier 73 multiplies the w-phase storage voltage command vw1h* on the stationary reference frame by $\omega\Delta T/(3)^{1/2}$, which is output from the proportional gain multiplier 70, and outputs the result as $(\omega\Delta T/(3)^{1/2})$vw1h*.

The subtracter 74 subtracts $(\omega\Delta T/(3)^{1/2})$vv1h*, which is output from the multiplier 72, from the u-phase storage voltage command vu1h* on the stationary reference frame and outputs the result as {vu1h*−$(\omega\Delta T/(3)^{1/2})$vv1h*}.

The adder 75 adds $(\omega\Delta T/(3)^{1/2})$vw1h*, which is output from the multiplier 73, to {vu1h*−$(\omega\Delta T/(3)^{1/2})$vv1h*}, which is output from the subtracter 74, and outputs the result as [{vu1h*−$(\omega\Delta T/(3)^{1/2})$vv1h*}+$(\omega\Delta T/(3)^{1/2})$vw1h*].

Assuming that the u, v, w-phase storage voltage commands vu1h*, vv1h*, and vw1h* on the stationary reference frame are the state x(n) in expression (18), the output of the adder 75 is a first row of right side in expression (18). That is, the output of the adder 75 is the u-phase corrected storage voltage command vu1h0* on the stationary reference frame.

Similarly, the adder 76 adds $(\omega\Delta T/(3)^{1/2})$vu1h*, which is output from the multiplier 71, to the v-phase storage voltage command vv1h* on the stationary reference frame and outputs the result as {vv1h*+$(\omega\Delta T/(3)^{1/2})$vu1h*}.

The subtracter 77 subtracts $(\omega\Delta T/(3)^{1/2})$vw1h*, which is output from the multiplier 73, from {vv1h*+$(\omega\Delta T/(3)^{1/2})$vu1h*}, which is output from the adder 76, and outputs the result as [{vv1h*+$(\omega\Delta T/(3)^{1/2})$vu1h*}−$(\omega\Delta T/(3)^{1/2})$vw1h*].

Assuming that the u, v, w-phase storage voltage commands vu1h*, vv1h*, and vw1h* on the stationary reference frame are the state x(n) in expression (18), the output of the subtracter 77 is a second row of right side in expression (18). That is, the output of the subtracter 77 is the v-phase corrected storage voltage command vv1h0* on the stationary reference frame.

Similarly, the subtracter 78 subtracts $(\omega\Delta T/(3)^{1/2})$vu1h*, which is output from the multiplier 71, from the w-phase storage voltage command vw1h* on the stationary reference frame and outputs the result as {vw1h*−$(\omega\Delta T/(3)^{1/2})$vu1h*}.

The adder 79 adds $(\omega\Delta T/(3)^{1/2})$vv1h*, which is output from the multiplier 72, to {vw1h*−$(\omega\Delta T/(3)^{1/2})$vu1h*}, which is output from the subtracter 78, and outputs the result as [{vw1h*−$(\omega\Delta T/(3)^{1/2})$vu1h*}+$(\omega\Delta T/(3)^{1/2})$vv1h*].

Assuming that the u, v, w-phase storage voltage commands vu1h*, vv1h*, and vw1h* on the stationary reference frame are the state x(n) in expression (18), the output of the adder 79 is a third row of right side in expression (18). That is, the output of the adder 79 is the w-phase corrected storage voltage command vw1h0* on the stationary reference frame.

On the other hand, the multiplier 80 multiplies the u-phase storage detection current iuh on the stationary reference frame by $\omega\Delta T/(3)^{1/2}$, which is output from the proportional gain multiplier 70, and outputs the result as $(\omega\Delta T/(3)^{1/2})$iuh.

The multiplier 81 multiplies the v-phase storage detection current ivh on the stationary reference frame by $\omega\Delta T/(3)^{1/2}$, which is output from the proportional gain multiplier 70, and outputs the result as $(\omega\Delta T/(3)^{1/2})$ivh.

The multiplier 82 multiplies the w-phase storage detection current iwh on the stationary reference frame by $\omega\Delta T/(3)^{1/2}$, which is output from the proportional gain multiplier 70, and outputs the result as $(\omega\Delta T/(3)^{1/2})$iwh.

The subtracter 83 subtracts $(\omega\Delta T/(3)^{1/2})$ivh, which is output from the multiplier 81, from the u-phase storage detection current iuh on the stationary reference frame and outputs the result as $\{iuh-(\omega\Delta T/(3)^{1/2})ivh\}$.

The adder 84 adds $(\omega\Delta T/(3)^{1/2})$iwh, which is output from the multiplier 82, to $\{iuh-(\omega\Delta T/(3)^{1/2})ivh\}$, which is output from the subtracter 83, and outputs the result as $[\{iuh-(\omega\Delta T/(3)^{1/2})ivh\}+(\omega\Delta T/(3)^{1/2})iwh]$.

Assuming that the u, v, w-phase storage detection currents iuh, ivh, and iwh on the stationary reference frame are the state x(n) in expression (18), the output of the adder 84 is a first row of right side in expression (18). That is, the output of the adder 84 is the u-phase corrected storage detection current iuh0 on the stationary reference frame.

Similarly, the adder 85 adds $(\omega\Delta T/(3)^{1/2})$iuh, which is output from the multiplier 80, to the v-phase storage detection current ivh on the stationary reference frame and outputs the result as $\{ivh+(\omega\Delta T/(3)^{1/2})iuh\}$.

The subtracter 86 subtracts $(\omega\Delta T/(3)^{1/2})$iwh, which is output from the multiplier 82, from $\{ivh+(\omega\Delta T/(3)^{1/2})iuh\}$, which is output from the adder 85, outputs the result as $[\{ivh+(\omega\Delta T/(3)^{1/2})iuh\}-(\omega\Delta T/(3)^{1/2})iwh]$.

Assuming that the u, v, w-phase storage detection currents iuh, ivh, and iwh on the stationary reference frame are the state x(n) in expression (18), the output of the subtracter 86 is a second row of right side in expression (18). That is, the output of the subtracter 86 is the v-phase corrected storage detection current ivh0 on the stationary reference frame.

Similarly, the subtracter 87 subtracts $(\omega\Delta T/(3)^{1/2})$iuh, which is output from the multiplier 80, from the w-phase storage detection current iwh on the stationary reference frame and outputs the result as $\{iwh-(\omega\Delta T/(3)^{1/2})iuh\}$.

The adder 88 adds $(\omega\Delta T/(3)^{1/2})$ivh, which is output from the multiplier 81, to $\{iwh-(\omega\Delta T/(3)^{1/2})iuh\}$, which is output from the subtracter 87, and outputs the result as $[\{iwh-(\omega\Delta T/(3)^{1/2})iuh\}+(\omega\Delta T/(3)^{1/2})ivh]$.

Assuming that the u, v, w-phase storage detection currents iuh, ivh, and iwh on the stationary reference frame are the state x(n) in expression (18), the output of the adder 88 is a third row of right side in expression (18). That is, the output of the adder 88 is the w-phase corrected storage detection current iwh0 on the stationary reference frame.

FIG. 10 is a chart showing an example of time chart in the controller for the AC rotary machine according to the second embodiment. This time chart is a time chart when the second operation period ΔT1 is set to twice the first operation period ΔT and the voltage command output means 11 selects the first three-phase voltage commands vu1*, vv1*, and vw1* as the three-phase voltage commands vu*, vv*, and vw* on the stationary reference frame at the rate of one period in two periods of the first operation period ΔT.

In FIG. 10, time [second] is shown in the (a) column, and the time includes 0, ΔT, 2ΔT, ..., 7ΔT. Time 0, 2ΔT, 4ΔT, and 6ΔT are second operation timings repeated at the second operation periods ΔT1, and time ΔT, 3ΔT, 5ΔT, and 7ΔT are first operation timings repeated at the first operation periods ΔT. Between the second operation timings 0 and 2ΔT, one first operation timing ΔT is included. Between the second operation timings 2ΔT and 4ΔT, one first operation timing 3ΔT is included. Between the second operation timings 4ΔT and 6ΔT, one first operation timing 5ΔT is included.

In the (b) column of FIG. 10, the execution state of the reference frame transformation means 5 is shown corresponding to each time 0, ΔT, 2ΔT, ..., 7ΔT in the (a) column. In the (c) column, the execution state of the first current control means 6 is shown corresponding to each time 0, ΔT, 2ΔT, ..., 7ΔT in the (a) column. In the (d) column, the execution state of the reference frame transformation means 7 is shown corresponding to each time 0, ΔT, 2ΔT, ..., 7ΔT in the (a) column. As is apparent from the (b), (c), and (d) columns, the reference frame transformation means 5, the first current control means 6, and the reference frame transformation means 7 are executed at time 0, 2ΔT, 4ΔT, and 6ΔT, but are not executed at other times.

In the (e) column of FIG. 10, the operating state of the storage section 9 is shown corresponding to each time 0, ΔΔT, 2ΔT, ..., 7ΔT in the (a) column. As is apparent from the (e) column, in the storage section 9, a storage operation is performed at time 0 and a hold operation for holding the storage value, which is stored at time 0, is performed at time ΔT subsequent to time 0. Similarly, in the storage section 9, the storage operation is performed at time 2ΔT and the hold operation for holding the storage value, which is stored at time 2ΔT, is performed at time 3ΔT subsequent to time 2ΔT. Similarly, in the storage section 9, the storage operation is performed at time 4ΔT and the hold operation for holding the storage value, which is stored at time 4ΔT, is performed at time 5ΔT subsequent to time 4ΔT. Moreover, in the storage section 9, the storage operation is performed at time 6ΔT and the hold operation for holding the storage value, which is stored at time 6ΔT, is performed at time 7ΔT subsequent to time 6ΔT.

In the (f) column of FIG. 10, the execution state of the phase correcting section 64 is shown corresponding to each time 0, ΔT, 2ΔT, ..., 7ΔT in the (a) column. In the (g) column of FIG. 10, the execution state of the second voltage command calculating section 10a is shown corresponding to each time 0, ΔT, 2ΔT, ..., 7ΔT in the (a) column. As is apparent from the (f) and (g) columns, the phase correcting section 64 and the second voltage command calculating section 10a are executed at each first operation timing of time ΔT, 3ΔT, 5ΔT, and 7ΔT, but are not executed at second operation timing of time 0, 2ΔT, 4ΔT, and 6ΔT.

In the (h) column of FIG. 10, it is shown which of the first three-phase voltage commands vu1*, vv1*, and vw1* and the second three-phase voltage commands vu2*, vv2*, and vw2* were selected as the three-phase voltage commands vu*, vv*, and vw* output from the voltage command output means 11, corresponding to each time 0, ΔT, 2ΔT, ..., 7ΔT in the (a) column. In the (h) column, the "first voltage command" indicates the first three-phase voltage commands vu1*, vv1*, and vw1*, and the "second voltage command" indicates the second three-phase voltage commands vu2*, vv2*, and vw2*.

In addition, time after time 8ΔT is omitted in FIG. 10. However, from time 8ΔT, the operations described from time 0 to time 7ΔT are repeatedly performed.

As can be understood from the time chart shown in FIG. 10, the voltage command output means 11 selects the first three-phase voltage commands vu1*, vv1*, and vw1* at the rate of one period in two periods of the first operation period ΔT and selects the second three-phase voltage commands vu2*, vv2*, and vw2* for the remaining one period. The storage section 9 performs the storage operation at the rate of one period in two periods of the first operation period ΔT and holds the stored thing for the remaining one period. In addition, the reference frame transformation means 5 and 7 and the first current control means 6 may be executed only at the rate of one period in two periods of the first operation period ΔT, and the phase correcting section 64 and the second voltage command calculating section 10a are executed for the remaining period.

The operation of the phase correcting section 64 includes a total of seven multiplications in the proportional gain multiplier 70 and the multipliers 71, 72 73, 80, 81, and 82 and a total of twelve additions and subtractions in the subtracters 74, 77, 78, 83, 86, and 87 and the adders 75, 76, 79, 84, 85, and 88. Accordingly, the operation of the phase correcting section 64 can be executed with the amount of operation smaller than that in the reference frame transformation means 5 and 7. Therefore, by executing the operations in the reference frame transformation means 5 and 7 and the first current control means 6 at the rate of one period in two periods of the first operation period ΔT and executing the operations in the phase correcting section 64 and the second voltage command calculating section 10a for the remaining period, the operation load can be reduced.

Figure 11:
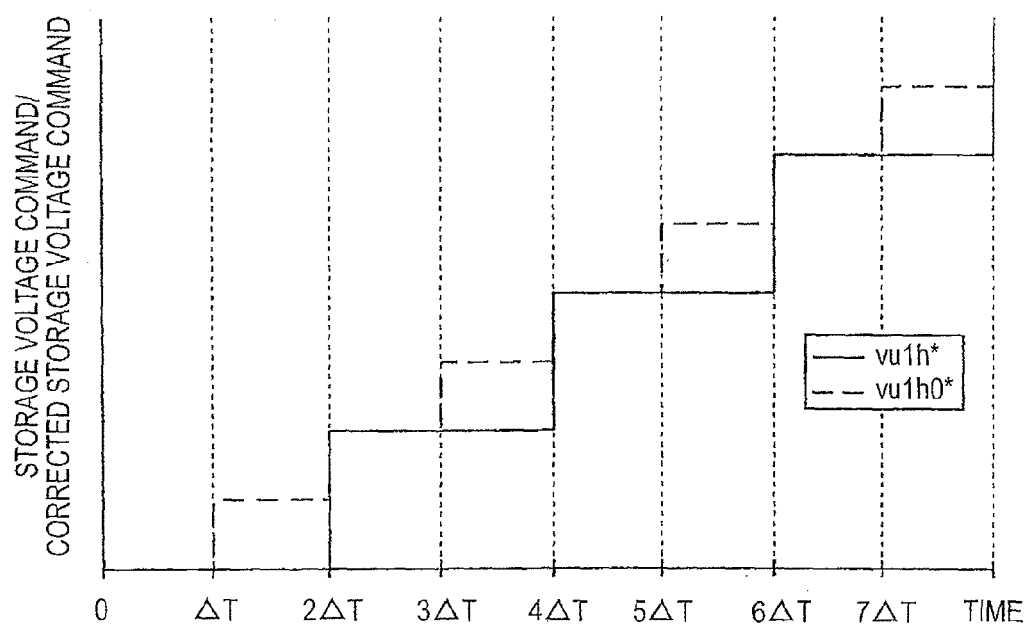
FIG. 11 is a waveform chart showing an example of an operation waveform of the controller for an AC rotary machine according to the second embodiment.

FIG. 11 shows examples of operation waveforms of the u-phase storage voltage command vu1h* on the stationary reference frame and the u-phase corrected storage voltage command vu1h0* on the stationary reference frame in a state where the controller for the AC rotary machine according to the second embodiment is made to operate according to the time chart shown in FIG. 10. In the example shown in FIG. 11, a section where the u-phase storage voltage command vu1h* on the stationary reference frame increases monotonously is plotted.

Although the value of the u-phase storage voltage command vu1h* on the stationary reference frame is updated at time 0, 2ΔT, 4ΔT, 6ΔT, . . . , the phase correcting section 64 corrects the u-phase storage voltage command vu1h* at time ΔT, 3ΔT, 5ΔT, 7ΔT, . . . and outputs the result as the u-phase corrected storage voltage command vu1h0* on the stationary reference frame.

From FIG. 11, it can be easily understood that using the u-phase corrected storage voltage command vu1h0* on the stationary reference frame as the value, which is input to the second voltage command calculating section 10a at ΔT, 3ΔT, 5ΔT, 7ΔT, . . . , rather than using the u-phase storage voltage command vu1h* on the stationary reference frame makes the u-phase AC voltage vu smooth, and as a result, the current on the stationary reference frame becomes smooth.

In addition, although the relationship between the storage voltage command vu1h* and the corrected storage voltage command vu1h0* has been described in FIG. 11, the same is true for the relationship between the other v, w-phase storage voltage commands vv1h* and vw1h* and the v, w-phase corrected storage voltage commands vv1h0* and vw1h0*.

Moreover, it is needless to say that the same is true for the relationship between the three-phase storage detection currents iuh, ivh, and iwh and the three-phase corrected storage detection currents iuh0, ivh0, and iwh0.

As described above, in the controller for the AC rotary machine according to the second embodiment, an effect is obtained in which the current on the stationary reference frame during a period, for which the operations of the first current control means 6 and the reference frame transformation means 5 and 7 are omitted, can be made smooth, in addition to the effect in the first embodiment.

Third Embodiment

In the second embodiment, the current detecting means 4 detects the three of three-phase detection currents iu, iv, and iw of the AC rotary machine 2 and the reference frame transformation means 5 and 7 and the second current control means 8a perform their operations on the basis of the three of three-phase detection currents iu, iv, and iw.

Here, since the sum of the three-phase detection currents iu, iv, and iw is zero regarding the reference frame transformation means 5 and 7, a configuration of reducing the amount of operation by performing the operation based on two of the u-phase detection current iu and the v-phase detection current iv among the three-phase detection currents iu, iv, and iw is known.

In the third embodiment, the reference frame transformation means 5 and 7 and the second current control means 8a in the second embodiment are replaced with reference frame transformation means 5b and 7b and a second current control means 8b, respectively, and the amount of operation is reduced by performing the operation based on two of the u-phase detection current iu and the v-phase detection current iv among the three-phase detection currents iu, iv, and iw on the stationary reference frame in the reference frame transformation means 5b and 7b and the second current control means 8b. Also in the third embodiment, the three-phase AC reference frame including U, V, and W phases are used as the stationary reference frame.

Figure 12:
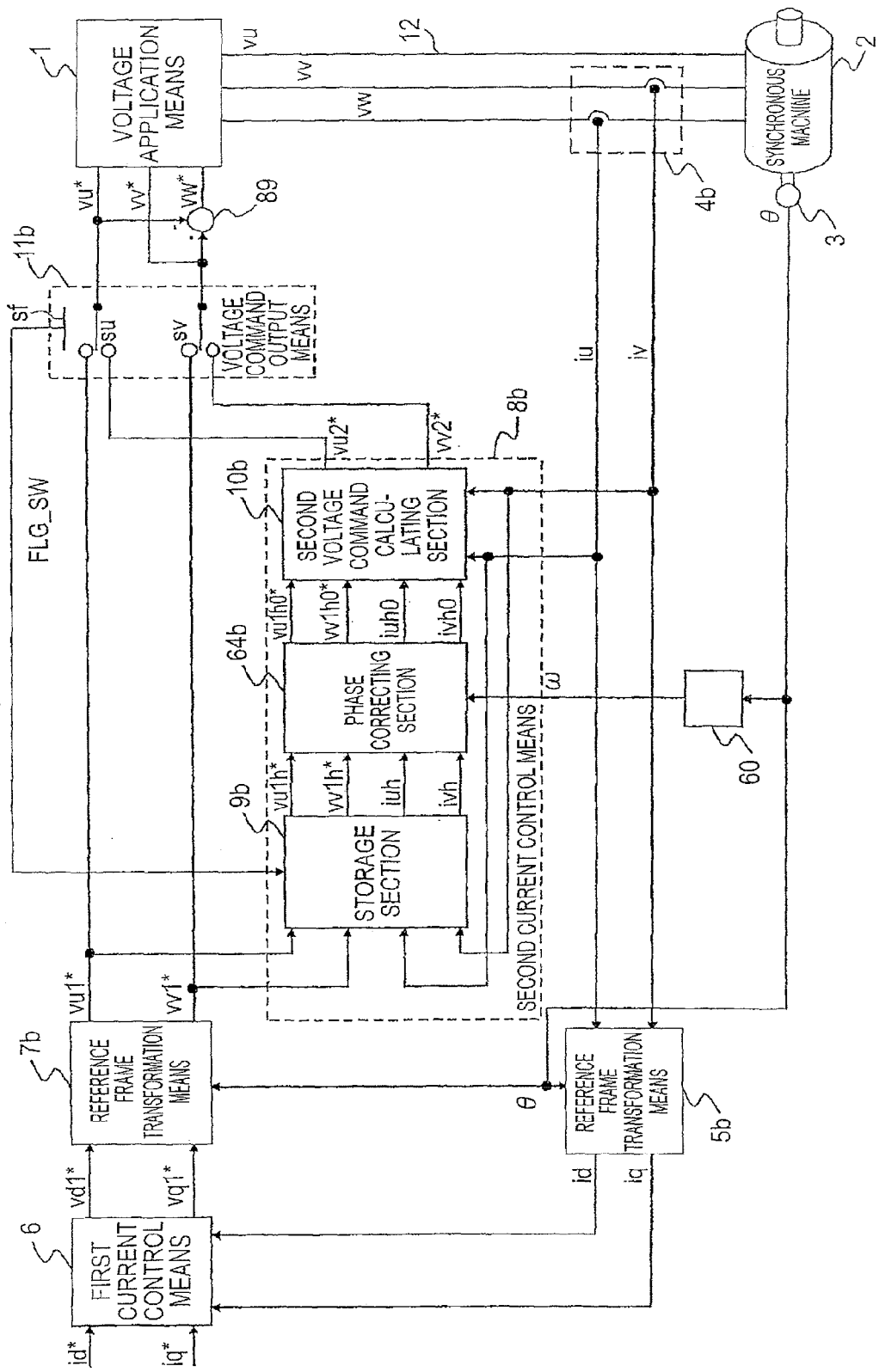
FIG. 12 is a block diagram showing the entire configuration of a controller for an AC rotary machine according to a third embodiment of the invention.

FIG. 12 is a block diagram showing the entire configuration of a controller for an AC rotary machine according to a third embodiment of the invention. In FIG. 12, the same components as in the second embodiment or components equivalent to those in the second embodiment are denoted by the same reference numerals.

The controller for the AC rotary machine according to the third embodiment serves to control an AC rotary machine 2 and includes a voltage application means 1, a position detecting means 3, a current detecting means 4b, a reference frame transformation means 5b, a first current control means 6, a reference frame transformation means 7b, a second current control means 8b, a voltage command output means 11b, a primary angular frequency calculating means 60, and a subtracter 89. The voltage application means 1, the position detecting means 3, the first current control means 6, and the primary angular frequency calculating means 60 are formed in the same manner as in the second embodiment. The second current control means 8b includes a storage section 9b, a phase correcting section 64b, and a second voltage command calculating section 10b. The reference frame transformation means 5b and 7b, the first current control means 6, the second current control means 8b, the primary angular frequency calculating means 60, the voltage command output means 11b, and the subtracter 89 are formed by digital circuits. Specifically, these are formed using a digital microcomputer.

Similar to the first and second embodiments, the first current control means 6 receives two-phase detection currents id and iq, which are updated at each first operation timing repeated at the first operation periods ΔT, and updates and outputs two-phase voltage commands vd1* and vq1* at each second operation timing which is repeated at the second operation periods ΔT1 longer than the first operation period ΔT.

The current detecting means 4b outputs u, v-phase detection currents iu and iv among the three-phase detection currents iu, iv, and iw of the AC rotary machine 2 at each first operation timing repeated at the first operation periods ΔT. The current detecting means 4b also includes an AD conversion means therein, and outputs digital u, v-phase detection currents iu and iv at each first operation timing repeated at the first operation periods ΔT.

The reference frame transformation means 5b performs reference frame transformation of the two of u, v-phase detection currents iu and iv, among the three-phase detection currents iu, iv, and iw on the stationary reference frame, on the basis of the rotation position θ output from the position detecting means 3 using the known operation and then outputs the two-phase detection currents id and iq updated at each of the first operation timing.

The reference frame transformation means 7b transforms the reference frame of the two-phase voltage commands vd1* and vq1* on the rotating reference frame, which are output from the first current control means 6, to first u, v-phase voltage commands vu1* and vv1* on the basis of the rotation position θ output from the position detecting means 3 using the known operation. Although the reference frame transformation means 7 in the second embodiment converts the two-phase voltage commands vd1* and vq1* into the first three-phase voltage commands vu1*, vv1*, and vw1* on the stationary reference frame, the reference frame transformation means 7b in the third embodiment converts the two-phase voltage commands vd1* and vq1* into the u, v-phase voltage commands vu1* and vv1* among the first three-phase voltage commands vu1*, vv1*, and vw1* on the stationary reference frame.

The second current control means 8b outputs the second u, v-phase voltage commands vu2* and vv2* among the second three-phase voltage commands vu2*, vv2*, and vw2* on the basis of the first u, v-phase voltage commands vu1* and vv1* output from the reference frame transformation means 7b, the u, v-phase detection currents iu and iv output from the current detecting means 4b, and the primary angular frequency ω output from the primary angular frequency conversion means 60.

The voltage command output means 11b selects either the first u, v-phase voltage commands vu1* and vv1* output from the reference frame transformation means 7b or the second u, v-phase voltage commands vu2* and vv2* output from the second current control means 8b, and outputs the u, v-phase voltage commands vu* and vv* among the three-phase voltage commands vu*, vv*, and vw*. The voltage command output means 11b selects the first u, v-phase voltage commands vu1* and vv1*, which are output from the reference frame transformation means 7b, at each second operation timing repeated at the second operation periods ΔT1 and selects the second u, v-phase voltage commands vu2* and vv2*, which are output from the second current control means 8b, at each first operation timing repeated at the first operation periods ΔT.

The subtracter 89 calculates (-vu*-vv*) on the basis of the u, v-phase voltage commands vu* and vv* output from the voltage command output means 11b and supplies (-vu*-vv*) to the voltage application means 1 as the w-phase voltage command vw*.

Specifically, the second current control means 8b includes a storage section 9b, a phase correcting section 64b, and a second voltage command calculating section 10b. The u,
v-phase detection currents iu and iv on the stationary reference frame are supplied from the current detecting means 4b to the storage section 9b at each first operation timing repeated at the first operation periods ΔT, and the first u, v-phase voltage commands vu1* and vv1* on the stationary reference frame are updated and supplied from the reference frame transformation means 7b to the storage section 9b at each second operation timing repeated at the second operation periods ΔT1.

A switching flag FLG_SW is supplied from the voltage command output means 11b to the storage section 9b. The switching flag FLG_SW is the same as those in the first and second embodiments. When the voltage command output means 11b has selected the first u, v-phase voltage commands vu1* and vv1*, the switching flag FLG_SW becomes TRUE. When the voltage command output means 11b has selected the second u, v-phase voltage commands vu2* and vv2*, the switching flag FLG_SW becomes FALSE. When the switching flag FLG_SW becomes TRUE at second operation timing repeated at the second operation periods ΔT1, the storage section 9b stores the first u, v-phase voltage commands vu1* and vv1* on the stationary reference frame, which are output from the reference frame transformation means 7b and stores the u, v-phase detection currents iu and iv on the stationary reference frame, which are output from the current detecting means 4b.

The switching flag FLG_SW becomes FALSE at each first operation timing repeated at the first operation periods ΔT. Since the second operation period ΔT1 is set to be larger than the first operation period ΔT, one or more first operation timing is given between the two adjacent second operation timings. At each first operation timing, the storage section 9b outputs the first u, v-phase voltage commands vu1* and vv1*, which are stored at the second operation timing before the first operation timing, as u, v-phase storage voltage commands vu1h* and vv1h* and also outputs the u, v-phase detection currents iu and iv, which are stored at the second operation timing before the first operation timing, as u, v-phase storage detection currents iuh and ivh.

The u, v-phase storage detection currents iuh and ivh and the u, v-phase storage voltage commands vu1h* and vv1h* are supplied from the storage section 9b to the phase correcting section 64b, and the primary angular frequency ω indicating the rate of change of the rotation position θ is also supplied from the primary angular frequency calculating means 60 to the phase correcting section 64b. The phase correcting section 64b corrects the phases of the u, v-phase storage detection currents iuh and ivh on the stationary reference frame and the phases of the u, v-phase storage voltage commands vu1h* and vv1h* on the stationary reference frame, which are output from the storage section 9b, on the basis of the primary angular frequency ω and outputs the results as u, v-phase corrected storage detection currents iuh0 and ivh0 on the stationary reference frame and u, v-phase corrected storage voltage commands vu1h0* and vv1h0* on the stationary reference frame.

The second voltage command calculating section 10b outputs second u, v-phase voltage commands vu2* and vv2* on the stationary reference frame on the basis of the u, v-phase corrected storage detection currents iuh0 and ivh0 on the stationary reference frame and the u, v-phase corrected storage voltage commands vu1h0* and vv1h0* on the stationary reference frame, which are output from the phase correcting section 64b, and the u, v-phase detection currents iu and iv on the stationary reference frame, which are output from the current detecting means 4b.

The voltage command output means 11b does not have the switch sw of the voltage command output means 11 in the first embodiment, and is formed by switches su and sv. The switches su and sv output the u, v-phase voltage commands vu* and vv*, respectively.

Thus, in the third embodiment, the current detecting means 4b selects and detects the u, v-phase detection currents iu and iv among the three-phase detection currents iu, iv, and iw, and then the reference frame transformation means 7b outputs the u, v-phase voltage commands vu1* and vv1* among the first three-phase voltage commands vu1*, vv1*, and vw1* and the second voltage command calculating section 10b outputs the u, v-phase voltage commands vu2* and vv2* among the second three-phase voltage commands vu2*, vv2*, and vw2*. The voltage command output means 11b selects either the first u, v-phase voltage commands vu1* and vv1* or the second u, v-phase voltage commands vu2* and vv2* and generates the u, v-phase voltage commands vu* and vv* among the three-phase voltage commands vu*, vv*, and vw*, and the subtracter 89 interpolates the w-phase voltage command vw*.

Moreover, in the third embodiment, a configuration where the operation regarding the w phase is omitted is adopted. However, it is needless to say that the phase for which the operation is omitted may be the u or v phase.

Figure 13:
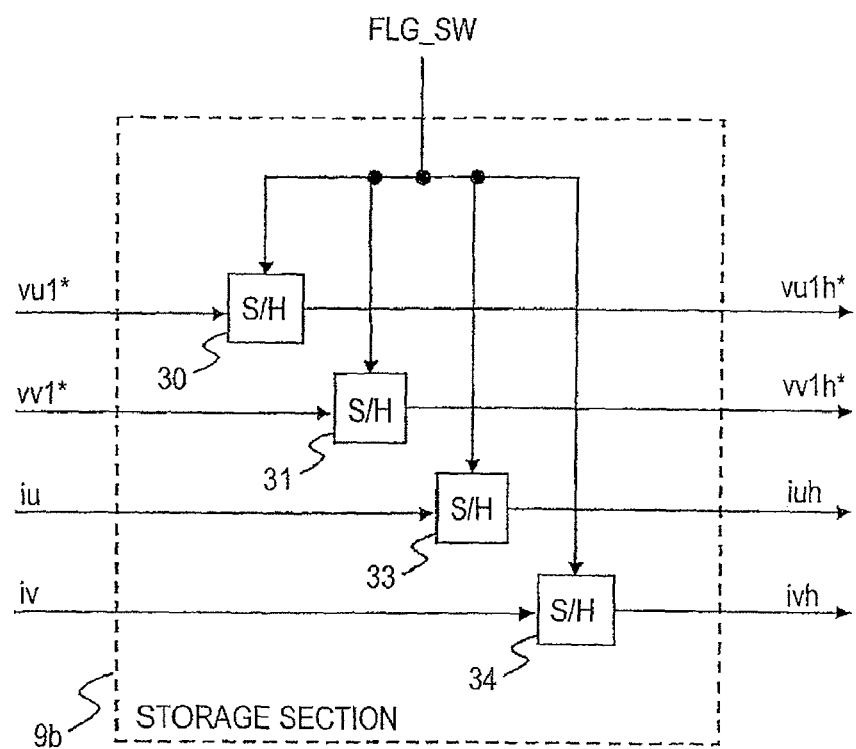
FIG. 13 is a block diagram showing the internal configuration of a storage section in the third embodiment.

FIG. 13 is a block diagram showing the internal configuration of the storage section 9b in the third embodiment. The same components as in FIG. 3 or components equivalent to those in FIG. 3 are denoted by the same reference numerals. As can be seen from FIG. 13, the storage section 9b in the third embodiment is configured to omit the operation of storing the w-phase detection current iw and the first w-phase voltage command vw1* by the storage section 9 in the first and second embodiments. The others are the same as those of the storage section 9 in the first and second embodiments.

Figure 14:
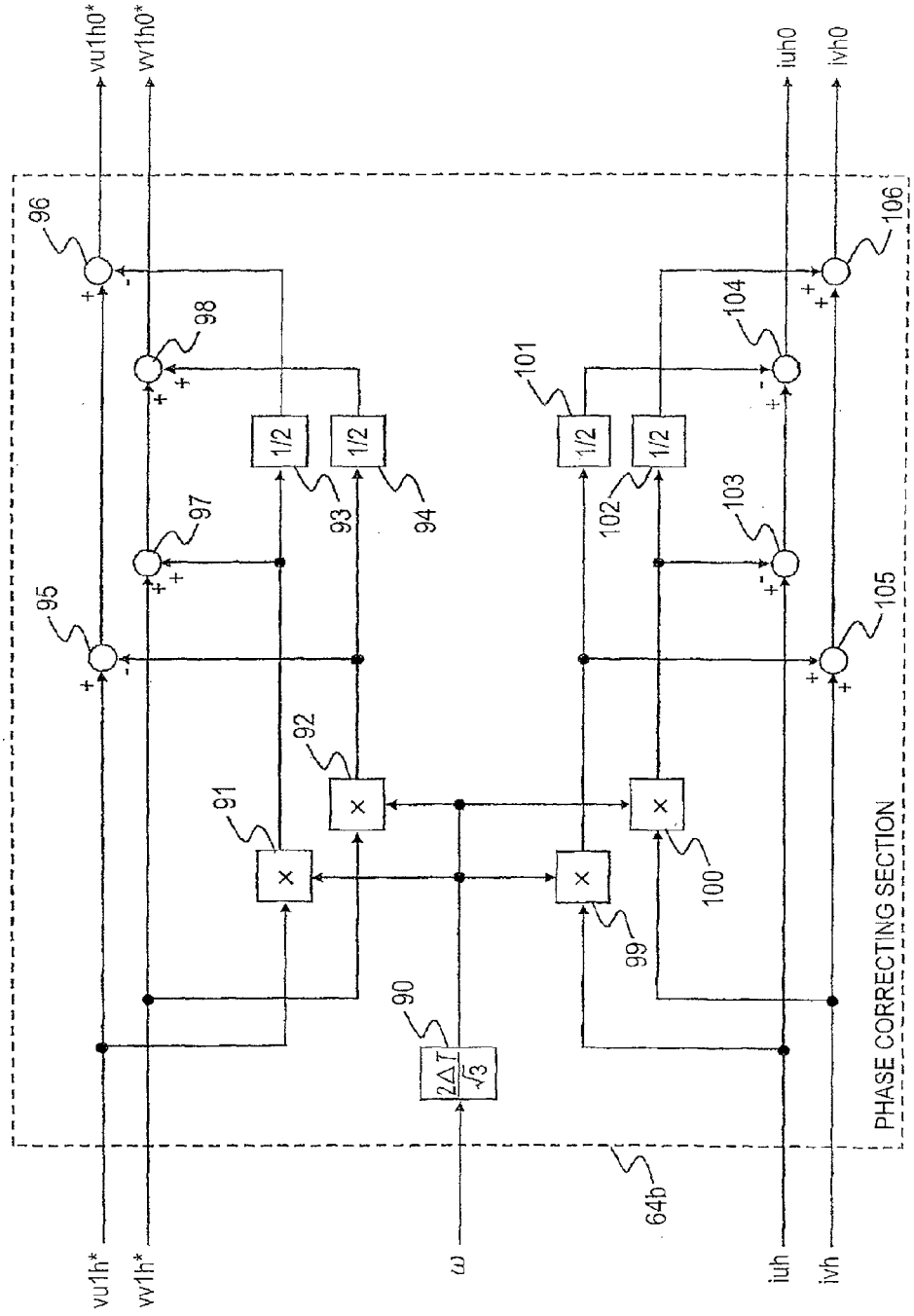
FIG. 14 is a block diagram showing the internal configuration of a phase correcting section in the third embodiment.

FIG. 14 is a block diagram showing the internal configuration of the phase correcting section 64b in the third embodiment. First, expression for the operation in the phase correcting section 64b will be described.

If the relationship of xu(n)+xv(n)+xw(n)=0 is substituted into expression (18) derived in the second embodiment and xw(n) is eliminated, the following expression (19) is obtained.

$$\begin{pmatrix} x_u(n+1) \\ x_v(n+1) \end{pmatrix} = \begin{pmatrix} 1 - \frac{\Delta T}{\sqrt{3}}\omega & -\frac{2\Delta T}{\sqrt{3}}\omega \\ \frac{2\Delta T}{\sqrt{3}}\omega & 1 + \frac{\Delta T}{\sqrt{3}}\omega \end{pmatrix} \begin{pmatrix} x_u(n) \\ x_v(n) \end{pmatrix} \quad (19)$$

$$x_w(n+1) = -x_u(n+1) - x_v(n+1)$$

As shown in FIG. 14, the phase correcting section 64b in the third embodiment includes a proportional gain multiplier 90, multipliers 91 and 92, proportional gain multipliers 93 and 94, subtracters 95 and 96, adders 97 and 98, multipliers and 100, proportional gain multipliers 101 and 102, subtracters 103 and 104, and adders 105 and 106.

The proportional gain multiplier 90 multiplies the primary angular frequency ω, which is output from the primary angular frequency calculating means 60, by $2\Delta T/(3)^{1/2}$ and outputs the result as $2\omega\Delta T/(3)^{1/2}$.

The multiplier 91 multiplies the u-phase storage voltage command vu1h* on the stationary reference frame by $2\omega\Delta T/(3)^{1/2}$, which is output from the proportional gain multiplier 90, and outputs the result as $(2\omega\Delta T/(3)^{1/2})$vu1h*.

The multiplier 92 multiplies the v-phase storage voltage command vv1h* on the stationary reference frame by $2\omega\Delta T/(3)^{1/2}$, which is output from the proportional gain multiplier 90, and outputs the result as $(2\omega\Delta T/(3)^{1/2})$vv1h*.

The proportional gain multiplier 93 multiplies $(2\omega\Delta T/(3)^{1/2})$vu1h* output from the multiplier 91 by ½ and outputs the result as $(\omega\Delta T/(3)^{1/2})$vu1h*.

In addition, the proportional gain multiplier 93 may be configured to perform digital processing on a signal instead of multiplication of ½, so that the input is 1 bit shifted to the right.

The proportional gain multiplier 94 multiplies $(2\omega\Delta T/(3)^{1/2})$vv1h* output from the multiplier 92 by ½ and outputs the result as $(\omega\Delta T/(3)^{1/2})$vv1h*.

Similar to the proportional gain multiplier 93, the proportional gain multiplier 94 may also be configured to perform digital processing on a signal so that the input is 1 bit shifted to the right.

The subtracter 95 subtracts $(2\omega\Delta T/(3)^{1/2})$vv1h*, which is output from the multiplier 92, from the u-phase storage voltage command vu1h* on the stationary reference frame and outputs the result as {vu1h*−$(2\omega\Delta T/(3)^{1/2})$vv1h*}.

The subtracter 96 subtracts $(\omega\Delta T/(3)^{1/2})$vu1h*, which is output from the proportional gain multiplier 93, from {vu1h*−$(2\omega\Delta T/(3)^{1/2})$vv1h*}, which is output from the subtracter 95, and outputs the result as [{(1−$\omega\Delta T/(3)^{1/2}$)vu1h*}−$(2\omega\Delta T/(3)^{1/2})$vv1h*].

Assuming that the u, v-phase storage voltage commands vu1h* and vv1h* on the stationary reference frame are the state x(n) in expression (19), the output of the subtracter 96 is a first row of right side in expression (19). That is, the output of the subtracter 96 is the u-phase corrected storage voltage command vu1h0* on the stationary reference frame.

Similarly, the adder 97 adds $(2\omega\Delta T/(3)^{1/2})$vu1h*, which is output from the multiplier 91, to the v-phase storage voltage command vv1h* on the stationary reference frame and outputs the result as {vv1h*+$(2\omega\Delta T/(3)^{1/2})$vu1h*}.

The adder 98 adds $(\omega\Delta T/(3)^{1/2})$vv1h*, which is output from the proportional gain multiplier 94, to {vv1h*+$(2\omega\Delta T/(3)^{1/2})$vu1h*}, which is output from the adder 97, and outputs the result as [$(2\omega\Delta T/(3)^{1/2})$vu1h*+{(1+$\omega\Delta T/(3)^{1/2}$)vv1h*}].

Assuming that the u, v-phase storage voltage commands vu1h* and vv1h* on the stationary reference frame are the state x(n) in expression (19), the output of the adder 98 is a second row of right side in expression (19). That is, the output of the adder 98 is the v-phase corrected storage voltage command vv1h0* on the stationary reference frame.

On the other hand, the multiplier 99 multiplies the u-phase storage detection current iuh on the stationary reference frame by $2\omega\Delta T/(3)^{1/2}$, which is output from the proportional gain multiplier 90, and outputs the result as $(2\omega\Delta T/(3)^{1/2})$iuh.

The multiplier 100 multiplies the v-phase storage detection current ivh on the stationary reference frame by $2\omega\Delta T/(3)^{1/2}$, which is output from the proportional gain multiplier 90, and outputs the result as $(2\omega\Delta T/(3)^{1/2})$ivh.

The proportional gain multiplier 101 multiplies $(2\omega\Delta T/(3)^{1/2})$iuh, which is output from the multiplier 99, by ½ and outputs the result as $(\omega\Delta T/(3)^{1/2})$iuh. In addition, the proportional gain multiplier 101 may be configured to perform digital processing on a signal instead of multiplication of ½, so that the input is 1 bit shifted to the right.

The proportional gain multiplier 102 multiplies $(2\omega\Delta T/(3)^{1/2})$ivh, which is output from the multiplier 100, by ½ and outputs the result as $(\omega\Delta T/(3)^{1/2})$ivh. Similar to the proportional gain multiplier 101, the proportional gain multiplier 102 may also be configured to perform digital processing on a signal so that the input is 1 bit shifted to the right.

The subtracter 103 subtracts $(2\omega\Delta T/(3)^{1/2})$ivh, which is output from the multiplier 100, from the u-phase storage detection current iuh on the stationary reference frame and outputs the result as $\{iuh-(2\omega\Delta T/(3)^{1/2})ivh\}$.

The subtracter 104 subtracts $(\omega\Delta T/(3)^{1/2})$iuh, which is output from the proportional gain multiplier 101, from $\{iuh-(2\omega\Delta T/(3)^{1/2})ivh\}$, which is output from the subtracter 103, and outputs the result as $[\{(1-\omega\Delta T/(3)^{1/2})iuh\}-(2\omega\Delta T/(3)^{1/2})ivh]$.

Assuming that the u, v-phase storage detection currents iuh and ivh on the stationary reference frame are the state x(n) in expression (19), the output of the subtracter 104 is a first row of right side in expression (19). That is, the output of the subtracter 104 is the u-phase corrected storage detection current iuh0 on the stationary reference frame.

Similarly, the adder 105 adds $(2\omega\Delta T/(3)^{1/2})$iuh, which is output from the multiplier 99, to the v-phase storage detection current ivh on the stationary reference frame and outputs the result as $\{ivh+(2\omega\Delta T/(3)^{1/2})iuh\}$.

The adder 106 adds $(\omega\Delta T/(3)^{1/2})$ivh, which is output from the proportional gain multiplier 102, to $\{ivh+(2\omega\Delta T/(3)^{1/2})iuh\}$, which is output from the multiplier 105, and outputs the result as $[(2\omega\Delta T/(3)^{1/2})iuh+\{(1+\omega\Delta T/(3)^{1/2})ivh\}]$.

Assuming that the u, v-phase storage detection currents iuh and ivh on the stationary reference frame are the state x(n) in expression (19), the output of the adder 106 is a second row of right side in expression (19). That is, the output of the adder 106 is the v-phase corrected storage detection current ivh0 on the stationary reference frame.

Figure 15:
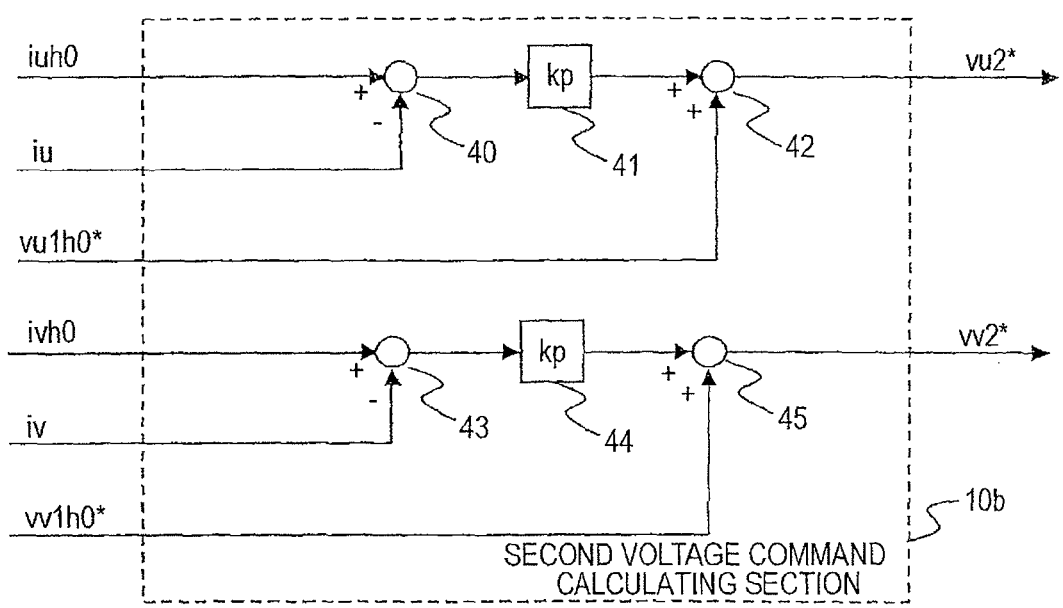
FIG. 15 is a block diagram showing the internal configuration of a second voltage command calculating section in the third embodiment.

FIG. 15 is a block diagram showing the internal configuration of the second voltage command calculating section 10b in the third embodiment. In FIG. 15, the same components as in FIG. 4 or components equivalent to those in FIG. 4 are denoted by the same reference numerals.

As can be seen from FIG. 15, the second voltage command calculating section 10b in the third embodiment is configured to omit the operation of calculating and outputting the second w-phase voltage command vw2* by the second voltage command calculating section 10 in the first and second embodiments. The others are the same as those of the second voltage command calculating section 10 in the first and second embodiments.

The time chart of the controller for an AC rotary machine according to the third embodiment is equal to that shown in FIG. 10, for example. Moreover, in the third embodiment, the reference frame transformation means 5 shown in the (b) column of FIG. 10 is replaced with the reference frame transformation means 5b, the reference frame transformation means 7 shown in the (d) column is replaced with the reference frame transformation means 7b, the storage section 9 shown in the (e) column is replaced with the storage section 9b, the phase correcting section 64 shown in the (f) column is replaced with the phase correcting section 64b, the second voltage command calculating section 10a shown in the (g) column is replaced with the second voltage command calculating section 10b, and the voltage command output means 11 shown in the (h) column is replaced with the voltage command output means 11b. Moreover, in the third embodiment, the "first voltage command" shown in the (h) column of FIG. 10 means the first u, v-phase voltage commands vu1* and vv1*, and the "second voltage command" means the second u, v-phase voltage commands vu2* and vv2*.

As described above, the controller for the AC rotary machine according to the third embodiment has a configuration where an operation regarding one phase is omitted by performing operations regarding two phases on the stationary reference frame. Therefore, an effect that the operation load can be reduced in proportion to the omission of the operation regarding one phase is obtained in addition to the effect in the second embodiment.

Fourth Embodiment

In the second and third embodiments, the cases have been described in which the voltage command output means 11 and 11b select the first voltage commands vu1*, vv1*, vw1*, and vu1*, vv1* as the voltage commands vu*, vv*, vw*, and vu*, vv* on the stationary reference, respectively, at the rate of one period in two periods of the first operation period ΔT. However, the voltage command output means 11 and 11b may be configured to select the first voltage commands vu1*, vv1*, vw1*, and vu1*, vv1* as the voltage commands vu*, vv*, vw*, and vu*, vv* on the stationary reference frame, respectively, at the rate of one period in three or more periods of the first operation period ΔT.

In a controller for an AC rotary machine according to a fourth embodiment, the voltage command output means 11b is configured to select the first voltage commands vu1*, vv1*, vw1*, or vu1*, vv1* as the voltage commands vu*, vv*, vw*, or vu*, vv* on the stationary reference frame at the rate of one period in three or more periods of the first operation period ΔT. Also in the fourth embodiment, the three-phase AC reference frame including U, V, and W phases are used as the stationary reference frame.

Figure 16:
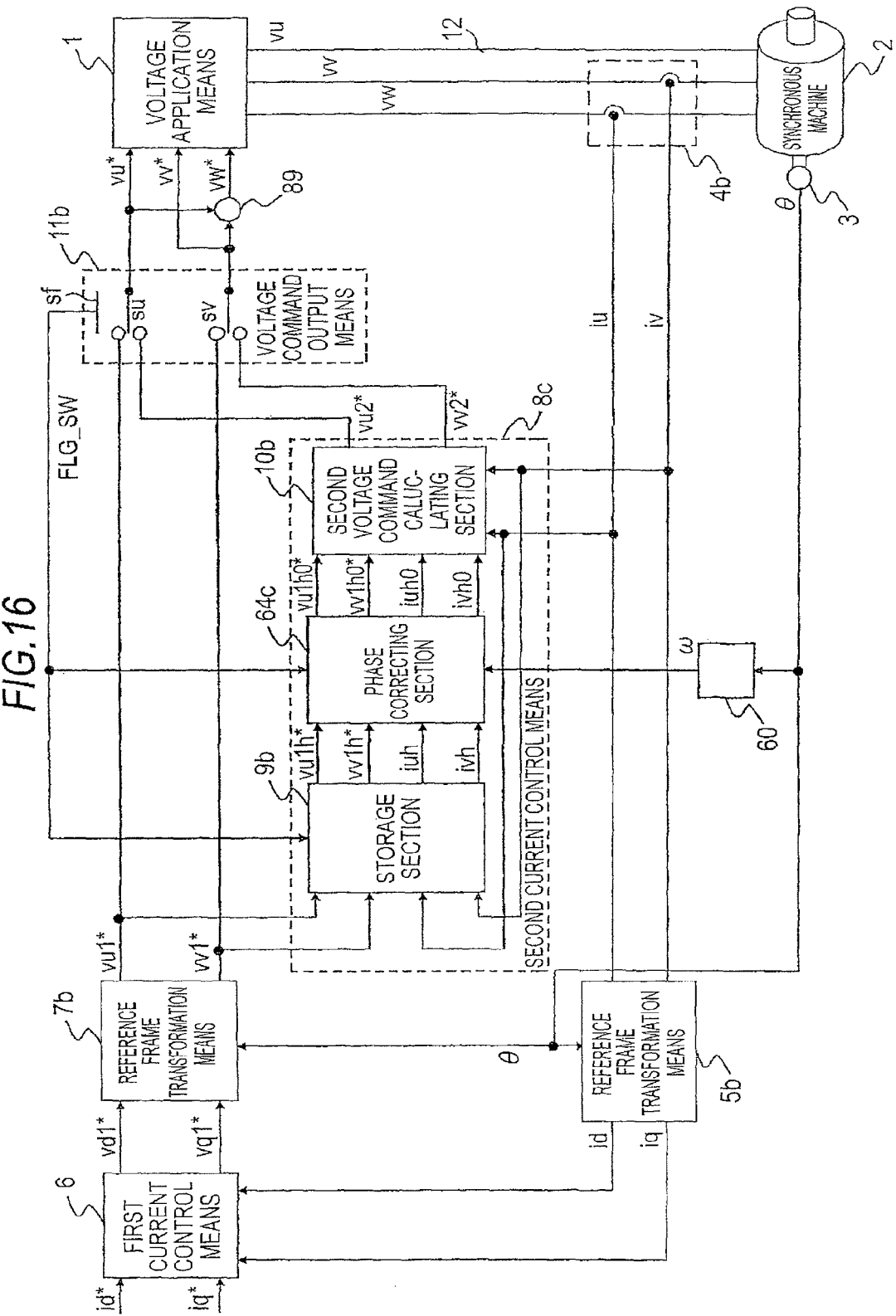
FIG. 16 is a block diagram showing the entire configuration of a controller for an AC rotary machine according to a fourth embodiment of the invention.

FIG. 16 is a block diagram showing the entire configuration of the controller for the AC rotary machine according to the fourth embodiment of the invention. In FIG. 16, the same components as in the first to third embodiments or components equivalent to those in the first to third embodiments are denoted by the same reference numerals. In the fourth embodiment, the second current control circuit 8b in the third embodiment is replaced with a second current control circuit 8c. The others in the fourth embodiment are the same as those in the third embodiment. The position detecting means 3 and the current detecting means 4b are the same as in the third embodiment.

The second current control means 8c is also formed by a digital circuit, and is included in a digital microcomputer. The second current control means 8c includes a storage section 9b, a phase correcting section 64c, and a second voltage command calculating section 10b. The storage section 9b and the second voltage command calculating section 10b in the second current control means 8c are the same as in the third embodiment.

In the fourth embodiment, the switching flag FLG_SW from the voltage command output means 11b is supplied to both the storage section 9b and the phase correcting section 64c of the second current control means 8c. Similar to the third embodiment, the storage section 9b stores the u, v-phase detection currents iu and iv on the stationary reference frame and the first u, v-phase voltage commands vu1* and vv1* on the stationary reference frame on the basis of the switching flag FLG_SW, and outputs the u, v-phase detection currents iu and iv on the stationary reference frame as the u, v-phase storage detection currents iuh and ivh on the stationary reference frame and also outputs the u, v-phase voltage commands vu1* and vv1* on the stationary reference frame as the u, v-phase storage voltage commands vu1h* and vv1h* on the stationary reference frame.

The phase correcting section 64c corrects the phases of the u, v-phase storage detection currents iuh and ivh on the stationary reference frame output from the storage section 9b on the basis of the flag FLG_SW output from the voltage command output means 11b and the primary angular frequency ω output from the primary angular frequency detecting means 60 and outputs the results as u, v-phase corrected storage detection currents iuh0 and ivh0 on the stationary reference frame, and also corrects the phases of the u, v-phase storage voltage commands vu1$h$* and vv1$h$* on the stationary reference frame output from the storage section 9b on the basis of the flag FLG_SW and the primary angular frequency ω and outputs the results as u, v-phase corrected storage voltage commands vu1$h$0* and vv1$h$0* on the stationary reference frame.

Similar to the third embodiment, the second voltage command calculating section 10b outputs second u, v-phase voltage commands vu2* and vv2* on the stationary reference frame on the basis of the u, v-phase corrected storage detection currents iuh0 and ivh0 on the stationary reference frame and the u, v-phase corrected storage voltage commands vu1$h$0* and vv1$h$0* on the stationary reference frame, which are output from the phase correcting section 64c, and the u, v-phase detection currents iu and iv on the stationary reference frame, which are output from the current detecting means 4b.

Figure 17:
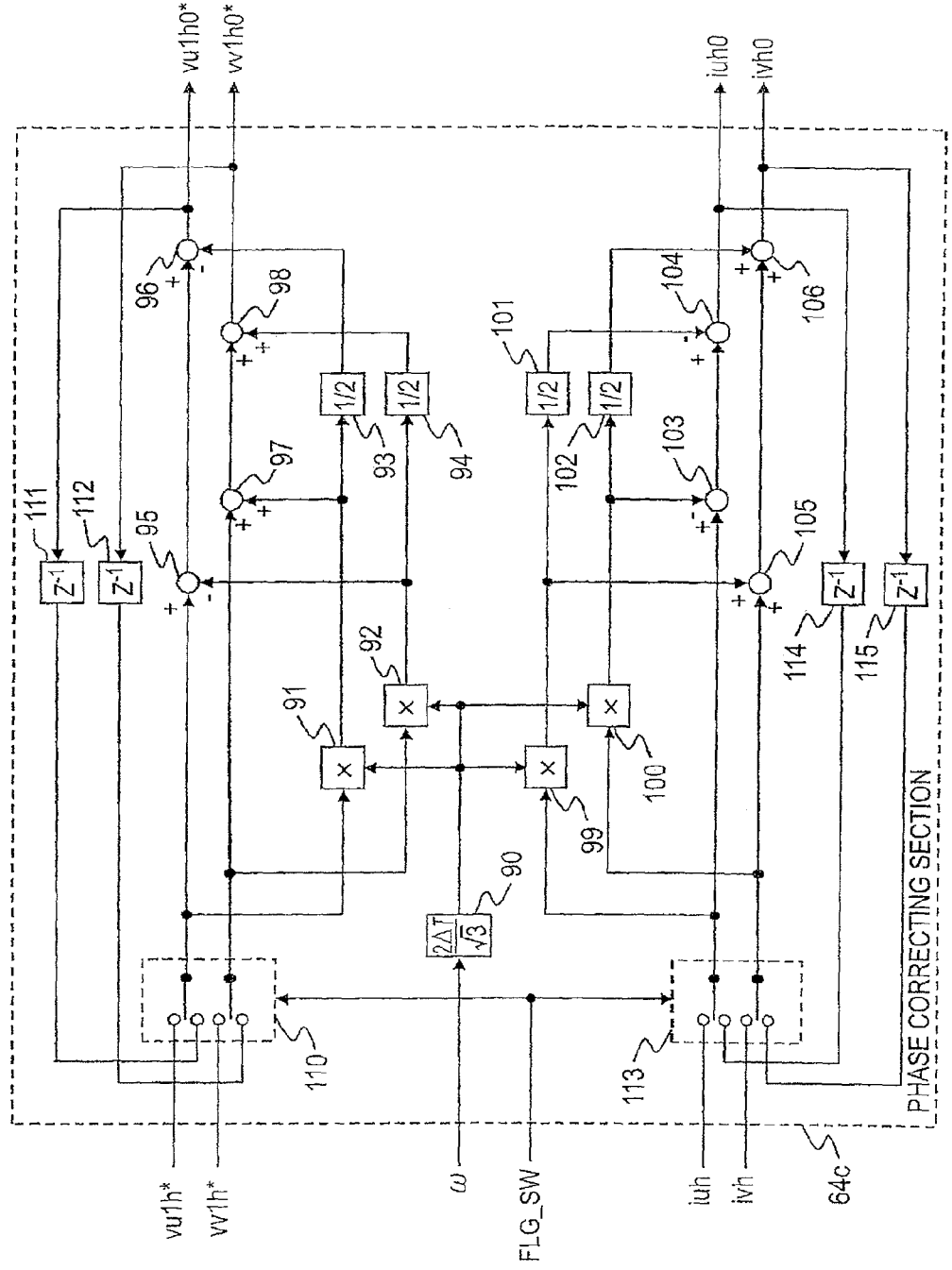
FIG. 17 is a block diagram showing the internal configuration of a phase correcting section in the fourth embodiment.

FIG. 17 is a block diagram showing the internal configuration of the phase correcting section 64c in the fourth embodiment. In FIG. 17, the same components as in FIG. 14 or components equivalent to those in FIG. 14 are denoted by the same reference numerals.

The phase correcting section 64c has a configuration where selectors 110 and 113 and delay and hold operators 111, 112, 114, and 115 are added to the phase correcting section 64b shown in FIG. 14.

When the switching flag FLG_SW output from the voltage command output means 11b is TRUE, the selector 110 selects the u, v-phase storage voltage commands vu1$h$* and vv1$h$* on the stationary reference frame and outputs them to the subtracter 95 and the adder 97. When the switching flag FLG_SW output from the voltage command output means 11b is FALSE, the selector 110 selects the outputs of the delay and hold operators 111 and 112 and outputs them to the subtracter 95 and the adder 97.

The delay and hold operator 111 delays the input of the u-phase corrected storage voltage command vu1$h$0*, which is output from the subtracter 96, by the first operation period ΔT and holds it.

The delay and hold operator 112 delays the input of the v-phase corrected storage voltage command vv1$h$0*, which is output from the adder 98, by the first operation period ΔT and holds it.

Similarly, when the switching flag FLG_SW output from the voltage command output means 11b is TRUE, the selector 113 selects the u, v-phase storage detection currents iuh and ivh on the stationary reference frame and outputs them to the subtracter 103 and the adder 105. When the switching flag FLG_SW output from the voltage command output means 11b is FALSE, the selector 113 selects the outputs of the delay and hold operators 114 and 115 and outputs them to the subtracter 103 and the adder 105.

The delay and hold operator 114 delays the input of the u-phase corrected storage detection current iuh0, which is output from the subtracter 104, by the first operation period ΔT and holds it.

The delay and hold operator 115 delays the input of the v-phase corrected storage detection current ivh0, which is output from the adder 106, by the first operation period ΔT and holds it.

Since the phase correcting section 64b in the third embodiment executes the phase correction of the u, v-phase storage detection currents iuh and ivh on the stationary reference frame and the phase correction of the u, v-phase storage voltage commands vu1$h$* and vv1$h$* on the stationary reference frame only once when the switching flag FLG_SW is FALSE, the voltage command output means 11b selects the first u, v-phase voltage commands vu1* and vv1* as the u, v-phase voltage commands vu*, and vv* on the stationary reference frame at the rate of one period in two periods of the first operation period ΔT.

On the other hand, the phase correcting section 64c in the fourth embodiment executes the phase correction of the u, v-phase storage detection currents iuh and ivh on the stationary reference frame and the phase correction of the u, v-phase storage voltage commands vu1$h$* and vv1$h$* on the stationary reference frame repeatedly for every first operation period ΔT. Accordingly, the voltage command output means 11b can select the first u, v-phase voltage commands vu1* and vv1* as the u, v-phase voltage commands vu*, and vv* on the stationary reference frame at the rate of one period in three or more periods of the first operation period ΔT.

FIG. 18 is a chart showing an example of time chart in the controller for the AC rotary machine according to the fourth embodiment. The time chart shown in FIG. 18 is a time chart when the second operation period ΔT1 by the first current control means 6 is set to five times the first operation period ΔT and the voltage command output means 11b selects the first u, v-phase voltage commands vu1* and vv1* as the u, v-phase voltage commands vu* and vv* on the stationary reference frame at the rate of one period in five periods of the first operation period ΔT.

In the time chart shown in FIG. 18, time 0, ΔT, 2ΔT, . . . , 12ΔT are shown in the (a) column. In the (b) column, the execution state of the reference frame transformation means 5b is shown corresponding to each time 0, ΔT, 2ΔT, . . . , 12ΔT in the (a) column. In the (c) column, the execution state of the first current control means 6 is shown corresponding to each time 0, ΔT, 2ΔT, . . . , 12ΔT in the (a) column. In the (d) column, the execution state of the reference frame transformation means 7b is shown corresponding to each time 0, ΔT, 2ΔT, . . . , 12ΔT in the (a) column. The reference frame transformation means 5b, the first current control means 6, and the reference frame transformation means 7b are executed at time 0, 5ΔT, and 10ΔT repeated at the second operation periods ΔT1, but are not executed at other times.

In the (e) column of FIG. 18, the operating state of the storage section 9b is shown corresponding to each time 0, ΔT, 2ΔT, . . . , 12ΔT in the (a) column. As is apparent from the (e) column, in the storage section 9b, a storage operation is performed at time 0 and a hold operation for holding the storage value, which is stored at time 0, is performed from time ΔT subsequent to time 0 to time 4ΔT. Similarly, in the storage section 9b, the storage operation is performed at time 5ΔT and the hold operation for holding the storage value, which is stored at time 5ΔT, is performed from time 6ΔT subsequent to time 5ΔT to time 9ΔT. Similarly, in the storage section 9, the storage operation is performed at time 10ΔT and the hold operation for holding the storage value, which is stored at time 10ΔT, is performed at time 11ΔT and 12ΔT subsequent to time 10ΔT.

In the (f) column of FIG. 18, the execution state of the phase correcting section 64c is shown corresponding to each time 0, ΔT, 2ΔT, . . . , 12ΔT in the (a) column. In the (g) column of FIG. 18, the execution state of the second voltage command calculating section 10b is shown corresponding to each time 0, ΔT, 2ΔT, . . . , 12ΔT in the (a) column. The phase correcting sections 64c and the second voltage command calculating section 10b are executed at time ΔT, 2ΔT, 3ΔT, 4ΔT, 6ΔT, 7ΔT, 8ΔT, 9ΔT, 11ΔT, and 12ΔT, but are not executed at time 0, 5ΔT, and 10ΔT.

In the (h) column of FIG. 18, it is shown which of the "first voltage command" and the "second voltage command" was selected by the voltage command output means 11*b* corresponding to each time 0, ΔT, 2ΔT, . . . , 12ΔT in the (a) column. In the fourth embodiment, the "first voltage command" means the first u, v-phase voltage commands vu1* and vv1*, and the "second voltage command" means the second u, v-phase voltage commands vu2* and vv2*. The voltage command output means 11*b* selects the first u, v-phase voltage commands vu1* and vv1* at time 0, 5ΔT, and 10ΔT, and selects the second u, v-phase voltage commands vu2* and vv2* at other times 2ΔT to 4ΔT, 6ΔT to 9ΔT, 11ΔT, and 12ΔT.

As can be understood from the time chart shown in FIG. 18, the voltage command output means 11*b* selects the first u, v-phase voltage commands vu1* and vv1* at the rate of one period in five periods of the first operation period ΔT and selects the second u, v-phase voltage commands vu2* and vv2* for the remaining four periods. The storage section 9*b* performs a storage operation at the rate of one period in five periods of the first operation period ΔT and holds the stored thing for the remaining four periods. In addition, the reference frame transformation means 5*b* and 7*b* and the first current control means 6 may be executed only at the rate of one period in five periods of the first operation period ΔT, and the phase correcting section 64*c* and the second voltage command calculating section 10*b* are executed for the remaining four periods.

Here, the amount of operations of the phase correcting section 64*c* and the second voltage command calculating section 10*b* is smaller than that of the reference frame transformation means 5*b* and 7*b* and the first current control means 6. Thus, in the fourth embodiment, the phase correcting section 64*c* can also perform the operation repeatedly at time intervals of ΔT. Accordingly, the operations of the reference frame transformation means 5*b* and 7*b* and the first current control means 6 can be executed only at the rate of one period in several periods of the first operation period ΔT, and the operations of the reference frame transformation means 5*b* and 7*b* and the first current control means 6 can be omitted for the remaining periods. As a result, an effect is obtained in which a load increase in the operation performed by a digital microcomputer and the like can be suppressed even if the operation period of proportional operation is made short.

Figure 19:
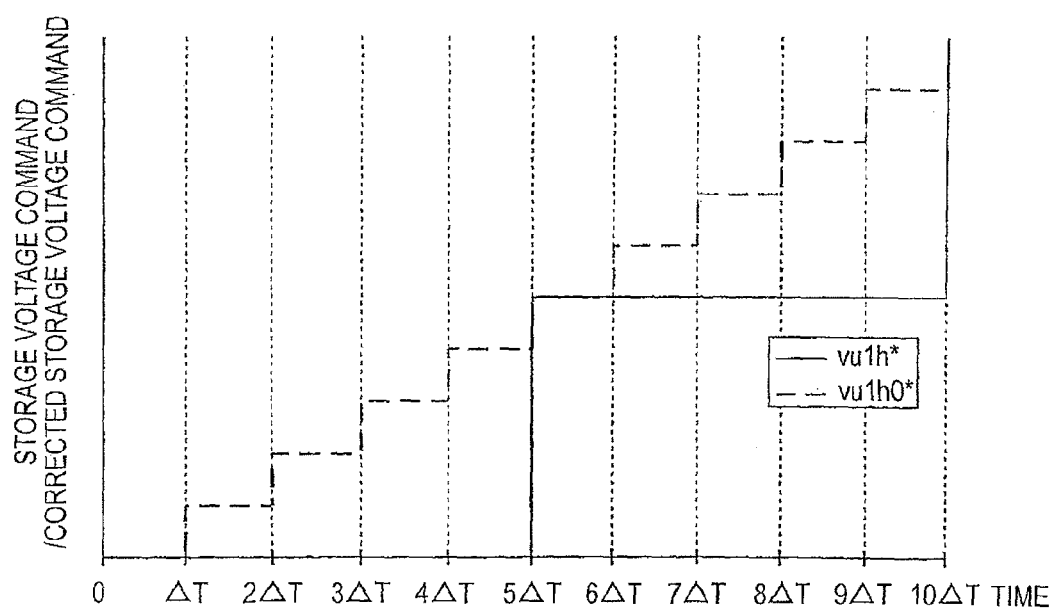
FIG. 19 is a waveform chart showing an example of an operation waveform of the controller for an AC rotary machine according to the fourth embodiment.

FIG. 19 shows examples of operation waveforms of the u-phase storage voltage command vu1*h** on the stationary reference frame and the u-phase corrected storage voltage command vu1*h*0* on the stationary reference frame in the case where the controller for the AC rotary machine according to the fourth embodiment is made to operate according to the time chart shown in FIG. 18. In this example, a section where the u-phase storage voltage command vu1*h** on the stationary reference frame increases monotonously is plotted.

Although the value of the u-phase storage voltage command vu1*h on the stationary reference frame is updated at time 0, 5ΔT, 10ΔT, . . . , the phase correcting section 64***c* corrects the u-phase storage voltage command vu1*h** at time ΔT, 2ΔT, 3ΔT, 4ΔT, 6ΔT, 7ΔT, . . . and outputs the result as the u-phase corrected storage voltage command vu1*h*0* on the stationary reference frame.

Thus, it can be easily understood by FIG. 19 that using the u-phase corrected storage voltage command vu1*h*0* on the stationary reference frame rather than using the u-phase storage voltage command vu1*h** on the stationary reference frame makes the u-phase AC voltage vu smooth, and as a result, that the current of an AC rotary machine on the stationary reference frame becomes smooth.

In addition, although the relationship between the u-phase storage voltage command vu1*h** and the u-phase corrected storage voltage command vu1*h*0* has been described in FIG. 19, the same is true for the relationship between the other v, w-phase storage voltage commands vv1*h** and vw1*h** and the v, w-phase corrected storage voltage commands vv1*h*0* and vw1*h*0.

Moreover, it is needless to say that the same is true for the relationship between the u, v-phase storage detection currents iuh and ivh and the u, v-phase corrected storage detection currents iuh0 and ivh0.

As described above, the controller for the AC rotary machine according to the fourth embodiment is advantageous in that the current of the AC rotary machine on the stationary reference frame during a period, for which the operations of the first current control means 6 and the reference frame transformation means 5*b* and 7*b* are omitted, can be made smooth, in addition to the effects that the operation load when performing an operation using a digital microcomputer and the like can be reduced while maintaining the highly reliable current control performance against disturbance, which is caused by variation in the power supply voltage or the like, by making the operation period of proportional operation short.

Fifth Embodiment

In the fourth embodiment, in the configuration shown in FIG. 17, the phase correcting section 64*c* corrects the phases of the u, v-phase storage detection currents iuh and ivh on the stationary reference frame and outputs the results as the u, v-phase corrected storage detection currents iuh0 and ivh0 on the stationary reference frame, and also corrects the phases of the u, v-phase storage voltage commands vu1*h** and vv1*h** on the stationary reference frame and outputs the results as the u, v-phase corrected storage voltage commands vu1*h*0* and vv1*h*0* on the stationary reference frame. However, the configuration of the phase correcting section 64*c* shown in FIG. 17 may be replaced with the configuration shown in FIG. 20.

Figure 20:
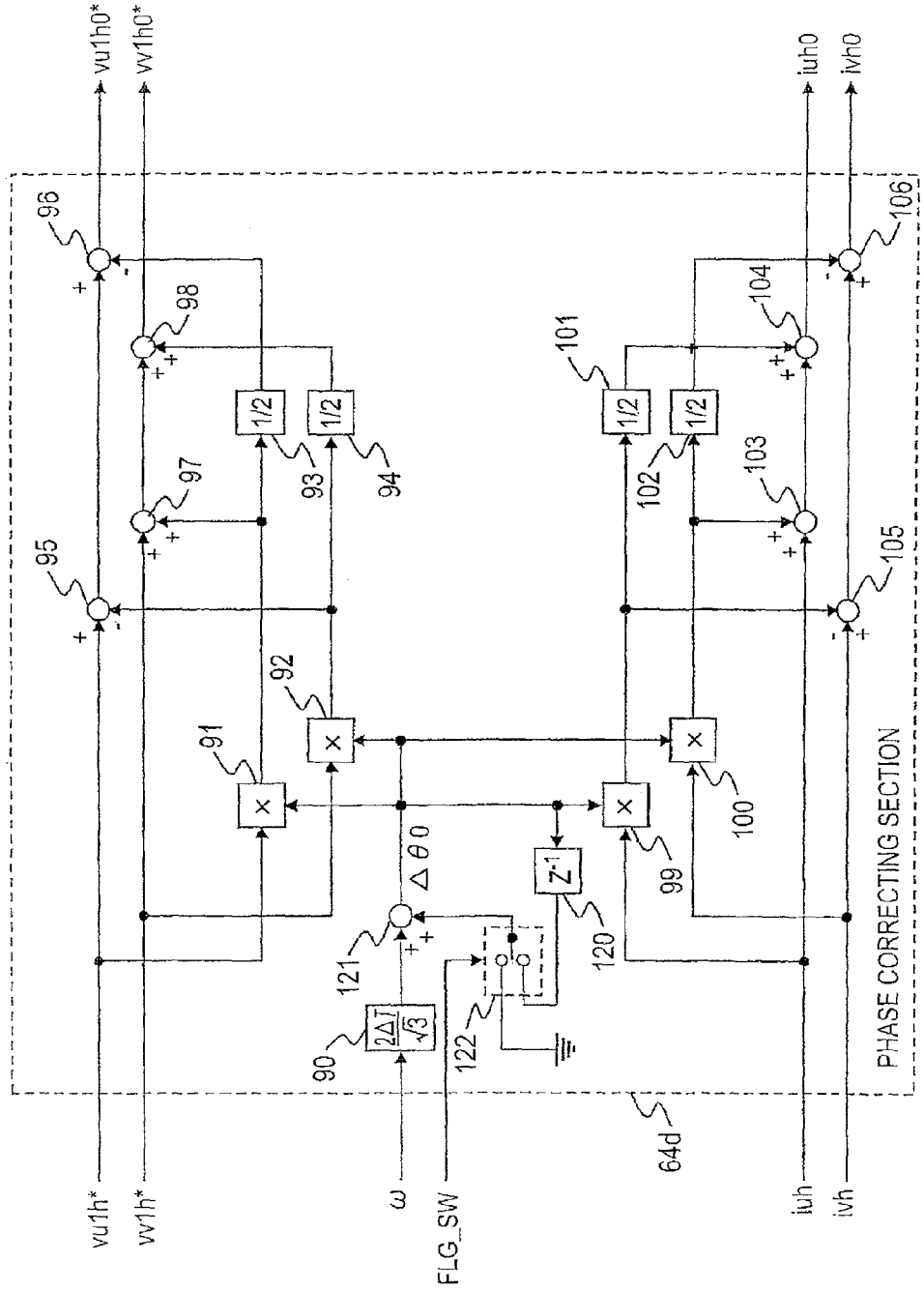
FIG. 20 is a block diagram showing the internal configuration of a phase correcting section in a controller for an AC rotary machine according to a fifth embodiment of the invention.

In a controller for an AC rotary machine according to a fifth embodiment 5, the phase correcting section 64*b* in the third embodiment is replaced with a phase correcting section 64*d* and the phase correcting section 64*d* is configured as shown in FIG. 20. The phase correcting section 64*d* is also formed by a digital circuit, and is included in a digital microcomputer. In FIG. 20, the same components as in FIG. 14 or components equivalent to those in FIG. 14 are denoted by the same reference numerals. Also in the fifth embodiment, the three-phase AC reference frame including U, V, and W phases are used as the stationary reference frame.

The phase correcting section 64*d* is configured to additionally include a delay and hold operator 120, an adder 121, and a selector 122 in the phase correcting section 64*b* shown in FIG. 14. Other than this, the phase correcting section 64*d* is the same as the phase correcting section 64*b*.

The delay and hold operator 120 delays the input of the corrected phase Δθ0, which is output from the adder 121, by the first operation period ΔT and holds it.

When the switching flag FLG_SW output from the voltage command output means 11*b* is TRUE, the selector 122 selects the ground potential, that is, zero potential and outputs it to the adder 121. When the switching flag FLG_SW output from the voltage command output means 11*b* is FALSE, the selector 122 selects the output of the delay and hold operator 120 and outputs it to the adder 121.

The adder 121 adds the value, which is selected and output by the selector 122, to $2\omega\Delta T/(3)^{1/2}$, which is output from the proportional gain multiplier 90, and outputs the result as the corrected phase $\Delta\theta 0$.

Through the above configuration, the phase correcting section 64d executes the phase correction of the u, v-phase storage detection currents iuh and ivh on the stationary reference frame and the phase correction of the u, v-phase storage voltage commands vu1h*, and vv1h* on the stationary reference frame repeatedly at time intervals equal to the first operation period $\Delta T$ even when the switching flag FLG_SW is FALSE. Therefore, an effect that the current of the AC rotary machine on the stationary reference frame during a period, for which the operations of the first current control means 6 and the reference frame transformation means 5b and 7b are omitted, can be made smooth is obtained in addition to the effects that the operation load when performing an operation using a digital microcomputer and the like can be reduced while maintaining the highly reliable current control performance against disturbance, which is caused by variation in the power supply voltage or the like, by making the operation period of proportional operation short similar to the fourth embodiment.

Sixth Embodiment

Although the cases where the AC rotary machine 2 is formed by a synchronous motor have been described in the first to fifth embodiments, the AC rotary machine is not limited to the synchronous machine, and an induction machine may also be used.

Figure 21:
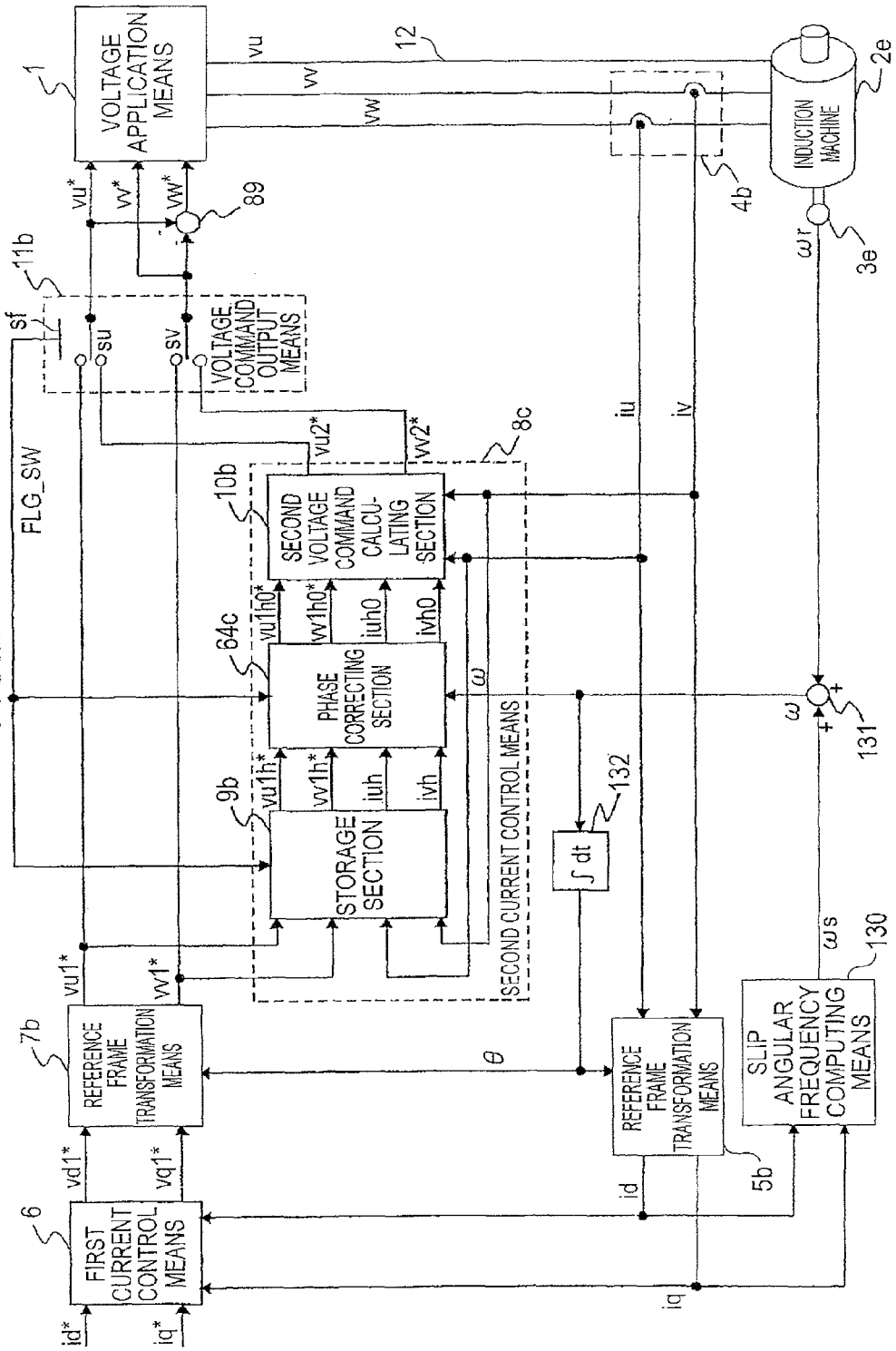
FIG. 21 is a block diagram showing the entire configuration of a controller for an AC rotary machine according to a sixth embodiment of the invention.

FIG. 21 is a block diagram showing the entire configuration of a controller for an AC rotary machine according to a sixth embodiment of the invention. In FIG. 21, the same components as in the fourth embodiment or components equivalent to those in the fourth embodiment are denoted by the same reference numerals. Also in the sixth embodiment, the three-phase AC reference frame including U, V, and W phases are used as the stationary reference frame.

Compared with the fourth embodiment, the controller for the AC rotary machine according to the sixth embodiment has a configuration where the AC rotary machine 2 is replaced with an induction motor 2e and accordingly, the position detecting means 3 is replaced with an angular velocity detecting means 3e, and the primary angular frequency detecting means 60 is removed, and a slip angular frequency calculating means 130, an adder 131, and an integrator 132 are added in the controller for the AC rotary machine according to the sixth embodiment. The slip angular frequency calculating means 130, the adder 131, and the integrator 132 are formed by digital circuits. The slip angular frequency calculating means 130, the adder 131, the integrator 132, the reference frame transformation means 5b and 7b, the first current control means 6, the second current control means 8c, and the voltage command output means 11b are formed using a digital microcomputer. In the sixth embodiment, the voltage application means 1 and the current detecting means 4b are the same as in the fourth embodiment.

The voltage application means 1 generates the three-phase AC voltages vu, vv, and vw and applies the three-phase AC voltages vu, vv, and vw to the induction motor 2e through the three-phase power supply line 12.

The angular velocity detecting means 3e is combined with a rotary shaft of the induction motor 2e and detects the rotational angular velocity ωr of the induction motor 2e. The angular velocity detecting means 3e includes an AD conversion means therein. The rotational angular velocity ωr is detected as an analog signal, but it is converted into a digital signal by the built-in AD conversion means and is then output. The rotational angular velocity ωr is output from the angular velocity detecting means 3e at each second operation timing repeated at the second operation periods $\Delta T1$. The rotational angular velocity ωr is updated at each second operation timing and is held until the next second operation timing.

At each second operation timing repeated at the second operation periods $\Delta T1$, the slip angular frequency calculating means 130 outputs the ωs on the basis of a d-axis component id and a q-axis component iq of two-phase detection currents id and iq on the rotating reference frame, which are output from the reference frame transformation means 5b, using a known method.

The adder 131 adds the rotational angular velocity ωr, which is output from the angular velocity detecting means 3e, and the slip angular frequency ωs, which is output from the slip angular frequency calculating means 130, and outputs a primary angular frequency ω at each second operation timing.

The integrator 132 integrates the primary angular frequency ω output from the adder 131 and outputs the phase θ at each second operation timing.

The reference frame transformation means 5b and 7b performs reference frame transformation on the basis of the phase θ, which is output as an arbitrary phase from the integrator 132, at each second operation timing. Similar the fourth embodiment, the reference frame transformation means 5b outputs the two-phase detection currents id and iq on the rotating reference frame, and the two-phase detection currents id and iq are updated at each second operation timing. Similar the fourth embodiment, the reference frame transformation means 7b outputs the first u, v-phase voltage commands vu1* and vv1* on the rotating reference frame at each second operation timing. Since the two-phase voltage commands vd* and vq* are updated by the first current control means 6 at each second operation timing repeated at the second operation periods $\Delta T1$, the first u, v-phase voltage commands vu1* and vv1* are updated at each second operation timing similar to the fourth embodiment.

As described above, according to the sixth embodiment, the AC rotary machine may also be applied to the induction machine without being limited to the synchronous machine. According to the first to sixth embodiments, the invention may be applied to all kinds of AC rotary machines including the synchronous machine and the induction machine.

Moreover, in the sixth embodiment, the AC rotary machine 2 is replaced with the induction motor 2e and accordingly, the position detecting means 3 is replaced with the angular velocity detecting means 3e, and the primary angular frequency detecting means 60 is removed, and the slip angular frequency calculating means 130, the adder 131, and the integrator 132 are added in the fourth embodiment. However, the first to third and fifth embodiments may also be changed to control an induction machine in the same manner. In the case of controlling the induction machine in the first embodiment, it is preferable to replace the AC rotary machine 2 with the induction motor 2e and accordingly, to replace the position detecting means 3 with the angular velocity detecting means 3e and to add the slip angular frequency calculating means 130, the adder 131, and the integrator 132. In the case of controlling the induction machine in the second, third, and fifth embodiments, it is preferable to replace the AC rotary machine 2 with the induction motor 2e and accordingly, to replace the position detecting means 3 with the angular velocity detecting means 3e, to remove the primary angular frequency detecting means 60, and to add the slip angular frequency calculating means 130, the adder 131, and the integrator 132.

Seventh Embodiment

Although the main operation is realized by digital operation using a digital microcomputer and the like in the first to sixth embodiments, digital operation and analog operation may be mixed in the controller for the AC rotary machine.

Figure 22:
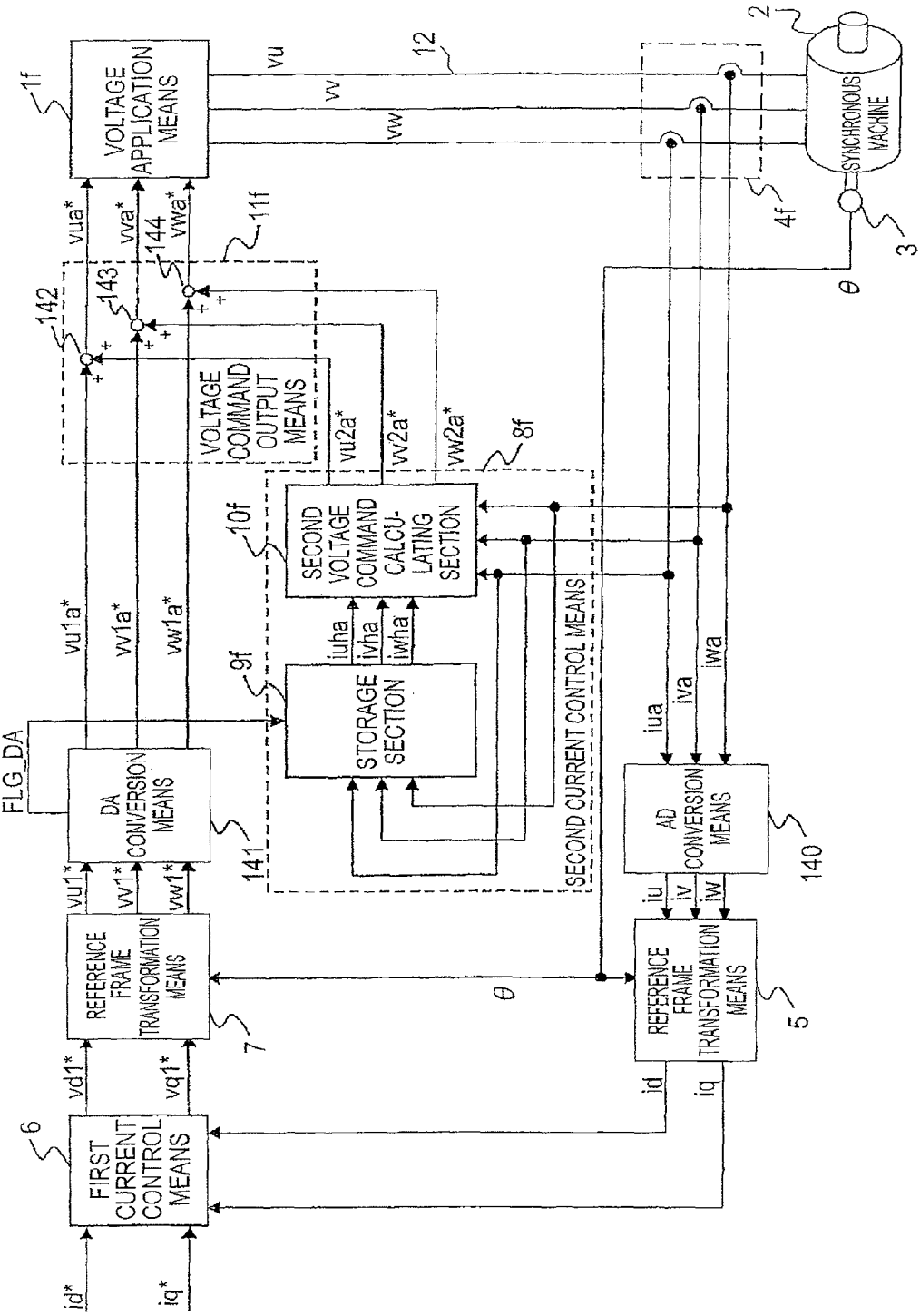
FIG. 22 is a block diagram showing the entire configuration of a controller for an AC rotary machine according to a seventh embodiment of the invention.

FIG. 22 is a block diagram showing the entire configuration of a controller for an AC rotary machine according to a seventh embodiment of the invention. In FIG. 22, the same components as in the first embodiment or components equivalent to those in the first embodiment are denoted by the same reference numerals. Also in the seventh embodiment, the three-phase AC reference frame including U, V, and W phases are used as the stationary reference frame.

The controller for the AC rotary machine according to the seventh embodiment includes a voltage application means 1f, a position detecting means 3, a current detecting means 4f, reference frame transformation means 5 and 7, a first current control means 6, a second current control means 8f, a voltage command output means 11f, an AD conversion means 140, and a DA conversion means 141, and controls the AC rotary machine 2.

Unlike the voltage application means 1 in the first embodiment, the voltage application means 1f generates three-phase AC voltages vu, vv, and vw on the basis of analog three-phase voltage commands vua*, vva*, and vwa*, and applies the three-phase AC voltages vu, vv, and vw to the AC rotary machine 2 through the three-phase power supply line 12. Although the AC rotary machine 2 is formed as a synchronous motor or an induction motor, it is formed as a synchronous motor in the seventh embodiment.

The three-phase voltage commands vua*, vva*, and vwa* are analog voltage commands on the stationary reference frame. The voltage application means 1f converts the internal bus voltage into the three-phase AC voltages vu, vv, and vw on the basis of the analog three-phase voltage commands vua*, vva*, and vwa and applies them to the synchronous motor 2.

The position detecting means 3 is formed in the same manner as in the first embodiment and includes an AD conversion means therein. The position detecting means 3 outputs the digital rotation position θ at each second operation timing repeated at second operation periods ΔT1.

The current detecting means 4f is combined with the three-phase power supply line 12 and outputs analog three-phase detection currents iva, iva, and iwa on the stationary reference frame. The analog three-phase detection currents iva, iva, and iwa always change in proportion to a change in a current of the AC rotary machine 2. The analog three-phase detection currents iva, iva, and iwa are supplied to the second current control means 8f and the AD conversion means 140.

The reference frame transformation means 5, the first current control means 6, and the reference frame transformation means 7 are formed by digital circuits similar to the first embodiment. The AD conversion means 140 converts the analog three-phase detection currents iva, iva, and iwa from the current detecting means 4f into digital three-phase detection currents at each second operation timing, which is repeated at the second operation periods ΔT1, in order to generate the digital three-phase detection currents iu, iv, and iw and supplies the digital three-phase detection currents iu, iv, and iw to the reference frame transformation means 5. The digital three-phase detection currents iu, iv, and iw are updated at each second operation timing and are held until the next second operation timing.

The DA conversion means 141 converts the digital first three-phase voltage commands vu1*, vv1*, and vw1*, which are output from the reference frame transformation means 7, into the analog first three-phase voltage commands vu1a*, vv1a*, and vw1a* at each second operation timing, which is repeated at the second operation periods ΔT1, and outputs it. The first current control means 6 updates and outputs the two-phase voltage commands vd1* and vq2* on the rotating reference frame at each second operation timing repeated at the second operation periods ΔT1 similar to the first embodiment, and the reference frame transformation means 7 converts the two-phase voltage commands id* and iq* into the first three-phase voltage commands vu1*, vv1*, and vw1* and outputs them at each second operation timing repeated at the second operation periods ΔT1 similar to the first embodiment. Moreover, the DA conversion means 141 also converts the digital first three-phase voltage commands vu1*, vv1*, and vw1* into analog first three-phase voltage commands vu1a*, vv1a*, and vw1a* and outputs them at each second operation timing similar to the first current control means 6 and the reference frame transformation means 7. The analog first three-phase voltage commands vu1a*, vv1a*, and vw1a* are updated at each second operation timing and are held until the next second operation timing.

In addition, the DA conversion means 141 changes the conversion flag FLAG_DA between TRUE and FALSE at each second operation timing repeated at the second operation periods ΔT1. The conversion flag FLAG_DA changes from TRUE to FALSE at the initial second operation timing and changes from FALSE to TRUE at the following second operation timing. Thereafter, this operation is also repeated so that the conversion flag FLAG_DA changes between TRUE and FALSE every second operation timing.

The second current control means 8f and the voltage command output means 11f are formed by analog circuits. The second current control means 8f includes a storage section 9f and a second voltage command calculating section 10f. The storage section 9f stores the analog three-phase detection currents iva, iva, and iwa output from the current detecting means 4f at timing when the conversion flag FLAG_DA changes between TRUE and FALSE, that is, at each second operation timing repeated at the second operation periods ΔT1. The analog three-phase detection currents iva, iva, and iwa stored at each second operation timing are held in the storage section 9f and output as analog three-phase storage detection currents iuha, ivha, and iwha. The analog three-phase storage detection currents iuha, ivha, and iwha are updated at each second operation timing and are held until the next second operation timing.

The second voltage command calculating section 10f subtracts the analog three-phase detection currents iva, iva, and iwa from the analog three-phase storage detection currents iuha, ivha, and iwha output from the storage section 9f in order to calculate the deviations (iuha-iva), (ivha-iva), and (iwha-iwa), multiplies the deviations (iuha-iva), (ivha-iva), and (iwha-iwa) by corresponding proportional gains, and outputs analog second three-phase voltage commands vu2a*, vv2a*, and vw2a*. During a period of two adjacent second operation timings, the analog three-phase storage detection currents iuha, ivha, and iwha have the values updated at the last second operation timing. However, also in this period, the analog three-phase detection currents iva, iva, and iwa change with a change in the current of the AC rotary machine 2. Therefore, also during the period of two adjacent second operation timings, the analog second three-phase voltage commands vu2a*, vv2a*, and vw2a* change according to the current change of the AC rotary machine 2.

The voltage command output means 11f performs an operation of adding the analog first three-phase voltage commands vu1a*, vv1a*, and vw1a*, which are output from the DA conversion means 141, and the analog second three-phase voltage commands vu2a*, vv2a*, and vw2a*, which are output from the second voltage command calculating section 10f, respectively, and outputs analog three-phase voltage commands vua*, vva*, and vwa* to the voltage application means 1f. The voltage command output means 11f includes adders 142, 143, and 144. The adder 142 adds the analog first u-phase voltage command vu1a* and the analog second u-phase voltage command vu2a* and outputs the analog u-phase voltage command vua*. The adder 143 adds the analog first v-phase voltage command vv1a* and the analog second v-phase voltage command vv2a* and outputs the analog v-phase voltage command vva*. The adder 144 adds the analog first w-phase voltage command vw1a* and the analog second w-phase voltage command vw2a* and outputs the analog w-phase voltage command vwa*. The operations of the adders 142, 143, and 144 may be realized by analog operation using operational amplifiers as is known in the related art. The analog three-phase voltage command vua*, vva*, and vwa* are always supplied to the voltage application means 1.

Figure 23:
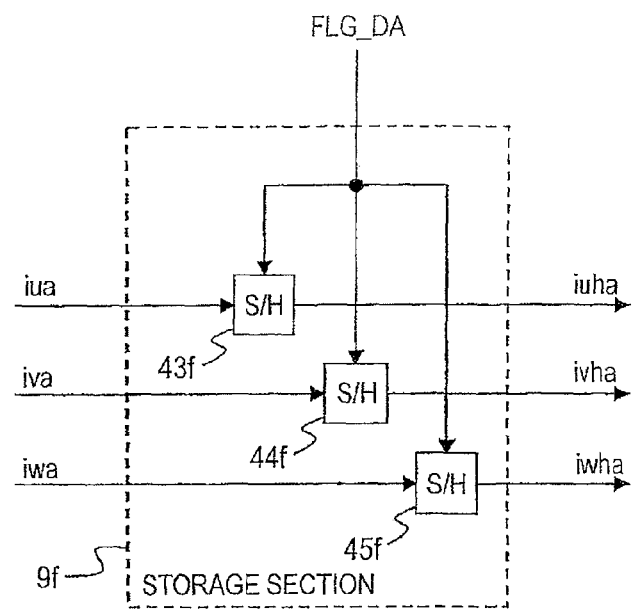
FIG. 23 is a block diagram showing the internal configuration of a storage section in the seventh embodiment.

FIG. 23 is a block diagram showing the internal configuration of the storage section 9f in the seventh embodiment. The storage section 9f includes sample and hold parts 43f, 44f, and 45f. The sample and hold parts 43f, 44f, and 45f are controlled by the conversion flag FLAG_DA output from the DA conversion means 141.

The sample and hold part 43f samples and holds the analog u-phase detection current iva at timing when the conversion flag FLAG_DA changes from TRUE to FALSE and timing when the conversion flag FLAG_DA changes from FALSE to TRUE, and stores it as the analog u-phase storage detection current iuha. In addition, during a period for which the conversion flag FLAG_DA does not change, the sample and hold part 43f outputs the held u-phase storage detection current iuha as an analog u-phase storage detection current.

Similarly, the sample and hold part 44f samples and holds the analog v-phase detection current iva at timing when the conversion flag FLAG_DA changes from TRUE to FALSE and timing when the conversion flag FLAG_DA changes from FALSE to TRUE, and stores it as the analog v-phase storage detection current ivha. In addition, during a period for which the conversion flag FLAG_DA does not change, the sample and hold part 44f outputs the held v-phase storage detection current ivha as an analog v-phase storage detection current.

Similarly, the sample and hold part 45f samples and holds the analog w-phase detection current iwa at timing when the conversion flag FLAG_DA changes from TRUE to FALSE and timing when the conversion flag FLAG_DA changes from FALSE to TRUE, and stores it as the analog w-phase storage detection current iwha. In addition, during a period for which the conversion flag FLAG_DA does not change, the sample and hold part 45f outputs the held w-phase storage detection current iwha as an analog w-phase storage detection current.

In addition, the sample and hold parts 43f, 44f, and 45f may be realized by analog switches and capacitors as is known in the related art.

Figure 24:
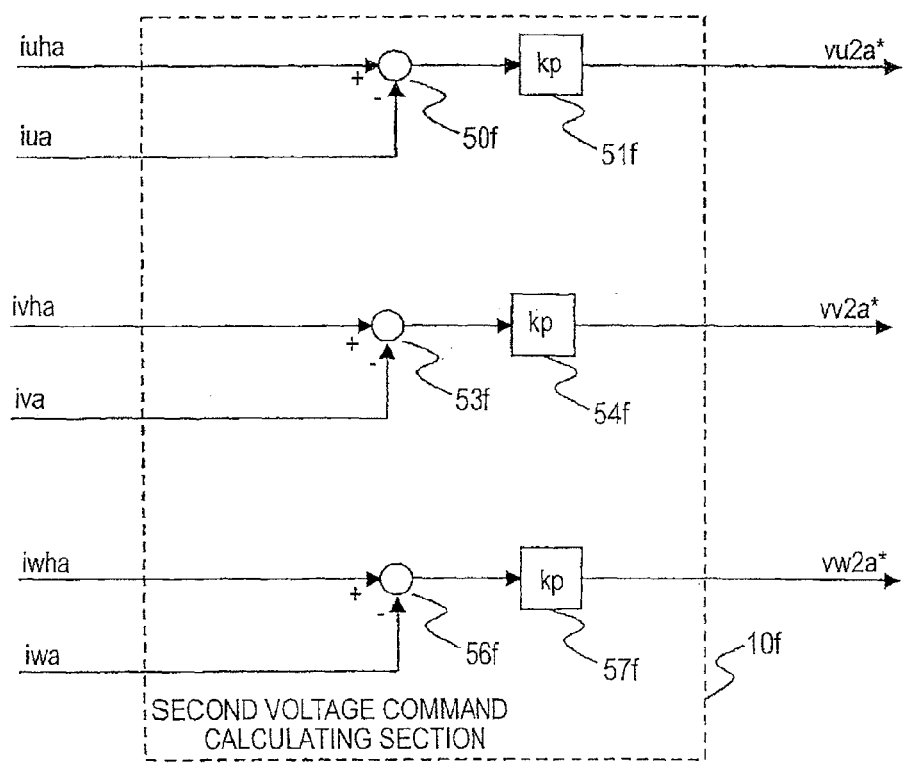
FIG. 24 is a block diagram showing the internal configuration of a second voltage command calculating section in the seventh embodiment.

FIG. 24 is a block diagram showing the internal configuration of the second voltage command calculating section 10f in the seventh embodiment. The second voltage command calculating section 10f includes subtracters 50f, 53f, and 56f and proportional gain multipliers 51f, 54f, and 57f.

The subtracter 50f subtracts the analog u-phase detection current iva, which is output from the current detecting means 4f, from the analog u-phase storage detection current iuha, which is output from the storage section 9f, and outputs the deviation to the proportional gain multiplier 51f. The proportional gain multiplier 51f multiplies the output of the subtracter 50f by kp and outputs the analog second u-phase voltage command vu2a*.

Similarly, the subtracter 53f subtracts the analog v-phase detection current iva, which is output from the current detecting means 4f, from the analog v-phase storage detection current iuha, which is output from the storage section 9f, and outputs the deviation to the proportional gain multiplier 54f. The proportional gain multiplier 54f multiplies the output of the subtracter 53f by kp and outputs the analog second v-phase voltage command vv2a*.

Similarly, the subtracter 56f subtracts the analog w-phase detection current iwa, which is output from the current detecting means 4f, from the analog w-phase storage detection current iwha, which is output from the storage section 9, and outputs the deviation to the proportional gain multiplier 57f. The proportional gain multiplier 57f multiplies the output of the subtracter 56f by kp and outputs the analog second w-phase voltage command vw2a*.

In addition, the operations of the subtracter 50f and the proportional gain multiplier 51f, the operations of the subtracter 53f and the proportional gain multiplier 54f, and the operations of the subtracter 56f and the proportional gain multiplier 57f may be realized by analog operations using operational amplifiers.

As described above, in the controller for the AC rotary machine according to the seventh embodiment, the second current control means 8f is made to perform an analog operation and the voltage command output means 11f is formed by an analog adder. Accordingly, it is possible to increase the response speed of current control in addition to an effect that the operation amount in performing a digital operation can be reduced. In addition, since the operation of the second current control means 8f can be performed in high processing speed by analog operation, the effects are obtained in which the current control response speed can be increased and it is possible to maintain the highly reliable current control performance against disturbance.

Also in the seventh embodiment, one of the analog first u, v, w-phase voltage commands vu1a*, vv1a*, and vw1a*, one of the analog second u, v, w-phase voltage commands vu2a*, vv2a*, and vw2a*, and one of the adders 142, 143, and 144 may be omitted and the same subtracter 89 as in the third embodiment may be provided in the voltage command output means 11f. In this case, the operation corresponding to one phase can be omitted in the reference frame transformation means 7, the DA conversion means 141, and the second current control means 8f.

Eighth Embodiment

In the seventh embodiment, in order to output the analog second three-phase voltage commands vu2a*, vv2a*, and vw2a* on the stationary reference frame, the second current control means 8f sets the deviations between the analog three-phase storage detection currents iuha, ivha, and iwha on the stationary reference frame, which are output from the storage section 9f, and the analog three-phase detection currents iva, iva, and iwa on the stationary reference frame, which are output from the storage section 9f, as the amount of variation in the analog detection current on the stationary reference frame. However, the storage section 9f may be omitted, and the amount of variation in the analog detection current on the stationary reference frame may be obtained by analog operation using a high pass filter.

Figure 25:
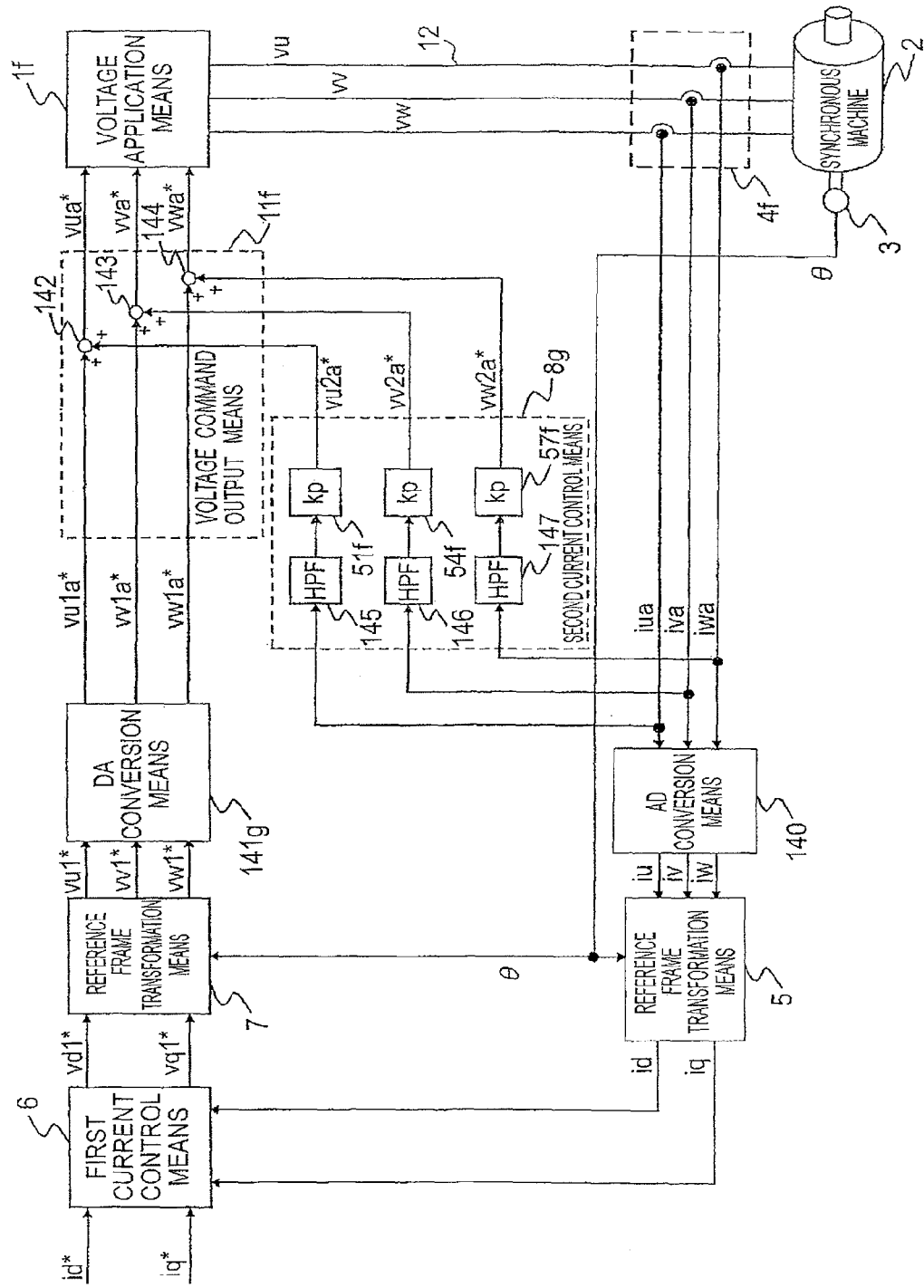
FIG. 25 is a block diagram showing the entire configuration of a controller for an AC rotary machine according to an eighth embodiment of the invention.

FIG. 25 is a block diagram showing the entire configuration of a controller for an AC rotary machine according to an eighth embodiment of the invention. In FIG. 25, the same components as in the seventh embodiment or components equivalent to those in the seventh embodiment are denoted by the same reference numerals. In the eighth embodiment, the DA conversion means 141 in the seventh embodiment is replaced with a DA conversion means 141g and the second current control means 8f is replaced with a second current control means 8g. The others in the eighth embodiment are the same as those in the seventh embodiment. Also in the eighth embodiment, the three-phase AC reference frame including U, V, and W phases are used as the stationary reference frame.

The DA conversion means 141g in the eight embodiment is configured to convert the digital three-phase voltage commands vu*, vv*, and vw* on the stationary reference frame into the analog first three-phase voltage commands vu1*, vv1*, and vw1* on the stationary reference frame like the DA conversion means 141 in the seventh embodiment, but is not configured to generate the conversion flag FLAG_DA. The second current control means 8g in the eight embodiment is formed by an analog circuit and includes high pass filters 145, 146, and 147 and proportional gain multipliers 51f, 54f, and 57f. The proportional gain multipliers 51f, 54f, and 57f are the same as those in the seventh embodiment.

The high pass filter 145 outputs the amount of variation in the u-phase detection current iva by cutting off a low-frequency component of the analog u-phase detection current iva. Similarly, the high pass filter 146 outputs the amount of variation in the v-phase detection current iva by cutting off a low-frequency component of the analog v-phase detection current iva. Similarly, the high pass filter 147 outputs the amount of variation in the w-phase detection current iwa by cutting off a low-frequency component of the analog w-phase detection current iwa.

In addition, the high pass filters 145, 146, and 147 may be formed by analog circuits using resistors and capacitors as is known in the related art.

As described above, in the controller for an AC rotary machine according to the eight embodiment, the second current control means 8g is configured to output the analog second three-phase voltage commands vu2a*, vv2a*, and vw2a* on the stationary reference frame on the basis of the amount of variation in the analog detection current on the stationary reference frame, and the amount of variation in the detection current on the stationary reference frame is amplified. Accordingly, even in a period for which the first current control means 6 and the reference frame transformation means 5 and 7 do not update the operation, it is possible to continue proportional control based on the amount of variation in the analog three-phase detection currents iva, iva, and iwa. As a result, an effect can be obtained in which it is possible to maintain the reliability in current control against disturbance.

Also in the eighth embodiment, one of the analog first u, v, w-phase voltage commands vu1a*, vv1a*, and vw1a*, one of the analog second u, v, w-phase voltage commands vu2a*, vv2a*, and vw2a*, and one of the adders 142, 143, and 144 may be omitted and the same subtracter 89 as in the third embodiment may be provided in the voltage command output means 11f. In this case, the operation corresponding to one phase can be omitted in the reference frame transformation means 7, the DA conversion means 141, and the second current control means 8f.

Ninth Embodiment

Although the controllers for AC rotary machines have been described in the first to eighth embodiments, a controller for electric power steering may also be formed by generating the torque for assisting the steering torque by the controllers for AC rotary machines.

Figure 26:
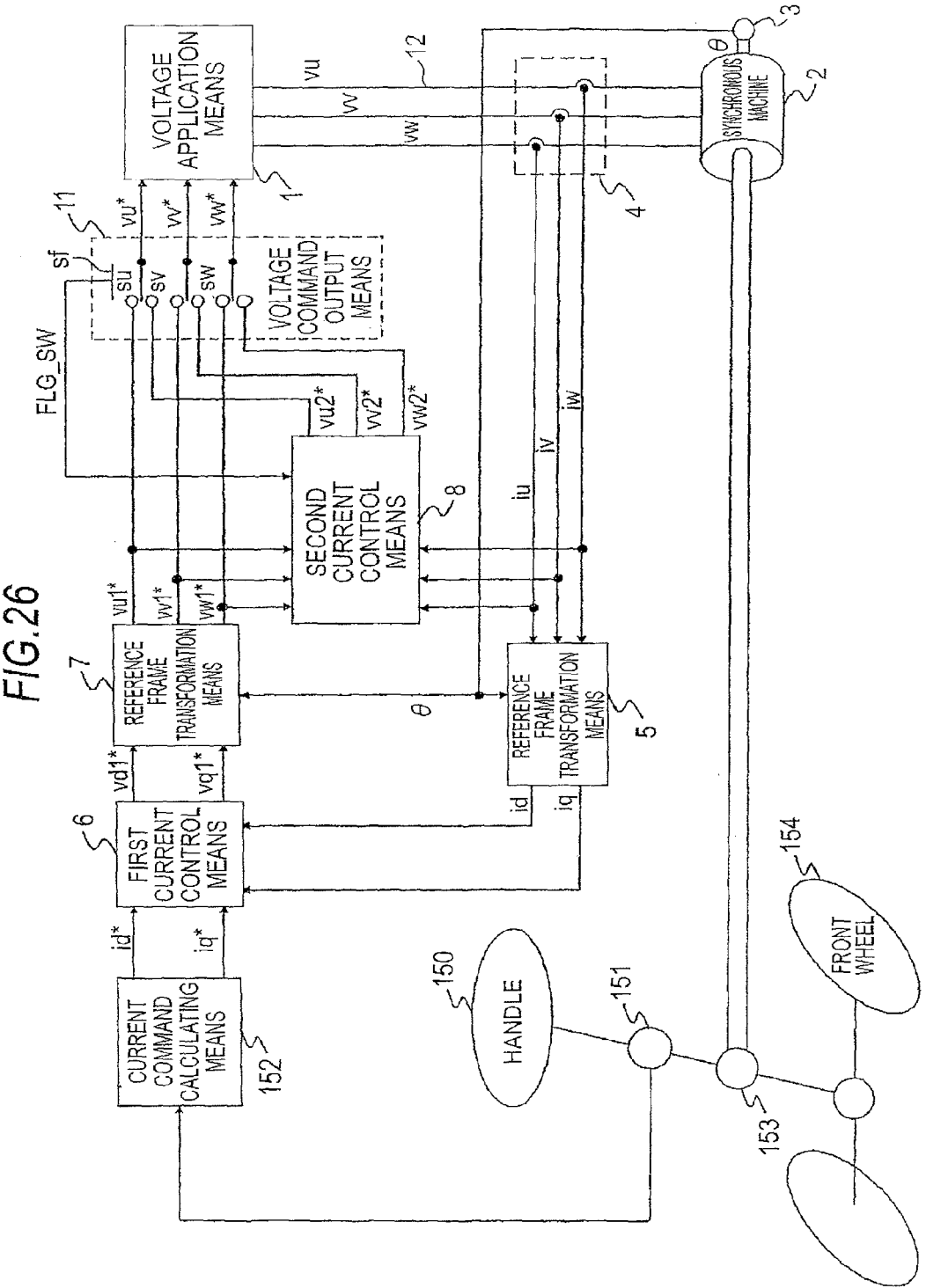
FIG. 26 is a block diagram showing the entire configuration of a controller for electric power steering according to a ninth embodiment of the invention.

FIG. 26 is a block diagram showing the entire configuration of a controller for electric power steering according to a ninth embodiment. In FIG. 26, the same components as in the first embodiment or components equivalent to those in the first embodiment are denoted by the same reference numerals. The controller for electric power steering according to the ninth embodiment is obtained by applying the first embodiment to a controller for electric power steering. Compared with the first embodiment, the controller for electric power steering according to the ninth embodiment further includes a handle 150 of a vehicle, a torque detecting means 151, a current command calculating means 152, and a gear 153. The others in the controller for electric power steering according to the ninth embodiment are formed in the same manner as in first embodiment.

When a driver makes a steering mechanism of a vehicle generate steering torque by the handle 15, the torque detecting means 151 detects the steering torque and outputs it as detection torque. In order that the synchronous motor 2 generates auxiliary torque for assisting the steering torque, the current command calculating means 152 calculates the two-phase current commands id* and iq* on the rotating reference frame, which are to be supplied to the synchronous motor 2, on the basis of the detection torque output from the torque detecting means 151, and outputs them to the first current control means 6. The synchronous motor 2 generates the auxiliary torque for assisting the steering torque, and the auxiliary torque is supplied to a steering mechanism of a front wheel 154 of the vehicle through the gear 153.

The operation period of the current command calculating means 152 is not reflected on the first three-phase voltage commands vu1*, vv1*, and vw1* even if the operation period of the current command calculating means 152 is set to be shorter than a period for which the first current control means 6 updates the first three-phase voltage commands vu1*, vv1*, and vw1* output from the reference frame transformation means 7, that is, the second operation period ΔT1. Accordingly, in order to reduce the operation load, the operation period of the current command calculating means 152 is set to be equal or longer than the second operation period ΔT1 for which the first current control means 6 updates the first three-phase voltage commands vu1*, vv1*, and vw1* on the rotating reference frame.

In addition, since it is necessary to maintain the highly reliable current control performance against disturbance, the period for which the second current control means 8 updates the second three-phase voltage commands vu2*, vv2*, and vw2* on the stationary reference frame, that is, the first operation period ΔT is set to be shorter than the operation period of the current command calculating means 152. In other words, the operation period of the current command calculating means 152 is set to be longer than the first operation period ΔT for which the second current control means 8 updates the second three-phase voltage commands vu2*, vv2*, and vw2* on the stationary reference frame.

By forming the controller for electric power steering as described above, the effects are obtained in which it is possible to reduce the operation load of the controller for an AC rotary machine and the operation load of the current command calculating means while maintaining the highly reliable current control performance against disturbance.

In addition, in the ninth embodiment, the controller for electric power steering is formed by application of the first embodiment. However, the controller for electric power steering may also be formed by application of the second to eight embodiments. In this case, the controller for electric power steering may be realized by adding the torque detecting means 151 and the current command calculating means 152, which are shown in the ninth embodiment, in each of the second to eighth embodiments.

The controllers for AC rotary machines according to the embodiments of the invention may be used as controllers for synchronous machines or induction machines, and may also be applied to controller for electric power steering for vehicles.

Various modifications and alterations of this invention will be apparent to those skilled in the art without departing from the scope and spirit of this invention, and it should be understood that this is not limited to the illustrative embodiments set forth herein.

What is claimed is:

1. A controller for an AC rotary machine comprising:
voltage application means for applying a voltage to the AC rotary machine on the basis of a voltage command on the stationary reference frame;
current detecting means for detecting a current of the AC rotary machine and outputting a detection current on the stationary reference frame;
first reference frame transformation means for transforming the reference frame of the detection current on the stationary reference frame on the basis of an arbitrary phase and outputting a detection current on the rotating reference frame;
first current control means for outputting a first voltage command on the rotating reference frame on the basis of the detection current on the rotating reference frame and a current command on the rotating reference frame which gives command regarding a current to be supplied to the AC rotary machine;
second reference frame transformation means for transforming the reference frame of the first voltage command on the rotating reference frame on the basis of the arbitrary phase and outputting a first voltage command on the stationary reference frame;
second current control means for outputting a second voltage command on the stationary reference frame on the basis of the detection current on the stationary reference frame; and
voltage command output means for outputting the voltage command on the stationary reference frame to the voltage application means on the basis of the first voltage command on the stationary reference frame and the second voltage command on the stationary reference frame.

2. The controller for the AC rotary machine according to claim 1,
wherein the second current control means outputs the second voltage command on the stationary reference frame on the basis of the amount of variation in the detection current on the stationary reference frame.

3. A controller for electric power steering wherein the AC rotary machine according to claim 2 is formed as an AC motor that generates auxiliary torque for assisting steering torque of a vehicle, the controller for electric power steering comprising:
the controller for the AC rotary machine according to claim 2;
torque detecting means for detecting the steering torque and outputting detection torque; and
current command calculating means for outputting a current command on the rotating reference frame, which gives command regarding a current to be supplied to the AC motor, on the basis of the detection torque, and
an operation period of the current command calculating means is set to be equal or longer than a period, for which the first current control means updates the first voltage command on the rotating reference frame and is also set to be longer than a period, for which the second current control means updates the second voltage command on the stationary reference frame.

4. The controller for the AC rotary machine according to claim 1,
wherein the second current control means outputs the second voltage command on the stationary reference frame on the basis of the amount of variation in the arbitrary phase.

5. A controller for electric power steering wherein the AC rotary machine according to claim 4 is formed as an AC motor that generates auxiliary torque for assisting steering torque of a vehicle, the controller for electric power steering comprising:
the controller for the AC rotary machine according to claim 4;
torque detecting means for detecting the steering torque and outputting detection torque; and
current command calculating means for outputting a current command on the rotating reference frame, which gives command regarding a current to be supplied to the AC motor, on the basis of the detection torque, and
an operation period of the current command calculating means is set to be equal or longer than a period, for which the first current control means updates the first voltage command on the rotating reference frame and is also set to be longer than a period, for which the second current control means updates the second voltage command on the stationary reference frame.

6. The controller for the AC rotary machine according to claim 1,
wherein at least one of the first reference frame transformation means and the second reference frame transformation means has an operation period, for which reference frame transformation is performed, to be longer than a period, for which the voltage command on the stationary reference frame output from the voltage command output means is updated.

7. A controller for electric power steering wherein the AC rotary machine according to claim 6 is formed as an AC motor that generates auxiliary torque for assisting steering torque of a vehicle, the controller for electric power steering comprising:
the controller for the AC rotary machine according to claim 6;
torque detecting means for detecting the steering torque and outputting detection torque; and
current command calculating means for outputting a current command on the rotating reference frame, which gives command regarding a current to be supplied to the AC motor, on the basis of the detection torque, and an operation period of the current command calculating means is set to be equal or longer than a period, for which the first current control means updates the first voltage command on the rotating reference frame and is also set to be longer than a period, for which the second current control means updates the second voltage command on the stationary reference frame.

8. The controller for the AC rotary machine according to claim 1,
wherein the voltage command output means outputs either one selected from the first voltage command on the stationary reference frame and the second voltage command on the stationary reference frame as the voltage command on the stationary reference frame to the voltage application means,
the second current control means includes:
a storage section that stores the detection current on the stationary reference frame and the first voltage command on the stationary reference frame and outputs a storage detection current on the stationary reference frame and a storage voltage command on the stationary reference frame; and
a second voltage command calculating section that outputs the second voltage command on the stationary reference frame on the basis of the storage detection current on the stationary reference frame, the storage voltage command on the stationary reference frame, and the detection current on the stationary reference frame, and
the storage section stores the detection current on the stationary reference frame and the first voltage command on the stationary reference frame when the voltage command output means selects the first voltage command on the stationary reference frame as the voltage command on the stationary reference frame, and outputs the storage detection current on the stationary reference frame and the storage voltage command on the stationary reference frame.

9. The controller for the AC rotary machine according to claim 1,
wherein the voltage command output means outputs a value, which is obtained by adding the second voltage command on the stationary reference frame to the first voltage command on the stationary reference frame, to the voltage application means as the voltage command on the stationary reference frame, and
the second current control means includes:
a storage section that stores the detection current on the stationary reference frame and outputs a storage detection current on the stationary reference frame; and
a second voltage command calculating section that outputs the second voltage command on the stationary reference frame on the basis of the storage detection current on the stationary reference frame and the detection current on the stationary reference frame.

10. The controller for the AC rotary machine according to claim 1,
wherein the controller for the AC rotary machine uses the three-phase AC reference frame as the stationary reference frame, and
the second current control means outputs a second voltage command on the three-phase AC reference frame as the second voltage command on the stationary reference frame on the basis of two phases of a detection current on the three-phase AC reference frame as the detection current on the stationary reference frame.

11. A controller for electric power steering wherein the AC rotary machine according to claim 1 is formed as an AC motor that generates auxiliary torque for assisting steering torque of a vehicle, the controller for electric power steering comprising:
the controller for the AC rotary machine according to claim 1;
torque detecting means for detecting the steering torque and outputting detection torque; and
current command calculating means for outputting a current command on the rotating reference frame, which gives command regarding a current to be supplied to the AC motor, on the basis of the detection torque, and
an operation period of the current command calculating means is set to be equal or longer than a period, for which the first current control means updates the first voltage command on the rotating reference frame and is also set to be longer than a period, for which the second current control means updates the second voltage command on the stationary reference frame.

* * * * *